United States Patent
Milton

(10) Patent No.: US 12,102,073 B2
(45) Date of Patent: Oct. 1, 2024

(54) FISHING REEL WITH A LINE TRANSFER MECHANISM

(71) Applicant: James Edwards Milton, Malaga, NJ (US)

(72) Inventor: James Edwards Milton, Malaga, NJ (US)

( * ) Notice: Subject to any disclaimer, the term of this patent is extended or adjusted under 35 U.S.C. 154(b) by 127 days.

(21) Appl. No.: 17/667,546

(22) Filed: Feb. 9, 2022

(65) Prior Publication Data
US 2022/0394968 A1 Dec. 15, 2022

Related U.S. Application Data

(60) Provisional application No. 63/210,490, filed on Jun. 14, 2021.

(51) Int. Cl.
*A01K 89/015* (2006.01)
*A01K 89/01* (2006.01)
*A01K 89/06* (2006.01)

(52) U.S. Cl.
CPC ...... *A01K 89/0176* (2015.05); *A01K 89/0117* (2013.01); *A01K 89/01904* (2015.05); *A01K 89/06* (2013.01)

(58) Field of Classification Search
CPC ............ A01K 89/003; A01K 89/01904; A01K 89/06; A01K 89/0117; A01K 89/01555; A01K 89/0184; A01K 89/02; A01K 89/033; A01K 89/045; A01K 89/046; A01K 89/016; A01K 89/057; A01K 89/058; A01K 89/01903; A01K 89/01909; A01K 89/05; B65H 54/106; Y10S 242/902

USPC .......................................................... 242/229
See application file for complete search history.

(56) References Cited

U.S. PATENT DOCUMENTS

| 478,713 | A | * | 7/1892 | Porter | ................ | A01K 89/0173 242/253 |
| 2,571,440 | A | * | 10/1951 | Goldberg | ........... | A01K 89/0155 242/243 |
| 2,590,369 | A | * | 3/1952 | Beeler | .................. | A01K 89/027 242/243 |

(Continued)

FOREIGN PATENT DOCUMENTS

| CN | 208523577 U | * | 2/2019 | ......... A01K 89/0155 |
| FR | 859236 A | * | 12/1940 | |

(Continued)

*Primary Examiner* — Emmanuel M Marcelo
*Assistant Examiner* — Henrix Soto
(74) *Attorney, Agent, or Firm* — Ashok Tankha

(57) ABSTRACT

A fishing reel with a line transfer mechanism is provided. The line transfer mechanism includes a line transfer arm that toggles over a spool for selectively transferring a fishing line between a cast mode and a retrieve mode. A first end of the line transfer arm is pivoted to a reel body of the fishing reel. An eye member is disposed on the line transfer arm for passing the fishing line from and to the spool. The eye member is disposed substantially perpendicular to a direction of the fishing line in the cast and retrieve modes. An angled bend configured proximal to one or both of the first end and a second end of the line transfer arm allows the eye member to be disposed proximal to the fishing reel in the cast and retrieve modes while maintaining the eye member substantially perpendicular to the direction of the fishing line.

17 Claims, 36 Drawing Sheets

(56) References Cited

U.S. PATENT DOCUMENTS

| | | | | |
|---|---|---|---|---|
| 2,593,749 | A * | 4/1952 | Goldberg | A01K 89/015 242/297 |
| 2,732,147 | A * | 1/1956 | Rotter | A01K 89/006 242/228 |
| 3,057,575 | A | 10/1962 | Hull | |
| 3,370,806 | A * | 2/1968 | Odom | A01K 89/0176 242/228 |
| 3,379,391 | A * | 4/1968 | Fincannon | A01K 89/0176 242/228 |
| 3,685,762 | A * | 8/1972 | Winfree | A01K 89/015 242/270 |
| 3,829,041 | A * | 8/1974 | Nepote | A01K 89/02 242/258 |
| 4,184,651 | A | 1/1980 | McConachy | |
| 5,467,932 | A * | 11/1995 | Puryear | A01K 89/0102 242/321 |
| 6,318,655 | B1 * | 11/2001 | Henze | A01K 89/02 242/244 |
| 8,240,590 | B2 * | 8/2012 | Danielsson | A01K 89/004 242/295 |
| 8,657,222 | B2 * | 2/2014 | Kawabe | A01K 89/057 242/295 |
| 8,807,471 | B2 * | 8/2014 | Svensson | A01K 89/01906 242/321 |
| 2010/0059615 | A1 | 3/2010 | Lombardo | |
| 2012/0285430 | A1 | 11/2012 | Dunlop | |
| 2013/0119176 | A1 | 5/2013 | Kendra | |
| 2015/0305315 | A1 * | 10/2015 | Iwai | A01K 89/033 242/303 |
| 2016/0183508 | A1 | 6/2016 | Kano | |

FOREIGN PATENT DOCUMENTS

| | | | | |
|---|---|---|---|---|
| FR | 2807290 A1 * | 10/2001 | | A01K 89/06 |
| JP | 2003000114 A * | 1/2003 | | |
| JP | 2004016177 A * | 1/2004 | | |

* cited by examiner

FISHING REEL WITH A LINE TRANSFER MECHANISM

CROSS-REFERENCE TO RELATED APPLICATIONS

This application claims priority to and the benefit of the provisional patent application titled "Fishing Reel Line Transfer Mechanism", application No. 63/210,490, filed in the United States Patent and Trademark Office on Jun. 14, 2021. The specification of the above referenced patent application is incorporated herein by reference in its entirety.

BACKGROUND

Fishing, also referred to as angling, is a sport of catching fish, typically using a fishing rod, a fishing reel, a fishing line, a hook, and a bait. An angler attaches a hook to a fishing line, which is attached to the fishing rod, typically fitted with a fishing reel. The fishing reel is typically attached proximal to a handle of the fishing rod. One type of fishing reel preferred by most anglers is a spinning reel. The spinning reel is configured with an open face and a bail. The spinning reel further comprises a fixed spool for holding the fishing line that is wound around a central axis of the spool, and a handle for retrieving the fishing line. An angler rotates the handle of the spinning reel to retrieve the fishing line. The spinning reel further comprises a reel body which is composed of a foot and a gear box housing. The gear box housing accommodates a gear box that is coupled to the handle and a spindle. The gear box is configured to amplify the number of spindle rotations for each rotation of the handle. The spool stays stationary on the spindle during casting of the fishing line. The gear box rotates the bail when the fishing line is retrieved. The bail wraps the fishing line around the stationary spool. An angler casts the fishing line by grasping the fishing line with a forefinger against the handle of the fishing rod, opening the bail, and then performing a backward swing of the fishing rod followed by a forward cast while releasing the fishing line with the forefinger. During the retrieve, the angler operates the handle of the spinning reel with one hand, while the large rotating bail serves as a line pickup, restoring the fishing line to its original position on the spool. To be wound on the spool by the rotating bail, the fishing line undergoes a change of direction, thereby imparting twist to the fishing line. The fishing line being wound onto the spool via the rotating bail and being twisted, with an indirect line takeup, eventually results in undesirable snarls in the fishing line, requiring more frequent line replacement.

The design of conventional spinning reels exhibits a tendency to twist and untwist the fishing line as the fishing line is cast and retrieved. In a conventional spinning reel, the fishing line is released in coils or loops from the leading edge of the non-rotating spool. The spool is typically the point of a conventional spinning reel where the fishing line is most prone to twist or tangle. Substantial friction on the fishing line by the spool results in breakage of the fishing line. Moreover, improper winding of the fishing line onto the spool by the rotating bail causes the fishing line to be trapped underneath itself on the spool or even detach from the spinning reel in loose loops of fishing line.

Anglers always have the problem of twisting of their fishing lines during casting and retrieving of the fishing line. Fishing lines that run off the spinning reel in an improper manner are prone to twisting or tangling, which is aggravating to an angler who has to spend a substantial amount of time to unsnarl the fishing line. Twisting of the fishing line, also referred to as a "line twist", in spinning reels may occur from the spin of an attached lure, the action of the bail against the fishing line when engaged by the handle, or even retrieval of the fishing line that is under load. An angler typically casts the fishing line from the side of the spool of the spinning reel similar to a coil being pulled apart causing the fishing line to be twisted in a particular direction. Conventional direct-to-reel spool retrieve type reels, also referred to as conventional or bait casting reels, have a limited ability to freely cast bait. The spinning reel changes the direction of the fishing line when the fishing line is being wound onto the spool of the spinning reel, thereby imparting a line twist. If an angler turns the handle of the spinning reel while encountering large fish with much resistance, the fishing line typically twists into an uncontrollable snarl that eventually ruins the fishing line. Over a period of time, casting and retrieving the fishing line accumulates more and more twist, because the angler has no method of countering the accumulation of the twist of the fishing line, thereby ruining and rendering the fishing line unusable. A twisted fishing line also becomes shorter and sacrifices the length of the cast. Additional length of the cast is lost due to additional friction generated while the twisted fishing line travels through guides on the fishing rod.

Besides the various types of fishing reels, there are different types of fishing lines, for example, monofilament fishing lines, fluorocarbon fishing lines, etc. Fluorocarbon fishing lines are increasingly being used by anglers due to their various characteristics, for example, strength, density, stiffness, abrasion resistance, durability, zero light refraction under water making these fishing lines almost invisible under water, etc. However, fluorocarbon fishing lines have more coiling memory than regular monofilament fishing lines. The large coiling memory of fluorocarbon causes tangling of the fishing line made therefrom, making it difficult to cast the fishing line to a long distance. Moreover, fishing lines with more coiling memory tend to kink or knot during retrieval.

Hence, there is a long-felt need for a fishing reel with a line transfer mechanism configured to be toggled for selectively transferring a fishing line between a cast mode and a retrieve mode with no change in the direction of the fishing line to cause a line twist or a line entanglement during retrieve when the fishing line is under tension and vulnerable to twist. Moreover, there is a need for a line transfer mechanism that ensures there is no friction of the fishing line on any part of the fishing reel or in the flow of the fishing line during casting and retrieving of the fishing line, thereby imparting no line twist and precluding entanglement of the fishing line. Furthermore, there is a need for a line transfer mechanism that ensures that, during the retrieve, the fishing line travels from the fishing rod in towards the fishing reel in a straight line to the edge of the spool of the fishing reel on which the fishing line is being wound with no redirection. Furthermore, there is a need for a manageable and balanced reel configuration that allows for a much larger diameter spool which provides for much less coiling memory allowing the fishing line to flow smoothly while being cast from the fishing reel.

SUMMARY

This summary is provided to introduce a selection of concepts in a simplified form that are further disclosed in the detailed description. This summary is not intended to determine the scope of the claimed subject matter.

The apparatus disclosed herein addresses the above-recited need for a fishing reel with a line transfer mechanism configured to be toggled for selectively transferring a fishing line between a cast mode and a retrieve mode with no change in the direction of the fishing line to cause a line twist or a line entanglement during retrieve when the fishing line is under tension and vulnerable to twist. The line transfer mechanism allows an angler to perform a direct-to-reel retrieval of the fishing line with no change in the direction of the fishing line during the retrieval to cause a line twist under all circumstances. The line transfer mechanism ensures there is no friction of the fishing line on any part of the fishing reel or in the flow of the fishing line during casting and retrieving of the fishing line, thereby imparting no line twist and precluding entanglement of the fishing line. The line transfer mechanism also ensures that, during the retrieve, the fishing line travels from the fishing rod in towards the fishing reel in a straight line to the edge of a spool of the fishing reel on which the fishing line is being wound with no redirection. Furthermore, the apparatus disclosed herein addresses the above-recited need for a manageable and balanced reel configuration that allows for a much larger diameter spool which provides for much less coiling memory allowing the fishing line to flow smoothly while being cast from the fishing reel. The fishing reel with the line transfer mechanism disclosed herein is configured to create a direct-to-spool retrieve and a smooth flow of the fishing line off of the end of the spool while casting.

The fishing reel for selectively transferring a fishing line between a cast mode and a retrieve mode comprises a reel body, a spool, and a line transfer mechanism. The reel body is configured to be attached to a fishing rod via a reel foot. The spool is disposed on the reel body. The fishing line is wound around the spool. In an embodiment, the spool has a substantially large diameter providing for less coiling memory, thereby allowing the fishing line to flow smoothly while being cast from the spool. In this embodiment, the reel body and the spool are configured to be disposed in line with the fishing rod, thereby allowing accommodation of the spool having the substantially large diameter. In an embodiment, the spool is a skirted spool configured to prevent the fishing line from falling behind and under the spool.

The line transfer mechanism is pivoted to the reel body of the fishing reel, substantially adjacent to the spool. In an embodiment, the line transfer mechanism is pivoted to the reel body of the fishing reel, substantially adjacent to an edge of the spool. The line transfer mechanism comprises a line transfer arm and an eye member. The line transfer arm is configured to be toggled over the spool for selectively transferring the fishing line between the cast mode and the retrieve mode. In an embodiment, the line transfer arm is configured to be manually toggled over the spool for selectively transferring the fishing line between the cast mode and the retrieve mode. The line transfer arm comprises a first end and a second end. The first end of the line transfer arm is pivoted to the reel body. In an embodiment, the line transfer arm is pivoted substantially adjacent to an edge of the spool. The eye member of the line transfer mechanism is disposed at a predetermined location on the line transfer arm. The eye member is configured to receive and pass the fishing line from and to the spool. The eye member is disposed substantially perpendicular to a direction of the fishing line in both the cast mode and the retrieve mode.

In an embodiment, an angled bend is configured proximal to the first end of the line transfer arm. The angled bend proximal to the first end of the line transfer arm is configured to allow the eye member to be disposed proximal to the fishing reel in the cast mode and the retrieve mode while maintaining the eye member substantially perpendicular to the direction of the fishing line. In another embodiment, the line transfer mechanism further comprises an angled bend configured proximal to the second end of the line transfer arm. The angled bend proximal to the second end of the line transfer arm is configured to allow the eye member to be disposed proximal to the fishing reel in the cast mode and the retrieve mode while maintaining the eye member substantially perpendicular to the direction of the fishing line. In another embodiment, an angled bend is configured proximal to both the first end and the second end of the line transfer arm. In this embodiment, the second end of the line transfer arm is pivoted to the reel body, substantially diametrically opposite to the first end of the line transfer arm. In an embodiment, the predetermined location of the eye member of the line transfer mechanism is a mid-section of the line transfer arm extending between the first end and the second end of the line transfer arm. The angled bend proximal to the first end and the angled bend proximal to the second end of the line transfer arm allow the eye member to be disposed proximal to the fishing reel in the cast mode and the retrieve mode while maintaining the eye member substantially perpendicular to the direction of the fishing line. In an embodiment, the line transfer mechanism further comprises a line guard extending between the angled bend proximal to the first end and the angled bend proximal to the second end of the line transfer arm. In another embodiment, the line guard extends between the first end of the line transfer arm and the angled bend proximal to the second end of the line transfer arm. The line guard is configured to preclude the fishing line from entanglement in the cast mode and the retrieve mode.

In another embodiment, the first end and the second end of the line transfer arm are free of angled bends for direct attachment to the reel body. In another embodiment, the predetermined location of the eye member of the line transfer mechanism is at the second end of the line transfer arm. In this embodiment, the eye member is attached to the second end of the line transfer arm and extends freely from the second end of the line transfer arm, while the first end of the line transfer arm is pivoted to the reel body. The eye member is offset at an angle with respect to a plane of the fishing reel when the line transfer arm is in the cast mode, and a plane of the eye member is substantially parallel to a periphery of the fishing reel when the line transfer arm is in the retrieve mode. In an embodiment, the line transfer arm is configured to be locked in position to the reel body in the cast mode or the retrieve mode using a locking mechanism. In an embodiment, the locking mechanism is a spring and cam mechanism. In another embodiment, the line transfer arm is configured to be locked in position to the reel body in the cast mode or the retrieve mode using a latching mechanism. In an embodiment, the latching mechanism is a magnetic latching mechanism comprising one or more magnets.

The fishing reel further comprises a turning handle rotatably connected to the spool via a system of gears accommodated in the reel body. The turning handle is configured to turn the system of gears selected to achieve a desired gear ratio. The gears are operably connected to the spool. The gears are configured to impart a turning motion to the spool causing the fishing line to be retrieved. In an embodiment, the fishing reel further comprises a one-way directional bearing installed in the system of gears and configured as an anti-reverse mechanism for disallowing movement of the turning handle in a reverse direction. In an embodiment, the fishing reel further comprises an adjustable friction drag element externally connected to the turning handle and internally connected to a drag system built into the system of gears accommodated in the reel body. The adjustable friction drag element is operably connected to the drag system via a pivot configured, for example, as a stem of the turning handle. The adjustable friction drag element is attached to the pivot and is configured to adjust an amount of drag on the fishing line, in operable communication with the drag system which is a part of the system of gears in the reel body. When tightened, the adjustable friction drag element applies pressure to the drag system. In an embodiment, a standard adjustable friction drag system is built into the system of gears. In another embodiment, an optional manual lever drag element is installed in the reel body. The spool is configured to turn in a reverse direction when force is applied thereto by an outward pull of the fishing line to overcome a friction drag tension adjustment. The friction drag tension adjustment is made below a breaking point of the fishing line. In an embodiment, the fishing reel further comprises a slotted cover configured to enclose the spool. The slotted cover comprises a slot configured to allow the fishing line to travel from the retrieve mode to the cast mode, without entanglement of the fishing line.

The fishing reel disclosed herein is a direct-to-reel spool retrieve type reel that imparts no change in the direction of the fishing line during the retrieve, thereby causing no line twist under all circumstances. The fishing reel discloses herein allows free flowing of the fishing line off of the end of the spool in the cast mode and a direct retrieve of the fishing line in the retrieve mode. The fishing reel optimally handles a stiff, fluorocarbon fishing line, without coiling and entanglement of the fishing line. The configuration of the fishing reel allows for a much larger diameter spool which provides for much less coiling memory allowing the fishing line to flow smoothly while being cast from the fishing reel. This larger diameter spool is easily accommodated in the fishing reel because the reel body and the spool of the fishing reel are disposed in line with the fishing rod. There are no cumbersome or balance issues with the fishing reel. Although the fishing reel allows a much larger spool size, the total size of the fishing reel is small relative to the larger spool size.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific structures and components disclosed herein. The description of a structure or a component referenced by a numeral in a drawing is applicable to the description of that structure or component shown by that same numeral in any subsequent drawing herein.

DETAILED DESCRIPTION

Figure 1A:
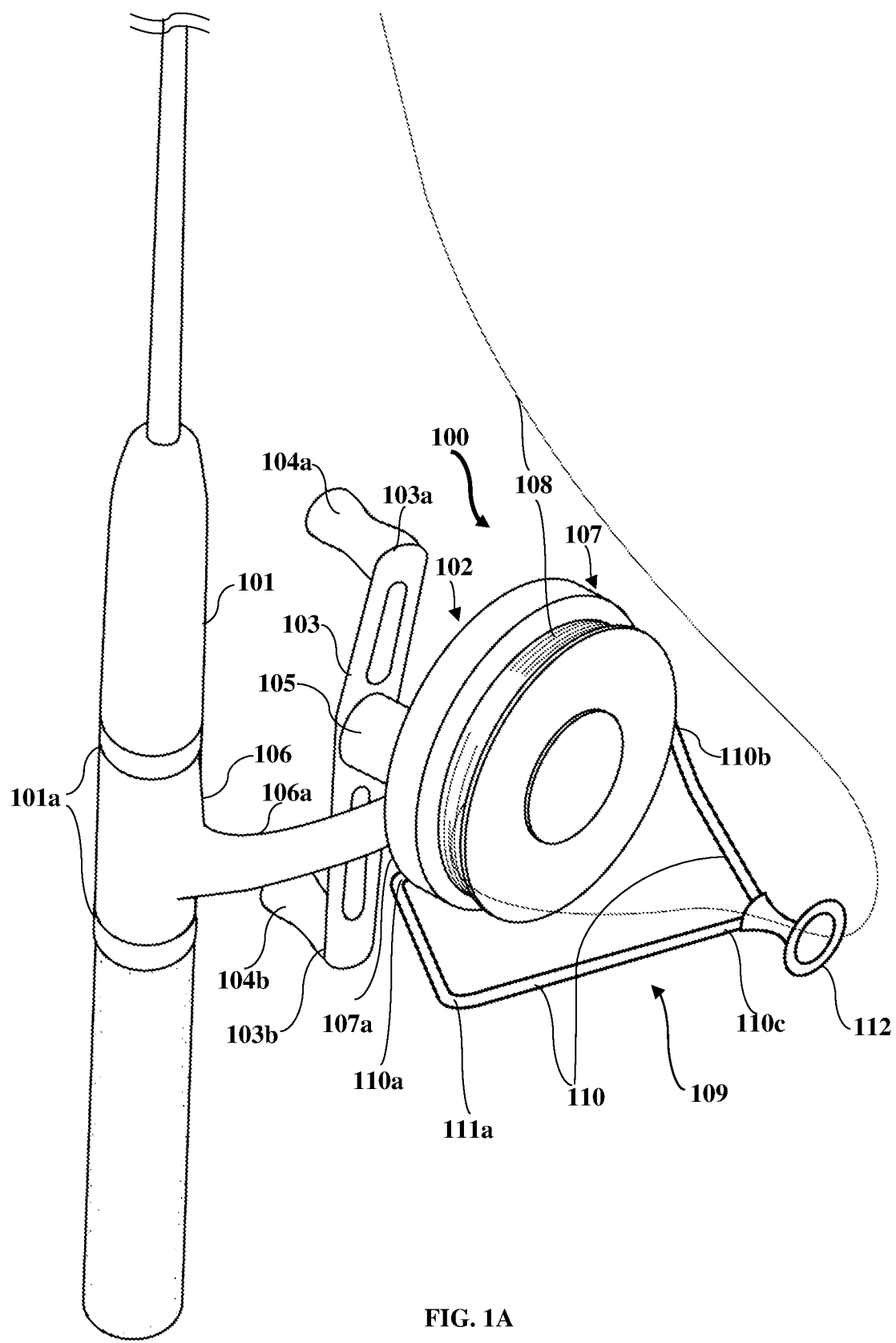
FIG. 1A exemplarily illustrates a perspective view of an embodiment of a fishing reel with a line transfer mechanism in a cast mode.

FIG. 1A exemplarily illustrates a perspective view of an embodiment of a fishing reel 100 with a line transfer mechanism 109 in a cast mode. As used herein, "cast mode" refers to a mode of throwing or hurling a fishing line 108 with a bait or a lure over water using a fishing rod 101 and the fishing reel 100 during fishing or angling. In the cast mode, the fishing line 108 is unwound from a spool 107 of the fishing reel 100. The fishing reel 100 for selectively transferring the fishing line 108 between a cast mode and a retrieve mode comprises a reel body 102, a spool 107, and a line transfer mechanism 109. The reel body 102 is the central component and focal point of the fishing reel 100. The reel body 102 houses all the parts or components, for example, the spool 107, a system 201 of gears exemplarily illustrated in FIG. 2 and FIGS. 6-7, the line transfer mechanism 109, etc., of the fishing reel 100. The reel body 102 is made, for example, from any one of graphite, plastic, metals such as aluminum, stainless steel, etc. The reel body 102 is configured to be attached to a fishing rod 101 via a reel foot 106. The reel foot 106 is a bridging element between the fishing reel 100 and the fishing rod 101. A stem 106a of the reel foot 106 extends from the reel body 102 and rigidly fits the reel foot 106 into a seat 101a configured in the fishing rod 101. The reel foot 106 is rigidly attached to the seat 101a configured in the fishing rod 101. In an embodiment, the stem 106a of the reel foot 106 is attached to a second surface 102b of the reel body 102 as exemplarily illustrated in FIG. 2 using fasteners, for example, screws, and extends therefrom to rigidly fit the reel foot 106 into the seat 101a of the fishing rod 101. In another embodiment, the stem 106a of the reel foot 106 is attached to and extends from a generally cylindrical wall 102c, that is, a perimeter of the reel body 102 as exemplarily illustrated in FIGS. 12A-12B and FIG. 17A. In an embodiment, the reel foot 106 is generally rectangularly shaped for firm placement in and rigid attachment to the seat 101a of the fishing rod 101. In another embodiment, the reel foot 106 is molded to the reel body 102 as an extension of the reel body 102 and is made of the same material, for example, any one of graphite, plastic, metals such as aluminum, stainless steel, etc., as that of the reel body 102. The rigid attachment of the reel foot 106 from the reel body 102 to the fishing rod 101 via the stem 106a allows the reel body 102 and the fishing rod 101 to remain firm during a swift action in the cast mode and to withstand tension of a hooked fish in a retrieve mode. As used herein, "retrieve mode" refers to a mode of reeling in a fishing line 108 with a bait, a lure, or a hooked fish from the water using the fishing rod 101 and the fishing reel 100 during fishing or angling. In the retrieve mode, the fishing line 108 is rewound around the spool 107 of the fishing reel 100.

Figure 2:
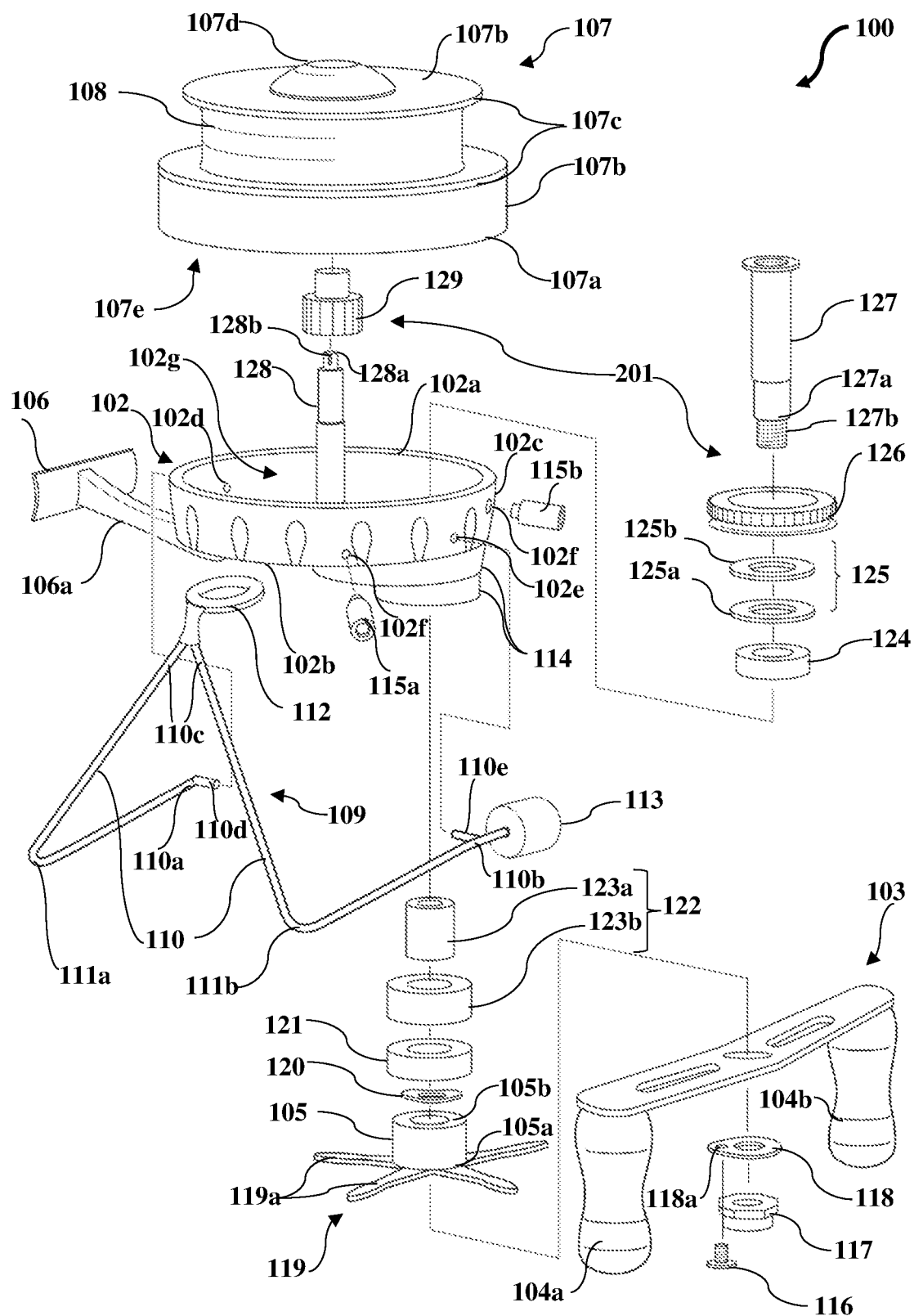
FIG. 2 exemplarily illustrates an exploded view of an embodiment of the fishing reel.
Figure 3A:
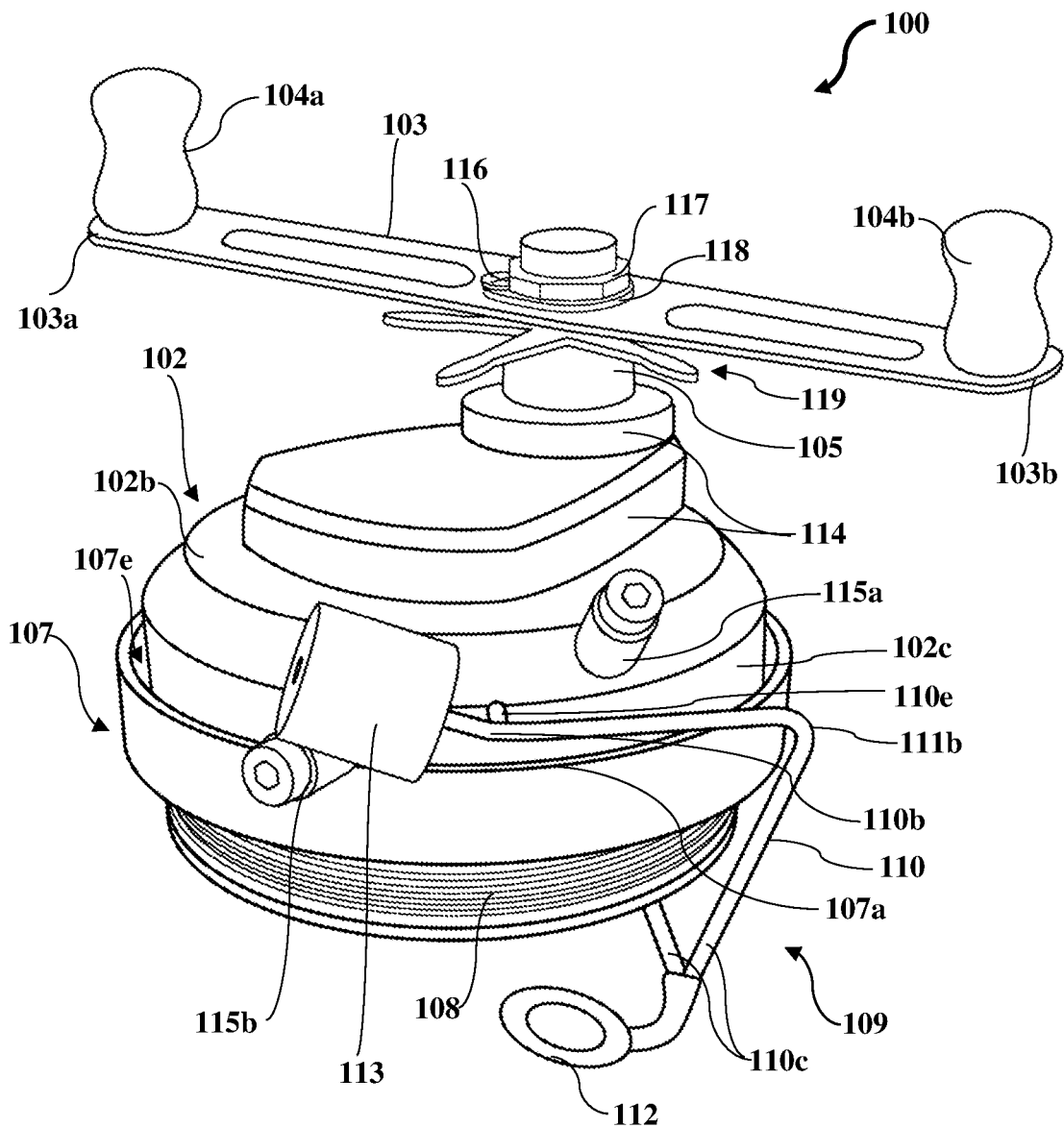
FIGS. 3A-3B exemplarily illustrate perspective, assembled views of an underside of an embodiment of the fishing reel in the cast mode and the retrieve mode respectively.
Figure 3B:
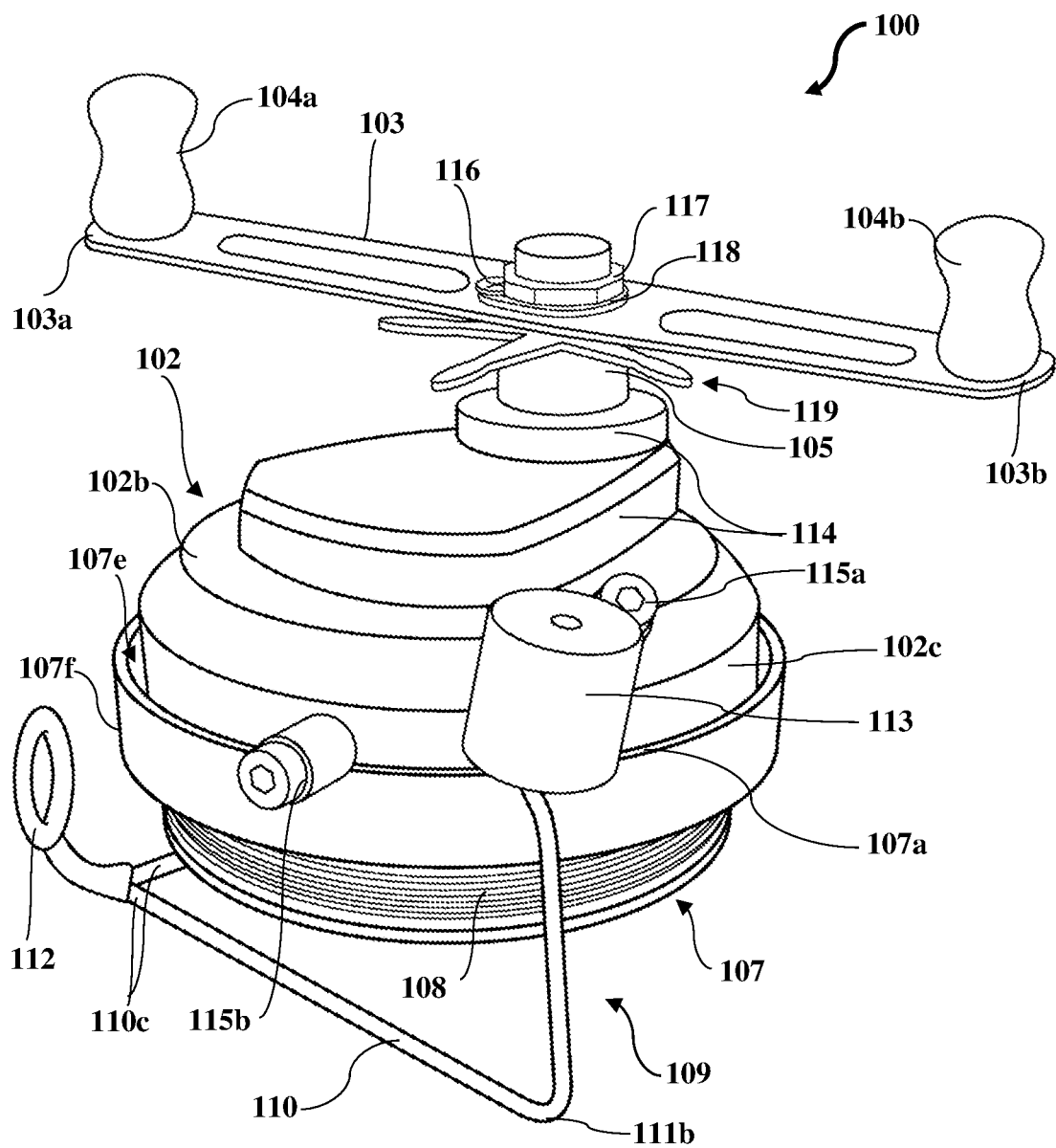

The spool 107 is disposed on the reel body 102 as disclosed in the descriptions of FIG. 2 and FIGS. 3A-3B.

The spool 107 holds the fishing line 108, for example, a monofilament fishing line or a fluorocarbon fishing line. The spool 107 is made, for example, from anodized aluminum, graphite, etc. The fishing line 108 is wound around the spool 107. In an embodiment, the spool 107 has a substantially large diameter providing for less coiling memory, thereby allowing the fishing line 108 to flow smoothly while being cast from the spool 107. In an example, the diameter of the spool 107 ranges from about 3 inches to about 4 inches in freshwater applications. For saltwater applications that require larger spools, the diameter of the spool 107 is configured to be, for example, equal to or larger than about 6 inches without causing balance and size problems that would be associated with other types of reels using a 6-inch plus size spool. In this embodiment, the reel body 102 and the spool 107 are configured to be disposed in line with the fishing rod 101 as exemplarily illustrated in FIGS. 1A-1C, FIG. 4, FIG. 9, FIGS. 10A-10C, FIG. 11, FIGS. 12A-12B, FIGS. 13A-13B, FIGS. 14A-14C, FIG. 15A, FIG. 15C, FIGS. 16A-16B, and FIG. 17A, thereby allowing accommodation of the spool 107 having the substantially large diameter. During operation, the reel body 102 and the spool 107 are aligned parallel to the fishing rod 101, such that the turning handle 103 is disposed on the second surface 102b of the reel body 102 and the spool 107 is disposed on the first surface 102a of the reel body 102 exemplarily illustrated in FIG. 6.

The fishing reel 100 further comprises a turning handle 103 rotatably connected to the spool 107 via the system 201 of gears accommodated in the reel body 102 exemplarily illustrated in FIG. 2, FIGS. 3A-3B, and FIGS. 6-7. The turning handle 103 is made, for example, from stainless steel, aluminum, graphite, etc. The turning handle 103 is operably coupled to the system 201 of gears housed in the reel body 102 via a pivot 105. The pivot 105 is a short shaft about which the turning handle 103 rotates. The turning handle 103 is configured to turn the system 201 of gears selected to achieve a desired gear ratio N:1, where "N" is the number of rotations per single turn of the turning handle 103. The desired gear ratio is, for example, between 2.5:1 and 5.5:1. The gear ratio is determined by an individual angler's preference and the size of the spool 107 that is used in the fishing reel 100. A lower gear ratio is configured for a larger spool causing a faster retrieve of the fishing line 108. The system 201 of gears is selected based on an optimal number of rotations of the spool 107 that a single rotation of the turning handle 103 is required to deliver. The system 201 of gears is operably connected to the spool 107 as disclosed in the description of FIG. 7. An operator of the fishing reel 100, for example, an angler, rotates the turning handle 103 by holding hand grips 104a and 104b attached to opposing ends 103a and 103b of the turning handle 103 respectively. The turning handle 103 is rotated manually by hand to retrieve the fishing line 108 back to the fishing rod 101 after casting the fishing line 108.

The line transfer mechanism 109 is pivoted to the reel body 102 of the fishing reel 100. In an embodiment, the line transfer mechanism 109 is pivoted substantially adjacent to an edge 107a of the spool 107. The line transfer mechanism 109 is configured to be toggled over the spool 107 for selectively transferring the fishing line 108 between the cast mode and the retrieve mode. In an embodiment, the line transfer mechanism 109 is configured to be manually toggled over the spool 107 of the fishing reel 100 for selectively transferring the fishing line 108 between the cast mode and the retrieve mode. The line transfer mechanism 109 is configured to be disposed as close as possible to the spool 107, while being able to move without hitting the spool 107. The line transfer mechanism 109 assists in moving the fishing line 108 on and off the spool 107. The line transfer mechanism 109 acts as a gate for the fishing line 108 wound on the spool 107. In the cast mode, the line transfer mechanism 109 allows the fishing line 108 to unwind from the spool 107. In the retrieve mode, the line transfer mechanism 109 guides the fishing line 108 back onto the spool 107. The line transfer mechanism 109 is made, for example, from a metal such as aluminum, stainless steel, etc. The line transfer mechanism 109 comprises a line transfer arm 110 and an eye member 112. The line transfer arm 110 comprises a first end 110a and a second end 110b. The first end 110a of the line transfer arm 110 is pivoted to the reel body 102. In an embodiment, the first end 110a of the line transfer arm 110 is pivoted substantially adjacent to the edge 107a of the spool 107. The eye member 112 of the line transfer mechanism 109 is disposed at a predetermined location on the line transfer arm 110. The eye member 112 is configured to receive and pass the fishing line 108 from and to the spool 107. The eye member 112 is disposed substantially perpendicular to a direction of the fishing line 108 that passes through the eye member 112 in both the cast mode and the retrieve mode.

Figure 1B:
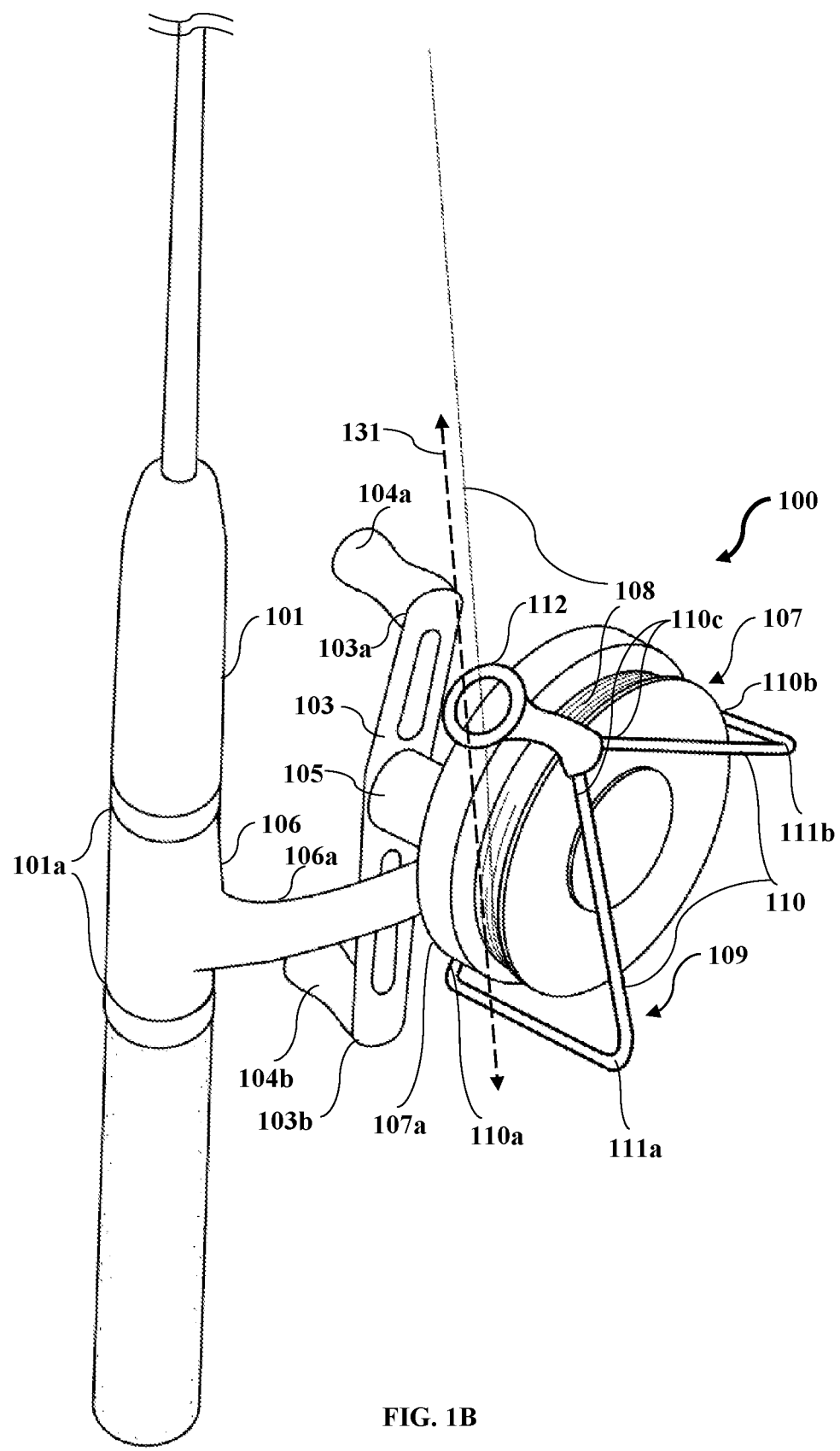
FIGS. 1B-1C exemplarily illustrate perspective views of the embodiment of the fishing reel shown in FIG. 1A, with the line transfer mechanism in a retrieve mode.
Figure 1C:
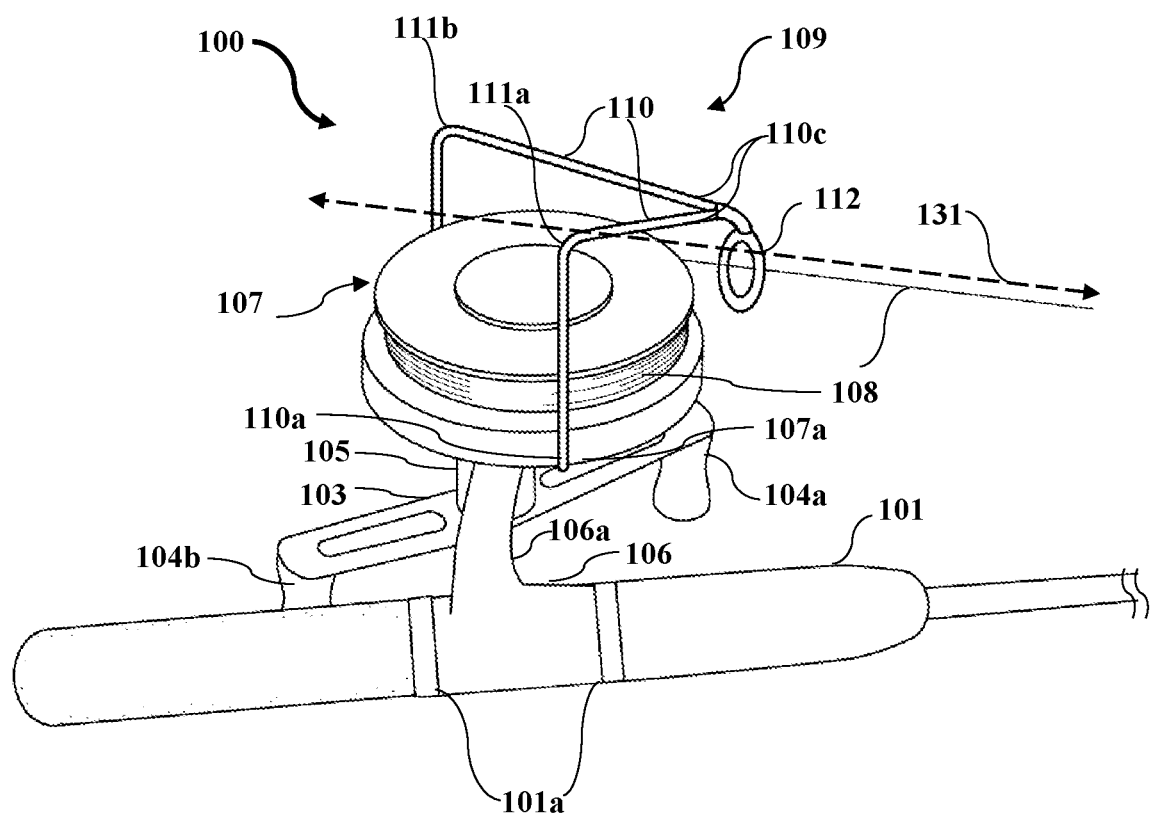

In an embodiment as exemplarily illustrated in FIGS. 1A-1C, an angled bend 111a is configured proximal to the first end 110a of the line transfer arm 110. The angled bend 111a proximal to the first end 110a of the line transfer arm 110 is configured to allow the eye member 112 to be disposed proximal to the fishing reel 100 in the cast mode and the retrieve mode while maintaining the eye member 112 substantially perpendicular to the direction of the fishing line 108. In an embodiment as exemplarily illustrated in FIGS. 1A-1C, the line transfer mechanism 109 further comprises an angled bend 111b configured proximal to the second end 110b of the line transfer arm 110. The angled bend 111b proximal to the second end 110b of the line transfer arm 110 is also configured to allow the eye member 112 to be disposed proximal to the fishing reel 100 in the cast mode and the retrieve mode while maintaining the eye member 112 substantially perpendicular to the direction of the fishing line 108. In this embodiment, the second end 110b of the line transfer arm 110 is pivoted to the reel body 102, substantially diametrically opposite to the first end 110a of the line transfer arm 110. In an embodiment as exemplarily illustrated in FIGS. 1A-1C, the second end 110b of the line transfer arm 110 is pivoted substantially adjacent to the edge 107a of the spool 107. In the embodiment exemplarily illustrated in FIGS. 1A-1C, the predetermined location of the eye member 112 of the line transfer mechanism 109 is a mid-section 110c of the line transfer arm 110 extending between the first end 110a and the second end 110b of the line transfer arm 110. The angled bend 111a proximal to the first end 110a and the angled bend 111b proximal to the second end 110b of the line transfer arm 110 allow the eye member 112 to be disposed proximal to the fishing reel 100 in the cast mode and the retrieve mode while maintaining the eye member 112 substantially perpendicular to the direction of the fishing line 108 as exemplarily illustrated in FIGS. 1A-1C.

The eye member 112 is offset at an angle with respect to a plane of the fishing reel 100 when the line transfer arm 110 is in the cast mode as exemplarily illustrated in FIG. 1A. In an embodiment, the eye member 112 is offset at an angle of, for example, about 90 degrees, to the plane of the line transfer arm 110. In an embodiment, the line transfer arm 110 is configured to be locked in position to the reel body 102 in the cast mode using a locking mechanism. In an embodiment, the locking mechanism is a spring and cam mechanism (not shown) operating within a connection assembly 1401 exemplarily illustrated in FIG. 14A. In another embodiment, the line transfer arm 110 is configured to be locked in position to the reel body 102 in the cast mode using a latching mechanism. In an embodiment, the latching mechanism is a magnetic latching mechanism comprising one or more magnets for latching the line transfer arm 110 in one or more positions. For example, diametrically magnetized magnets are used for latching both ends 110a and 110b of the line transfer arm 110 in the cast mode similar to the latching mechanism 1501 exemplarily illustrated in FIGS. 15A-15B.

FIGS. 1B-1C exemplarily illustrate perspective views of the embodiment of the fishing reel 100 shown in FIG. 1A, with the line transfer mechanism 109 in a retrieve mode. The line transfer arm 110 of the line transfer mechanism 109 is toggled over the spool 107 of the fishing reel 100 for transferring the fishing line 108 from the cast mode exemplarily illustrated in FIG. 1A to the retrieve mode exemplarily illustrated in FIGS. 1B-1C. In this embodiment, the line transfer mechanism 109 is attached to two opposing sides of the reel body 102. As exemplarily illustrated in FIGS. 1B-1C, the first end 110a and the second end 110b of the line transfer arm 110 are pivoted to the reel body 102, substantially adjacent to the edge 107a of the spool 107 of the fishing reel 100. The position of the pivot points of the line transfer arm 110 in the reel body 102 determines the amount of angle bend required in the line transfer arm 110 to achieve a perpendicular alignment of the fishing line 108 to the eye member 112. The angled bends 111a and 111b are configured proximal to the first end 110a and the second end 110b of the line transfer arm 110 respectively, as exemplarily illustrated in FIGS. 1B-1C. The eye member 112 is disposed at the mid-section 110c of the line transfer arm 110 extending between the first end 110a and the second end 110b of the line transfer arm 110. The angled bends 111a and 111b proximal to the first end 110a and the second end 110b of the line transfer arm 110 respectively, allow the eye member 112 to be disposed proximal to the fishing reel 100 in the cast mode and the retrieve mode while maintaining the eye member 112 substantially perpendicular to the direction of the fishing line 108. The plane of the eye member 112 is substantially parallel to the periphery of the fishing reel 100 when the line transfer arm 110 is in the retrieve mode. In the retrieve mode, the fishing line 108 is in a straight line coming from the fishing rod 101 to the edge of the spool 107 to be wound thereon, passing through the eye member 112 without contacting the eye member 112. FIGS. 1B and 1C illustrate a tangent 131 of the spool 107. The fishing line 108 is located along the tangent 131 of the spool 107 when the fishing line 108 is wound on to the spool 107 during the retrieve mode.

In an embodiment, the line transfer arm 110 is configured to be locked in position to the reel body 102 in the fishing reel 100 in the retrieve mode using a locking mechanism, and in an embodiment, a latching mechanism. In an embodiment, the locking mechanism is a spring and cam mechanism (not shown) operating within a connection assembly 1401 exemplarily illustrated in FIGS. 14B-14C. In an embodiment, the latching mechanism is a magnetic latching mechanism comprising one or more magnets. For example, diametrically magnetized magnets are used for locking both ends 110a and 110b of the line transfer arm 110 in the retrieve mode similar to the latching mechanism 1501 exemplarily illustrated in FIGS. 15C-15D. In the retrieve mode, the eye member 112 is perpendicular to the fishing line 108 due to the design of the line transfer arm 110 and the positioning of the line transfer arm 110. The line transfer arm 110 has the eye member 112 disposed at the edge of the spool 107 where the fishing line 108 is being wound during retrieve, thereby precluding friction of the fishing line 108 on any parts of the fishing reel 100 during retrieve. In the retrieve mode, the fishing line 108 travels from the fishing rod 101 towards the fishing reel 100 in a straight line to the edge of the spool 107 that the fishing line 108 is being wound onto with no redirection.

As exemplarily illustrated in FIGS. 1B-1C, the mid-section 110c of the line transfer arm 110 is bent by the angled bends 111a and 111b on the line transfer arm 110 so that the bent mid-section 110c of the line transfer arm 110 is adjacent to the perimeter of the fishing reel 100 in the retrieve mode. The bent mid-section 110c of the line transfer arm 110 is at an acute angle or at a greater angle with respect to the plane of the fishing reel 100 in the cast mode as exemplarily illustrated in FIG. 1A. In an embodiment, the bent mid-section 110c of the line transfer arm 110 is at a right angle or at a lesser angle with respect to the plane of the fishing reel 100 in the cast mode. The fishing reel 100 disclosed herein operates similar to a spinning reel with the addition of the line transfer mechanism 109 that selectively transfers the fishing line 108 between the cast mode and the retrieve mode, with no change in the direction of the fishing line 108 to cause a line twist or a line entanglement during retrieve when the fishing line 108 is under tension and vulnerable to twist. The fishing reel 100 and the spool 107 remain stationary staying in line and balanced with the fishing rod 101, while only the line transfer mechanism 109 moves and toggles the fishing line 108 between the cast mode and the retrieve mode. The fishing reel 100 with the line transfer mechanism 109 allows seamless symbiotic mechanical functions. The fishing reel 100 disclosed herein relates to movement from one point in a plane to another point and plane. One plane is the fishing line 108 in the retrieve mode and the other plane is the fishing line 108 in the cast mode, where the planes are perpendicular to each other. Assistance of the placement of the fishing line 108 in each plane is accomplished with the help of the line transfer mechanism 109 having an angle bend 111a, 111b configured proximal to one or both ends 110a and 110b of the line transfer arm 110. The angle bend(s) 111a and/or 111b alters the placement of the fishing line 108 in the plane from where the fishing line 108 would be placed if there were no angled bends in the line transfer mechanism 109. A straight-line transfer mechanism 109 without angled bends coming from the pivot point of the line transfer mechanism 109 in a mount in the reel body 102 would accomplish the transfer from one plane to the other but without the desired placement.

FIG. 2 exemplarily illustrates an exploded view of an embodiment of the fishing reel 100. The exploded view in FIG. 2 exemplarily illustrates the positions of the main components of the fishing reel 100, for example, the reel body 102, the spool 107, the line transfer mechanism 109, the turning handle 103, and the system 201 of gears accommodated in the reel body 102. Additional components typically incorporated in a fishing reel 100 for normal operation of the fishing reel 100, for example, additional springs, studs, knobs, washers, seals, spacers, gaskets, bearings, additional fasteners, etc., are not shown in the exploded view for simplicity and clarity of the main components. The fishing line 108 is wound around the spool 107. In an embodiment, the spool 107 is a skirted spool as exemplarily illustrated in FIG. 2, configured to prevent the fishing line 108 from falling behind and under the spool 107. In an embodiment, the spool 107 comprises skirting 107b on one or both opposing ends 107c of the spool 107. In an embodiment, the diameter of the skirting 107b at a lower one of the opposing ends 107c is wider than the diameter of the reel body 102 to allow the skirting 107b to fall over the reel body 102 such that the reel body 102 fits within the skirting 107b of the spool 107. The skirting 107b prevents the fishing line 108 from falling behind and under the spool 107 in the cast mode and the retrieve mode. In an embodiment, the spool 107 comprises a low profile and tapered center attachment 107d to preclude the fishing line 108 from catching and entangling on the center attachment 107d. In an embodiment, the spool 107 is incorporated with a push button release member (not shown) instead of a threaded attachment for releasing the fishing line 108.

The spool 107 defines a receptacle 107e for positioning the reel body 102 therewithin, thereby attaching the spool 107 to the reel body 102. In an embodiment, the reel body 102 comprises a generally cylindrical wall 102c with a first surface 102a and a closed lower surface 102b. The first end 110a and the second end 110b of the line transfer arm 110 of the line transfer mechanism 109 are pivoted to the generally cylindrical wall 102c, that is, the perimeter, of the reel body 102. The reel body 102 comprises pivot holes 102d and 102e configured on the generally cylindrical wall 102c for pivotably connecting the line transfer arm 110. Pivoting elements 110d and 110e extending from the first end 110a and the second end 110b of the line transfer arm 110 respectively, are inserted into the pivot holes 102d and 102e respectively, configured in the reel body 102. In an embodiment, a stopper 113 is attached to one end of the line transfer arm 110, for example, the second end 110b of the line transfer arm 110, for regulating movement of the line transfer arm 110 when the line transfer arm 110 is toggled to selectively transfer the fishing line 108 between the cast mode and the retrieve mode as disclosed in the description of FIGS. 3A-3B. The reel body 102 further comprises openings 102f configured on the generally cylindrical wall 102c for inserting and fastening pegs 115a and 115b with embedded diametrically magnetized magnets to the reel body 102 as disclosed in the description of FIGS. 3A-3B. In an embodiment as exemplarily illustrated in FIG. 2, the stem 106a of the reel foot 106 is attached to the closed lower second surface 102b of the reel body 102.

The reel body 102 further defines a cavity 102g for accommodating the system 201 of gears. In an embodiment, the system 201 of gears comprises a main gear 126, a spool axle 128, a spool hub gear 129, a drive gear guide 127, and a ball bearing 124 as exemplarily illustrated in FIG. 2. In an embodiment, a slot 128b is configured on an upper end 128a of the spool axle 128 for attaching to the push button release member (not shown) of the spool 107. The spool hub gear 129 is operably and coaxially coupled to a lower end 128c of the spool axle 128 as exemplarily illustrated in FIGS. 6-7. The gears 126 and 129 are circular metallic components that sit in the reel body 102. The gears 126 and 129 are made, for example, from any one of zinc, brass, aluminum, stainless steel, etc. The main gear 126 is in engageable communication with the spool hub gear 129 as exemplarily illustrated in FIGS. 6-7. The main gear 126 drives the spool hub gear 129 and in turn the spool axle 128, which turns the spool 107. In an embodiment, the fishing reel 100 further comprises a drag system 125 built into the system 201 of gears as exemplarily illustrated in FIG. 2 and FIG. 7. The drag system 125 comprises a set of metal and fabric washers 125a and 125b made, for example, from metal, felt, wool, wood, synthetic fluoropolymers, etc. The washers 125a and 125b of the drag system 125 serve to insulate, seal, lock, serve as spacers, provide spring force, align parts, and distribute loads in the system 201 of gears. The washers 125a and 125b of the drag system 125 are configured, for example, as flat discs stacked on top of each other, alternating between metal and fabric washers. In an embodiment as exemplarily illustrated in FIG. 2, the drag system 125 comprises two washers, for example, a key washer 125a and a polytetrafluoroethylene (PTFE) washer 125b. The key washer 125a is configured to lock into a base material or the drag system 125 with its key to prevent rotation of the key washer 125a. The key washer 125a is made, for example, from cold rolled steel, stainless steel, etc. The PTFE washer 125b is a flat disc having antifriction properties, chemical resistance, and corrosion resistance. The PTFE washer 125b is, for example, a Teflon® washer of The Chemours Company FC, LLC.

Figure 6:
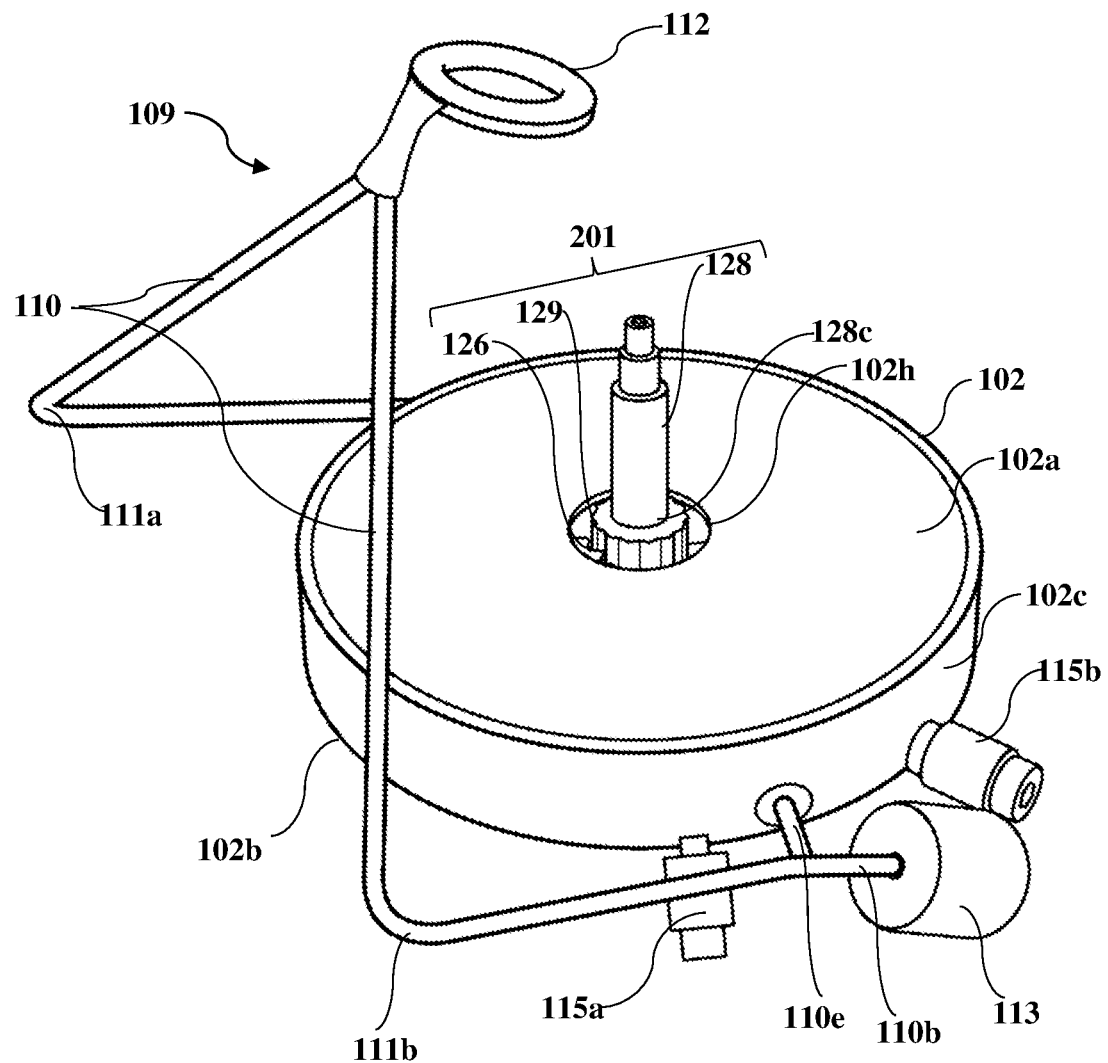
FIG. 6 exemplarily illustrates a perspective view of the reel body of an embodiment of the fishing reel in the cast mode.
Figure 7:
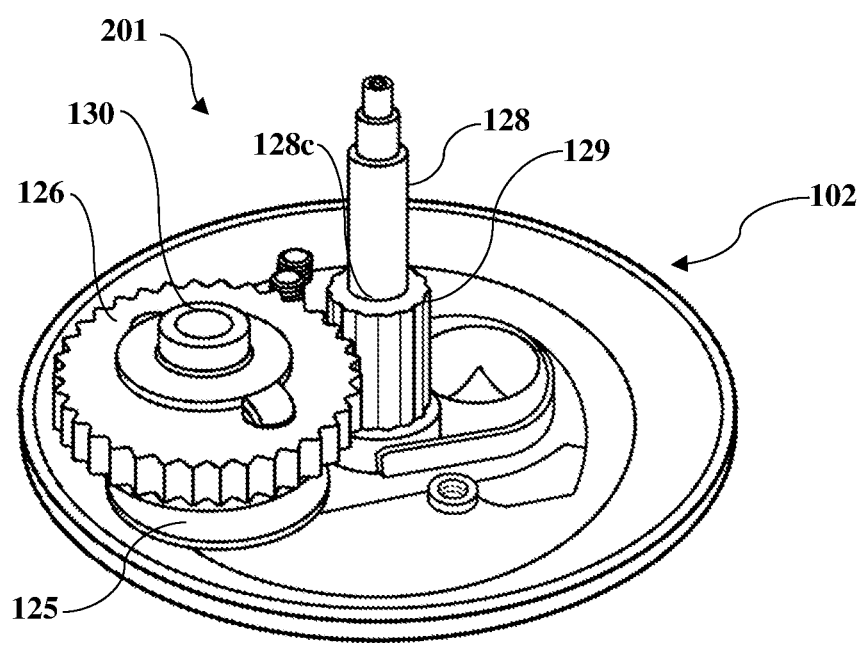
FIG. 7 exemplarily illustrates a system of gears accommodated in the reel body of an embodiment of the fishing reel.

The washers 125a and 125b of the drag system 125 are stacked on and operably connected to the main gear 126, which is operably connected to the spool 107 as disclosed in the descriptions of FIGS. 6-7. The drag system 125 is in operable communication with an adjustable friction drag element 119. The washers 125a and 125b of the drag system 125 are configured to create friction and adjust an amount of drag on the fishing line 108 wound around the spool 107 as disclosed in the description of FIG. 4. The main gear 126, the drag system 125, and the ball bearing 124 are coaxially disposed around the drive gear guide 127. In an embodiment, a threaded section 127b is configured on a bottom end 127a of the drive gear guide 127. The threaded section 127b is configured to fasten the drive gear guide 127 to a protruding element 130 extending upwardly from the main gear 126 as exemplarily illustrated in FIG. 7. The drive gear guide 127 and the ball bearing 124 guide and allow for smooth rotation of the main gear 126. The drive gear guide 127 guides the main gear 126 to engageably communicate with the spool hub gear 129.

The turning handle 103 is rotatably connected to the reel body 102 via the pivot 105 using a fastener, for example, a nut 117. In an embodiment, the fishing reel 100 further comprises a thin oval washer 118 with a hex hole configured to receive and firmly seat the nut 117 that connects the turning handle 103 to the reel body 102. In an embodiment, the thin oval washer 118 comprises an opening 118a for inserting a fastener 116, for example, a threaded screw, to attach the thin oval washer 118 to the turning handle 103. The fastener 116 secures the thin oval washer 118 and the nut 117 firmly to the turning handle 103. In an embodiment, the adjustable friction drag element 119 is externally connected to the turning handle 103 and internally connected to the drag system 125 built into the system 201 of gears accommodated in the reel body 102. In an embodiment, the adjustable friction drag element 119 is attached to one end 105a of the pivot 105 as exemplarily illustrated in FIG. 2. The adjustable friction drag element 119 is configured to adjust an amount of drag on the fishing line 108, in operable communication with the drag system 125 in the reel body 102. In an embodiment, the adjustable friction drag element 119 is a friction drag adjustment wheel shaped, for example, as a star with spokes 119a configured to manually rotate the adjustable friction drag element 119 and adjust the amount of drag on the fishing line 108, in operable communication with the drag system 125 which is a part of the system 201 of gears.

In an embodiment, the fishing reel 100 further comprises a one-way directional bearing 122 installed in the system 201 of gears. The one-way directional bearing 122 is made, for example, from a metal alloy such as stainless steel. The one-way directional bearing 122 comprises mating bearings, for example, an inner ring 123a and an outer ring 123b as exemplarily illustrated in FIG. 2. In an embodiment, the one-way directional bearing 122 is coaxially connected to the pivot 105 via a ball bearing 121 and a spring washer 120. The spring washer 120 is disposed on one end 105b of the pivot 105, below the ball bearing 121 as exemplarily illustrated in FIG. 2. The one-way directional bearing 122 is configured as an anti-reverse mechanism for disallowing movement of the turning handle 103 in a reverse direction as disclosed in the description of FIG. 5B. The spring washer 120 is configured to increase pressure when the adjustable friction drag element 119 is tightened. The ball bearing 121 facilitates translation of rotation of the turning handle 103 into a smooth turning motion of the spool 107. When the fishing reel 100 is assembled, in an embodiment, the spring washer 120, the ball bearing 121, and the one-way directional bearing 122 are disposed inside the reel body 102 and concealed by a frame cover 114, while the pivot 105 is exposed as exemplarily illustrated in FIGS. 3A-3B.

FIGS. 3A-3B exemplarily illustrate perspective, assembled views of an underside of an embodiment of the fishing reel 100 in the cast mode and the retrieve mode respectively. The turning handle 103 is rotatably connected to the reel body 102 via the pivot 105, using the nut 117, the washer 118, and the fastener 116 disclosed in the description of FIG. 2. Furthermore, in an embodiment, the adjustable friction drag element 119 is coaxially connected between the turning handle 103 and the pivot 105 as exemplarily illustrated in FIGS. 3A-3B. In an embodiment, the adjustable friction drag element 119 is a star-shaped drag element as exemplarily illustrated in FIG. 2, FIGS. 3A-3B, and FIG. 4. In other embodiments, the adjustable friction drag element 119 is configured with any ergonomic shape that allows convenient handling and operation of the adjustable friction drag element 119 during fishing. The pivot 105 is operably connected to the reel body 102 via the frame cover 114. Rotational motion produced by rotation of the turning handle 103 is transmitted to the main gear 126 housed in the reel body 102 as exemplarily illustrated in FIG. 2 and FIGS. 6-7. Rotation of the main gear 126 imparts rotational motion to the spool hub gear 129 attached to the spool axle 128 exemplarily illustrated in FIGS. 6-7, over which the spool 107 is disposed, thereby causing rotation of the spool 107 as disclosed in the description of FIGS. 6-7. The spool 107 only turns in the retrieve mode while winding in the fishing line 108 being directed by the eye member 112. In the cast mode, the spool 107 is stationary and the fishing line 108 flows off of the spool 107 and is directed through the eye member 112. In an embodiment, a locking mechanism or a latching mechanism holds the line transfer arm 110 in one of the modes, that is, the cast mode or the retrieve mode until the line transfer arm 110 is manually moved and latched to the other mode.

The reel body 102 is disposed within the receptacle 107e of the spool 107 as exemplarily illustrated in FIGS. 3A-3B. The first end 110a and the second end 110b of the line transfer arm 110 are connected to the reel body 102 via respective pivoting elements 110d and 110e exemplarily illustrated in FIG. 2. FIG. 3A exemplarily illustrates the second end 110b of the line transfer arm 110 connected to the generally cylindrical wall 102c, that is, the perimeter of the reel body 102 via the pivoting element 110e. Similarly, the first end 110a of the line transfer arm 110 (not shown in FIGS. 3A-3B) is connected to the generally cylindrical wall 102c of the reel body 102 via the other pivoting element 110d. FIGS. 3A-3B also exemplarily illustrate the pegs 115a and 115b with embedded, diametrically magnetized magnets attached to the reel body 102 of the fishing reel 100. In an embodiment, a stopper 113 is attached to one end of the line transfer arm 110, for example, the second end 110b of the line transfer arm 110, for regulating movement of the line transfer arm 110 when the line transfer arm 110 is toggled to selectively transfer the fishing line 108 between the cast mode and the retrieve mode. For example, when the stopper 113 is adjacent to the peg 115b with its embedded, diametrically magnetized magnet, the line transfer arm 110 is in the cast mode as exemplarily illustrated in FIG. 3A, and when the stopper 113 is adjacent to the peg 115a with its embedded, diametrically magnetized magnet, the line transfer arm 110 is in the retrieve mode as exemplarily illustrated in FIG. 3B.

The diametrically magnetized magnets embedded in the pegs 115a and 115b are magnetized across their respective diameters. That is, the pegs 115a and 115b with their respective diametrically magnetized magnets have poles on their diametrically opposite curved surfaces. The pegs 115b and 115a with their respective diametrically magnetized magnets are configured to attract and attach to the stopper 113 in the cast mode and the retrieve mode of the line transfer arm 110 as exemplarily illustrated in FIGS. 3A-3B respectively, thereby holding the line transfer arm 110 in position in the cast mode and the retrieve mode. That is, the peg 115a with its embedded, diametrically magnetized magnet holds the stopper 113 and in turn the line transfer arm 110 in position in the retrieve mode, and the peg 115b with its embedded, diametrically magnetized magnet holds the stopper 113 and in turn the line transfer arm 110 in position in the cast mode. FIG. 3A shows the line transfer mechanism 109 in the cast mode, where the eye member 112 is offset at an angle with respect to a plane of the fishing reel 100. FIG. 3B shows the line transfer mechanism 109 in the retrieve mode, where the plane of the eye member 112 is substantially parallel to a periphery 107f of the spool 107.

Figure 4:
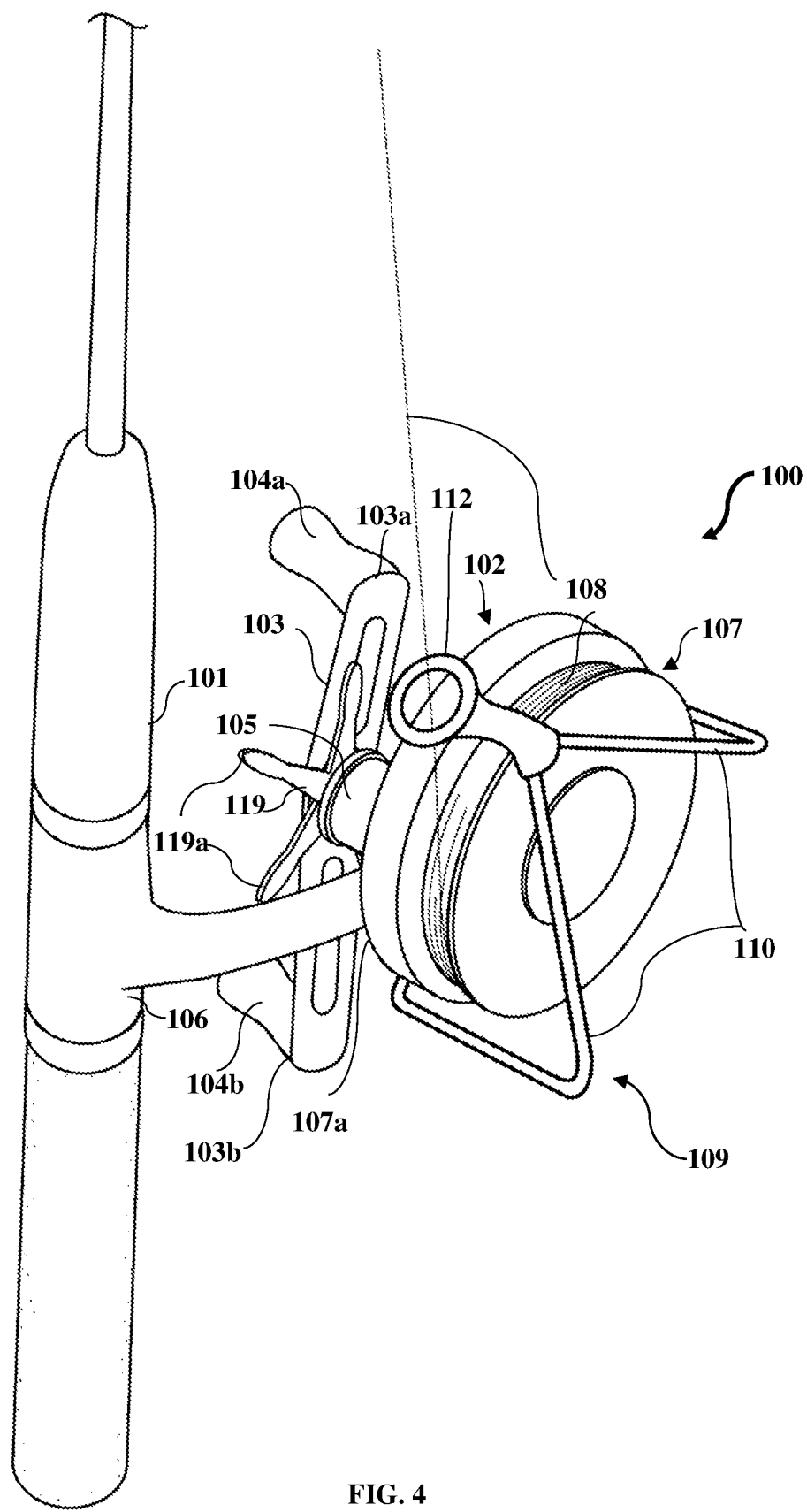
FIG. 4 exemplarily illustrates a perspective view of an embodiment of the fishing reel, showing an adjustable friction drag element for adjusting an amount of drag on a fishing line.

FIG. 4 exemplarily illustrates a perspective view of an embodiment of the fishing reel 100, showing the adjustable friction drag element 119 for adjusting an amount of drag on the fishing line 108. The adjustable friction drag element 119 configured, for example, as a star-shaped drag element, is operably connected to the drag system 125 built into the system 201 of gears accommodated in the reel body 102 exemplarily illustrated in FIG. 7. In an embodiment, the adjustable friction drag element 119 is disposed in front of the turning handle 103 and is operably connected to the drag system 125 via the pivot 105 as exemplarily illustrated in FIG. 4. The pivot 105 is configured, for example, as a stem of the turning handle 103. The adjustable friction drag element 119 is coaxially attached to the pivot 105 as exemplarily illustrated in FIG. 4. The fishing reel 100 configured with the star-shaped adjustable friction drag element 119 operates as a star drag reel. When tightened, the adjustable friction drag element 119 applies pressure to the drag system 125 comprising the washers 125a and 125b exemplarily illustrated in FIG. 2. To adjust the amount of drag on the fishing line 108 wound around the spool 107, the adjustable friction drag element 119 is manually rotated and tightened against an internal spring (not shown) which pushes against the washers 125a and 125b of the drag system 125 that rub together to provide friction to the fishing line 108. Pressure applied by the tightening of the adjustable friction drag element 119 determines the amount of friction provided to the fishing line 108.

The main gear 126 and the washers 125a and 125b of the drag system 125 are mounted onto a main drive shaft (not shown) of the reel body 102. The main gear 126 is in engageable communication with the spool hub gear 129 mounted on the spool axle 128 as exemplarily illustrated in FIGS. 6-7. When the turning handle 103 of the fishing reel 100 is cranked, the turning handle 103 drives the main gear 126 which rotates the spool hub gear 129 attached to the spool axle 128, which then rotates the spool 107. When the adjustable friction drag element 119 is tightened, the adjustable friction drag element 119 applies pressure against the stack of washers 125a and 125b in the drag system 125. The applied pressure is transferred from the washers 125a and 125b and the main gear 126 to the spool hub gear 129 that controls the spool 107 via the spool axle 128. The transferred pressure allows the spool 107 to slip and deliver the fishing line 108 when the drag system 125 is in use. When a fish pulls hard against the fishing line 108, the washers 125a and 125b slip against each other allowing the fishing line 108 to flow off of the spool 107.

An operator of the fishing reel 100, for example, an angler, manually turns the adjustable friction drag element 119 to increase or decrease the amount of friction created or drag applied to the fishing line 108. In an example, turning the adjustable friction drag element 119 forward increases the amount of friction created or drag applied to the fishing line 108, while turning the adjustable friction drag element 119 backward decreases the amount of friction created or drag applied to the fishing line 108. By increasing the drag, more force is required to pull the fishing line 108 from the reel body 102 when the fishing line 108 is being reeled onto the spool 107. The spool 107 is configured to turn in a reverse direction when force is applied thereto by an outward pull of the fishing line 108 to overcome a friction drag tension adjustment. The friction drag tension adjustment is made below a breaking point of the fishing line 108 to allow a large fish to pull the fishing line 108 from the spool 107 rather than allowing the fish to break the fishing line 108. By allowing fish to pull the fishing line 108, the adjustable friction drag element 119 alleviates extreme pressures on the fishing line 108, the fishing rod 101, and the angler.

Figure 5A:
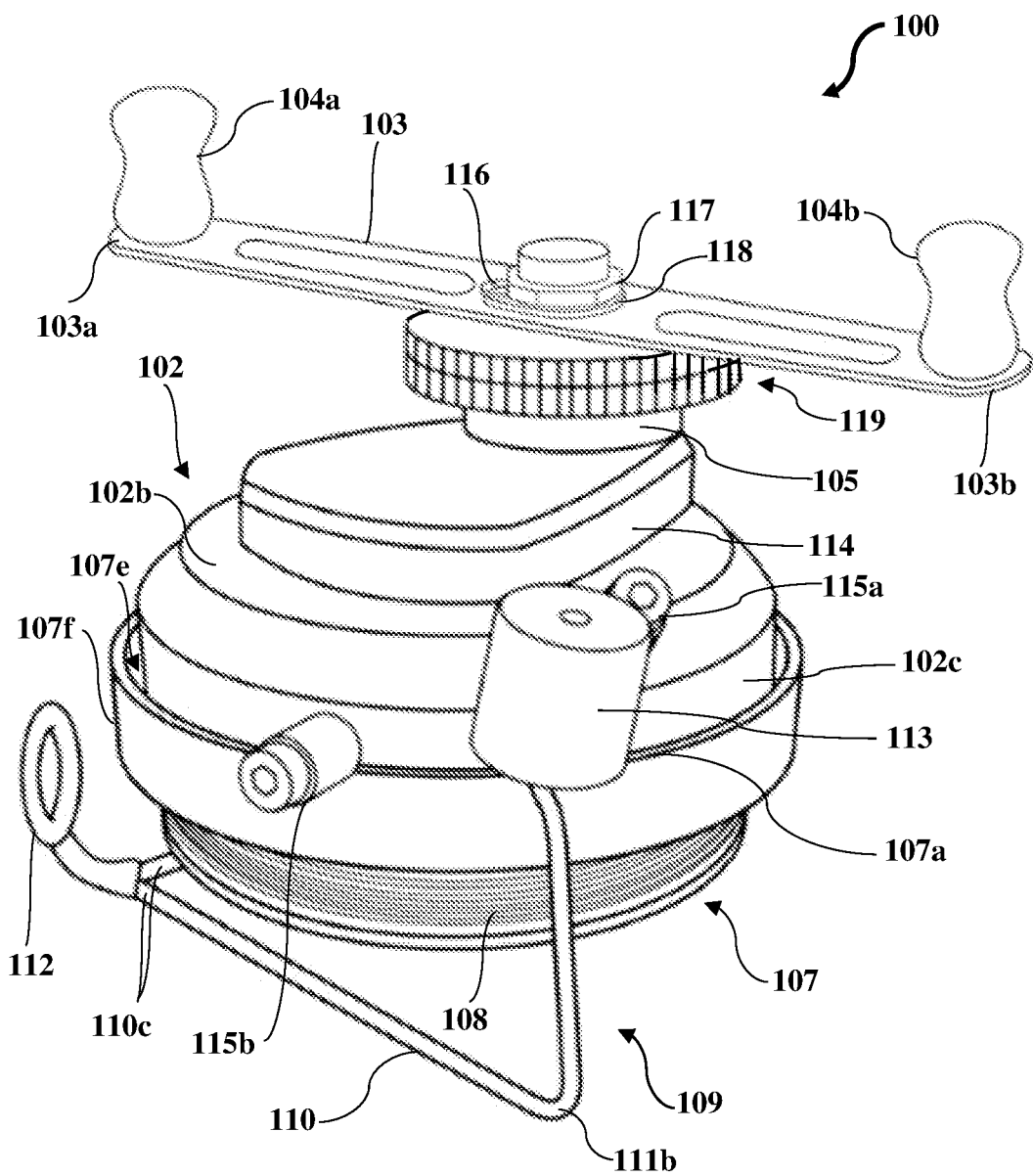
FIG. 5A exemplarily illustrates a perspective, assembled view of an underside of an embodiment of the fishing reel, showing an embodiment of the adjustable friction drag element.

FIG. 5A exemplarily illustrates a perspective, assembled view of an underside of an embodiment of the fishing reel 100, showing an embodiment of the adjustable friction drag element 119. In this embodiment, the adjustable friction drag element 119 is configured as a circular-shaped wheel that allows convenient handling and operation of the adjustable friction drag element 119 during fishing. The adjustable friction drag element 119 is coaxially connected between the turning handle 103 and the pivot 105. The adjustable friction drag element 119 rotates about the pivot 105. The pivot 105 is attached to the frame cover 114 of the reel body 102. FIG. 5A shows the line transfer mechanism 109 in the retrieve mode, where the plane of the eye member 112 is substantially parallel to the periphery 107f of the spool 107.

Figure 5B:
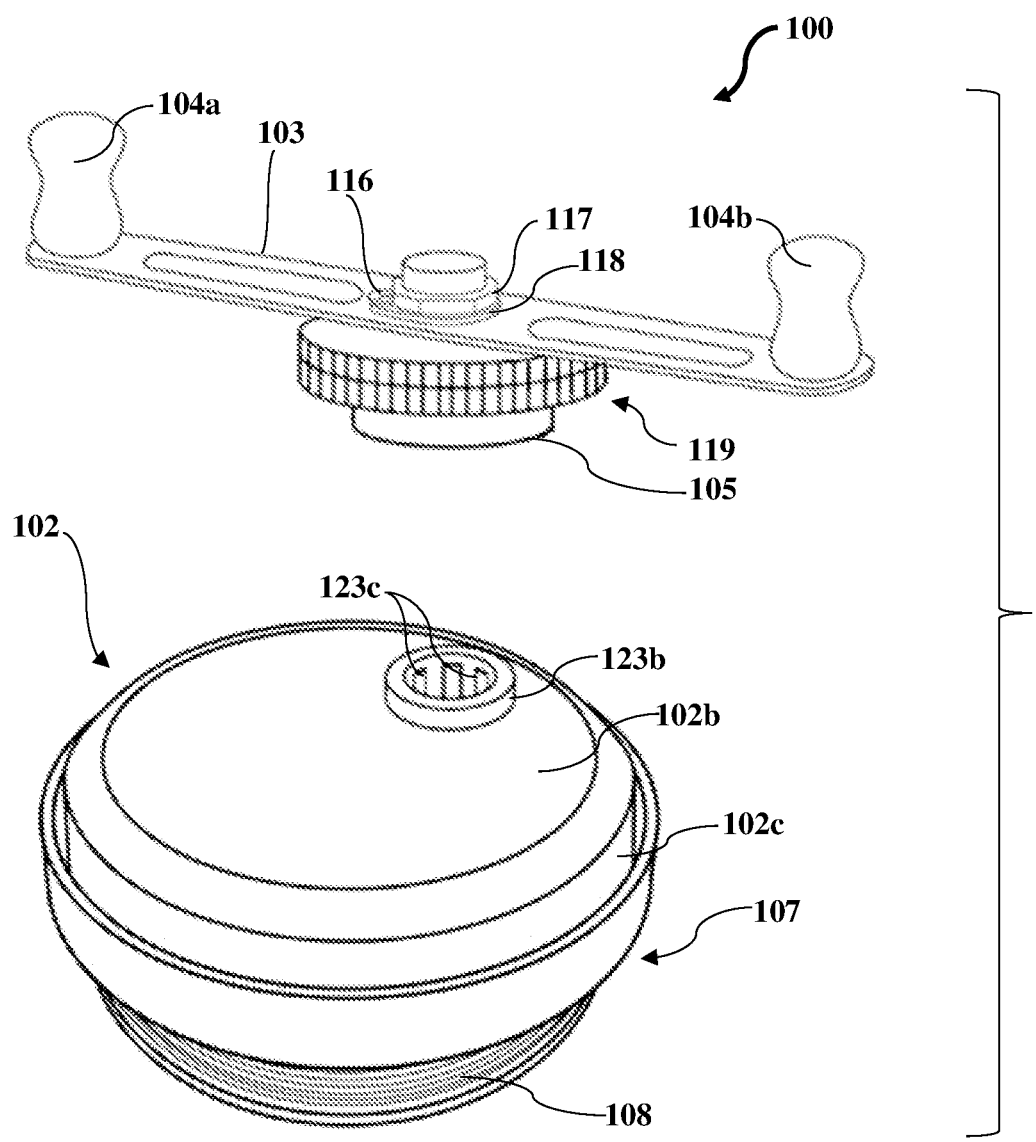
FIG. 5B exemplarily illustrates a perspective view showing an embodiment of an outer ring of a one-way directional bearing disposed on a surface of a reel body and configured as an anti-reverse mechanism for disallowing movement of a turning handle in a reverse direction.

FIG. 5B exemplarily illustrates a perspective view showing an embodiment of an outer ring 123b of the one-way directional bearing 122 disposed on the second surface 102b of the reel body 102 and configured as an anti-reverse mechanism for disallowing movement of the turning handle 103 in a reverse direction. In an embodiment, the one-way directional bearing 122 comprising the inner ring 123a and the outer ring 123b exemplarily illustrated in FIG. 2, is concealed by the frame cover 114 of the reel body 102 exemplarily illustrated in FIG. 5A. In an embodiment, the one-way directional bearing 122 is disposed on a second surface 102b of the reel body 102, opposite to a first surface 102a of the reel body 102 exemplarily illustrated in FIG. 6. The one-way directional bearing 122 is offset from the center of the reel body 102. The one-way directional bearing 122 is configured to disallow movement of the turning handle 103 in a reverse direction. As exemplarily illustrated in FIG. 5B, the outer ring 123b comprises wedges 123c configured to engage with the outer surface of the inner ring 123a and allow movement of the inner ring 123a in one direction while locking the inner ring 123a in the opposing direction. The one-way directional bearing 122 transmits torque in one rotational direction while terminating transmission of the torque in the opposite or reverse direction. The one-way directional bearing 122, therefore, allows the turning handle 103 to rotate in one direction and precludes rotation of the turning handle 103 or any of the moving components of the fishing reel 100 in a reverse direction opposing the one direction.

Figure 5C:
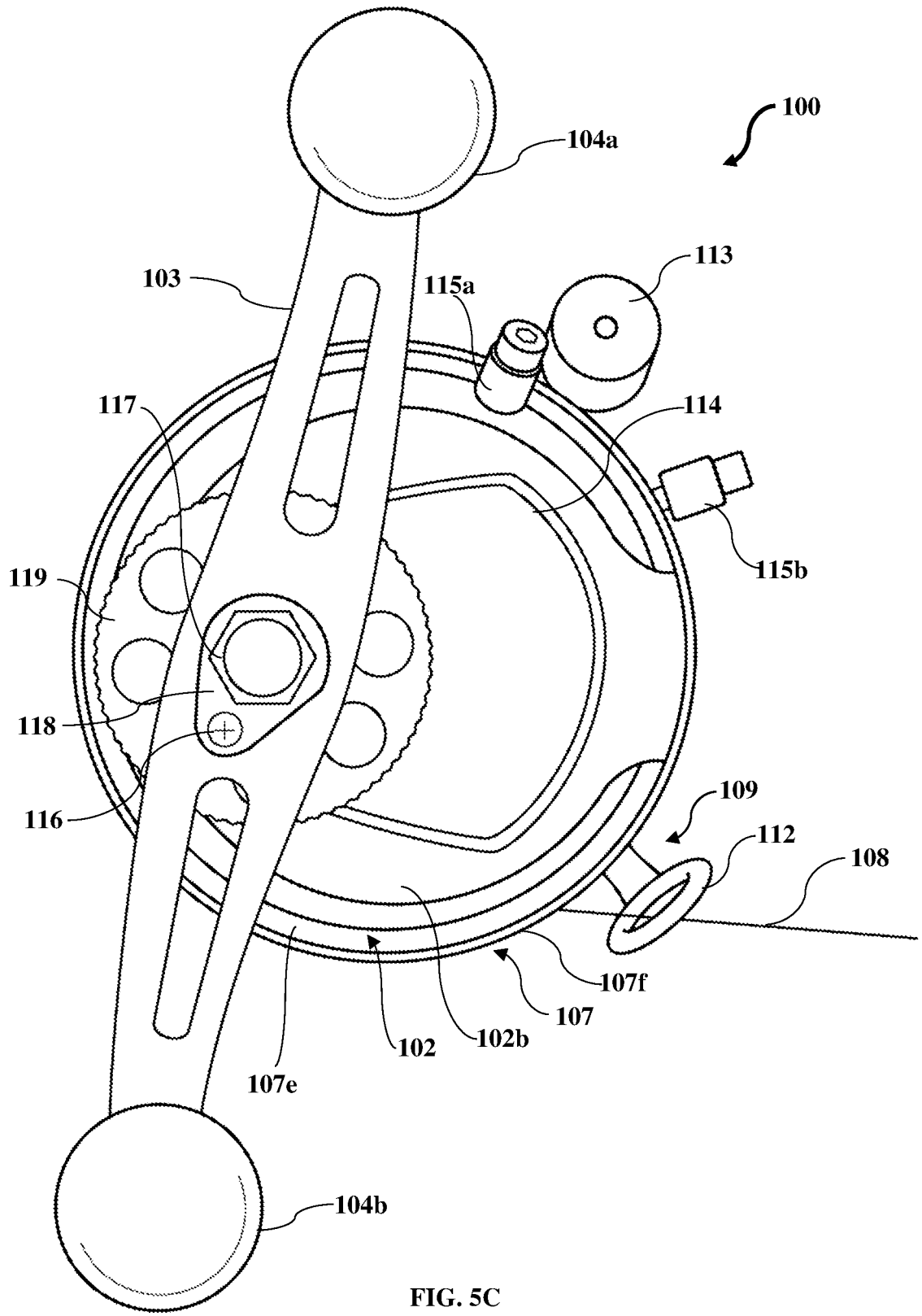
FIG. 5C exemplarily illustrates a bottom elevation view of the underside of an embodiment of the fishing reel in the retrieve mode.

FIG. 5C exemplarily illustrates a bottom elevation view of the underside of an embodiment of the fishing reel 100 in the retrieve mode. The connection of the turning handle 103 to the reel body 102 via a circular-shaped, adjustable friction drag element 119 is exemplarily illustrated in FIG. 5C. The turning handle 103 is centrally attached to the pivot 105 exemplarily illustrated in FIG. 5A, via the adjustable friction drag element 119 using the nut 117, the washer 118, and the fastener 116. The position of the stopper 113 adjacent to the peg 115a indicates the retrieve mode of the line transfer mechanism 109 as disclosed in the description of FIGS. 3A-3B. FIG. 5C shows the line transfer mechanism 109 in the retrieve mode, where the eye member 112 is disposed substantially perpendicular to the direction of the fishing line 108. Furthermore, the plane of the eye member 112 is substantially parallel to the periphery 107f of the spool 107 in the retrieve mode.

FIG. 6 exemplarily illustrates a perspective view of the reel body 102 of an embodiment of the fishing reel 100 in the cast mode. The reel body 102 comprises a first surface 102a and a second surface 102b. The turning handle 103 is disposed proximal to the second surface 102b of the reel body 102 as exemplarily illustrated in FIGS. 3A-3B and FIG. 5C. FIG. 6 shows the first surface 102a of the reel body 102 on which the spool 107 is to be disposed. Rotational motion produced from rotating the turning handle 103 is transmitted to the main gear 126 housed in the reel body 102 via the pivot 105 and the bearings 121, 122, and 124 exemplarily illustrated in FIG. 2. The spool axle 128 protrudes through an opening 102h in the reel body 102 as exemplarily illustrated in FIG. 6. The spool hub gear 129 is attached to a lower end 128c of the spool axle 128. The spool hub gear 129 is in engageable communication with the main gear 126 as exemplarily illustrated in FIG. 6, and receives rotational motion from the main gear 126 as disclosed in the description of FIG. 7. FIG. 6 shows the line transfer mechanism 109 in the cast mode, where the eye member 112 is offset at an angle with respect to a plane of the reel body 102.

FIG. 7 exemplarily illustrates the system 201 of gears accommodated in the reel body 102 of an embodiment of the fishing reel 100. As exemplarily illustrated in FIG. 7, the main gear 126 is in engageable communication with the spool hub gear 129. The rotation of the main gear 126 caused by the rotation of the turning handle 103 exemplarily illustrated in FIGS. 3A-3B, causes rotation of the spool hub gear 129. The rotation of the spool hub gear 129 imparts rotational motion to the spool axle 128 over which the spool 107 is disposed, thereby causing rotation of the spool 107. The gears 126 and 129 are configured to impart a turning motion to the spool 107 causing the fishing line 108 to be retrieved.

Also exemplarily illustrated in FIG. 7 is the drag system 125 built into the system 201 of gears. The drag system 125 comprising the washers 125a and 125b exemplarily illustrated in FIG. 2, is operably connected to the main gear 126, which in engageable communication with the spool hub gear 129. The spool hub gear 129 imparts a turning motion to the spool 107 when the fishing reel 100 is in the retrieve mode as disclosed above. The drag system 125 is in operable communication with the adjustable friction drag element 119 exemplarily illustrated in FIG. 2, FIGS. 3A-3B, and FIG. 4. When tightened, the adjustable friction drag element 119 applies pressure on the drag system 125. Pressure applied by the tightening of the adjustable friction drag element 119 determines the amount of friction provided to the fishing line 108. The drag system 125 creates friction and adjusts an amount of drag on the fishing line 108 wound around the spool 107 as disclosed in the description of FIG. 4.

Figure 8:
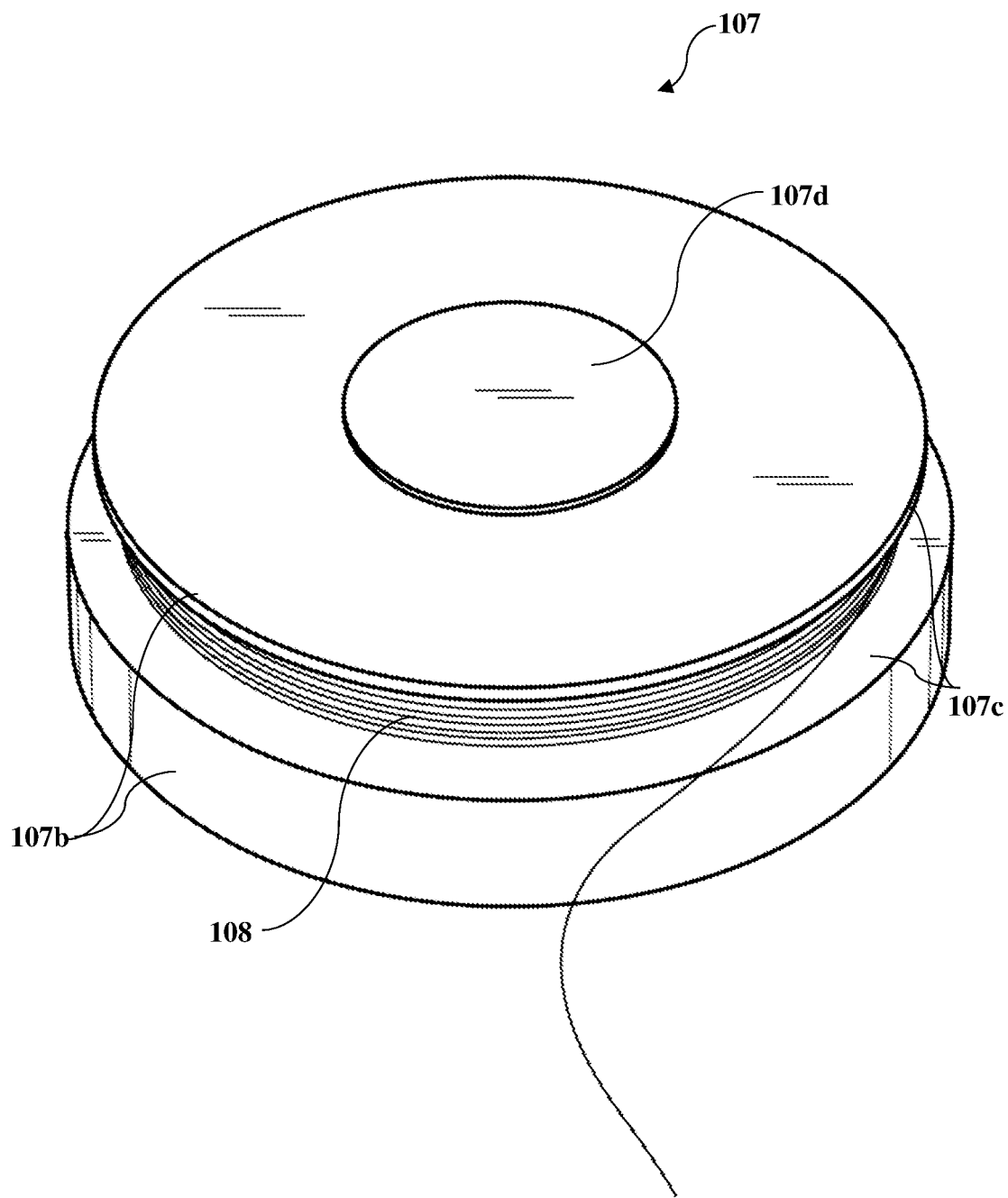
FIG. 8 exemplarily illustrates an embodiment of a spool configured to be disposed on the reel body of the fishing reel.

FIG. 8 exemplarily illustrates an embodiment of the spool 107 configured to be disposed in the reel body 102 of the fishing reel 100. In an embodiment as exemplarily illustrated in FIG. 8, the spool 107 is a skirted spool configured to prevent the fishing line 108 that is wound around the spool 107, from falling behind and under the spool 107 in the cast mode and the retrieve mode. In an embodiment, the skirting 107b is provided on one or both the opposing ends 107c of the spool 107. In an embodiment, the center attachment 107d of the spool 107 is flat and not tapered as exemplarily illustrated in FIG. 8, to preclude the fishing line 108 from catching and entangling on the central attachment 107d.

Figure 9:
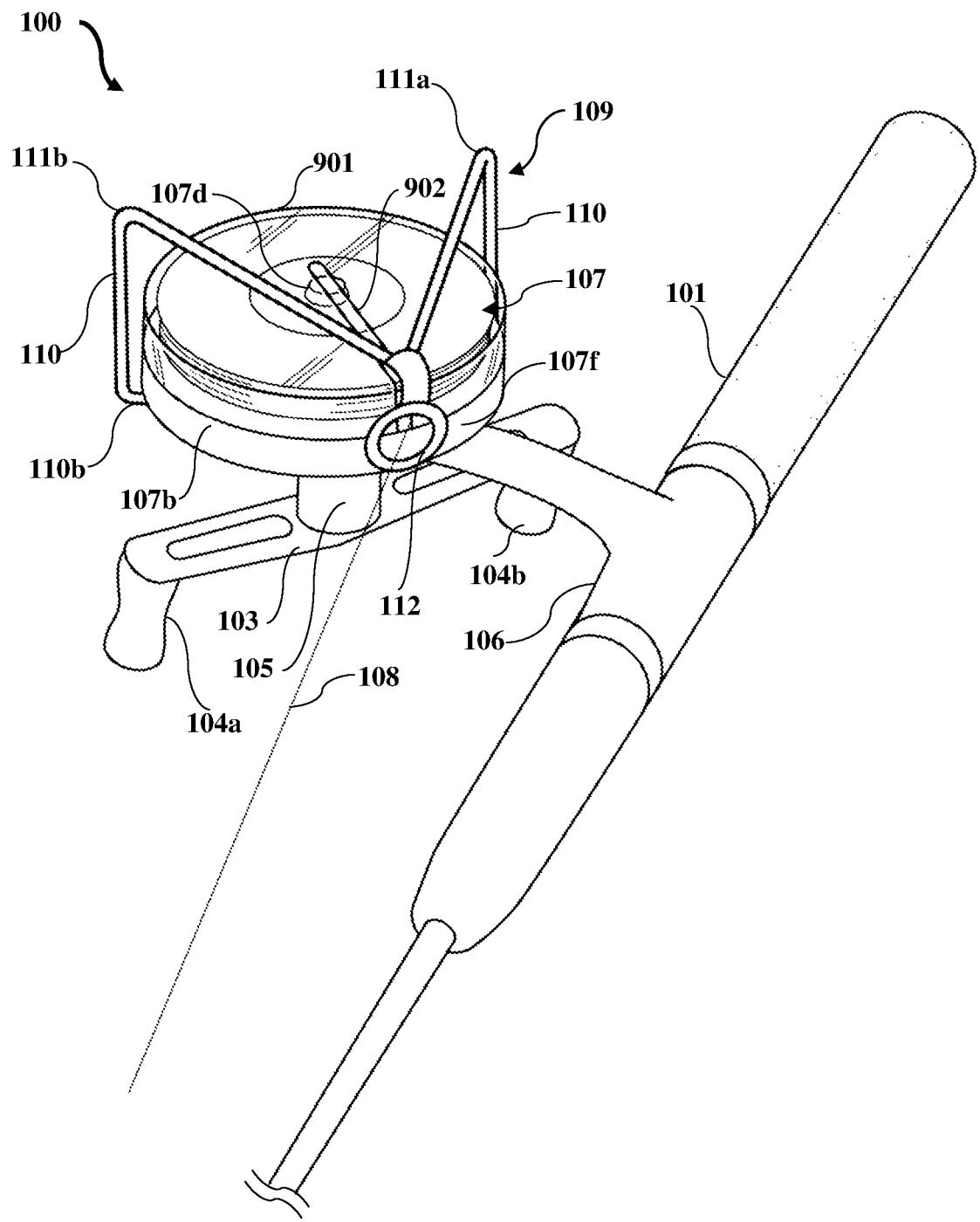
FIG. 9 exemplarily illustrates a perspective view of an embodiment of the fishing reel, showing a slotted cover configured to enclose the spool of the fishing reel.

FIG. 9 exemplarily illustrates a perspective view of an embodiment of the fishing reel 100, showing a slotted cover 901 configured to enclose the spool 107 of the fishing reel 100. In an embodiment, the fishing reel 100 further comprises a slotted cover 901 configured to enclose the spool 107. The spool 107 comprises a central attachment 107d configured, for example, as a recessed knob, and disposed at the center of the spool 107. The central attachment 107d is configured with a low tapered profile to preclude the fishing line 108 from catching and entangling on the central attachment 107d. The slotted cover 901 is stationary and in an embodiment, is attached to the reel body 102 below the skirting 107b of the spool 107. In another embodiment, the slotted cover 901 is attached to the skirting 107b of the spool 107 as exemplarily illustrated in FIG. 9. The spool 107 revolves under the slotted cover 901 on the reel body 102. The slotted cover 901 comprises a slot 902 configured to allow the fishing line 108 to travel from the retrieve mode to the cast mode, without entanglement of the fishing line 108. The slot 902 disallows the fishing line 108 from changing direction and twisting, thereby precluding entanglement of the fishing line 108. The slotted cover 901 is disposed such the slot 902 allows the fishing line 108 to travel to the edge of the spool 107 on which the fishing line 108 is to be wound with the fishing line 108 never touching or being affected by the slotted cover 901. FIG. 9 shows the line transfer mechanism 109 in the retrieve mode, where the eye member 112 is disposed substantially perpendicular to the direction of the fishing line 108. Furthermore, the plane of the eye member 112 is substantially parallel to the periphery 107f of the spool 107 in the retrieve mode.

Figure 10A:
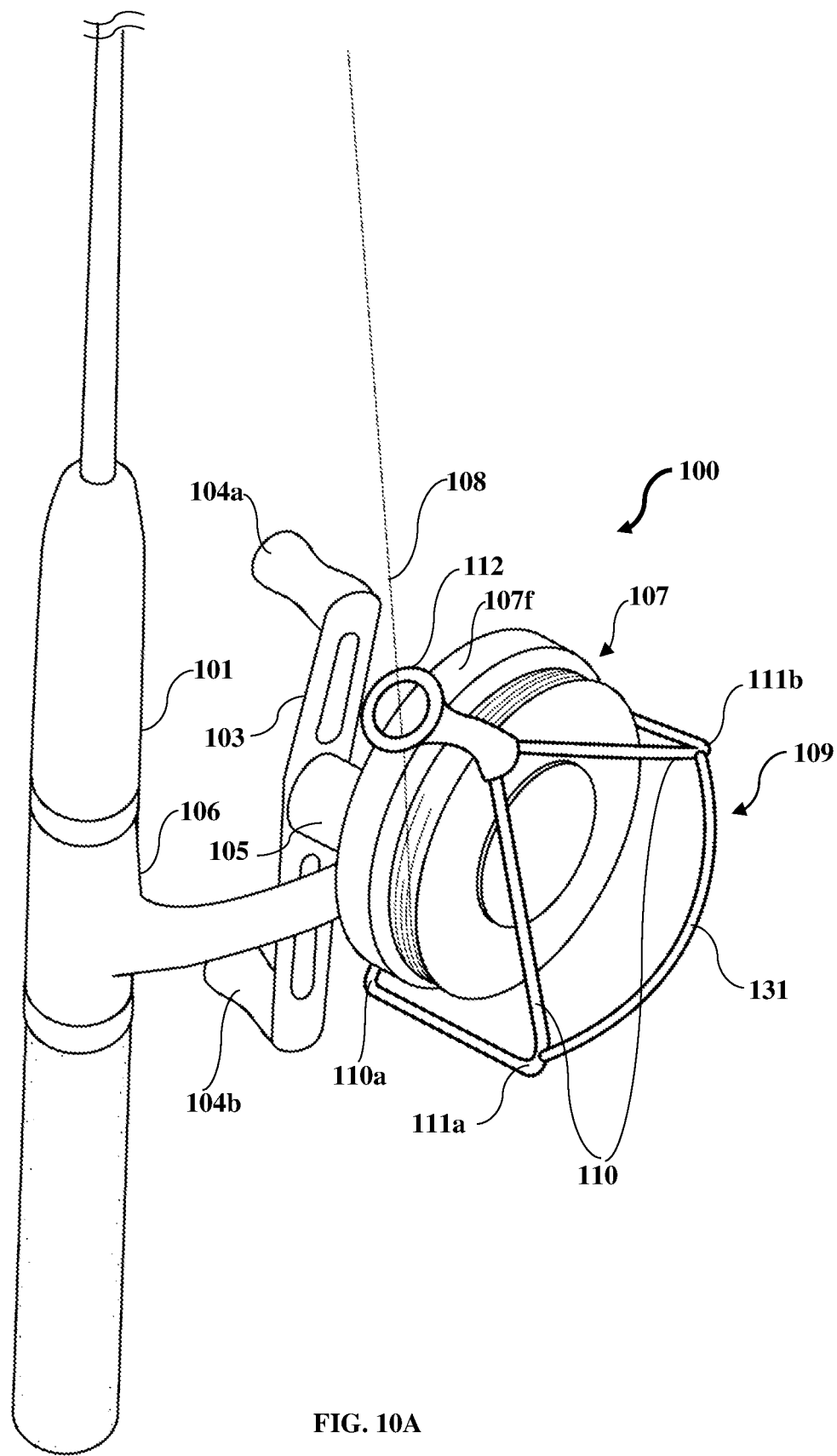
FIGS. 10A-10C exemplarily illustrate perspective views of an embodiment of the fishing reel with the line transfer mechanism comprising a line guard, in the retrieve mode.
Figure 10B:
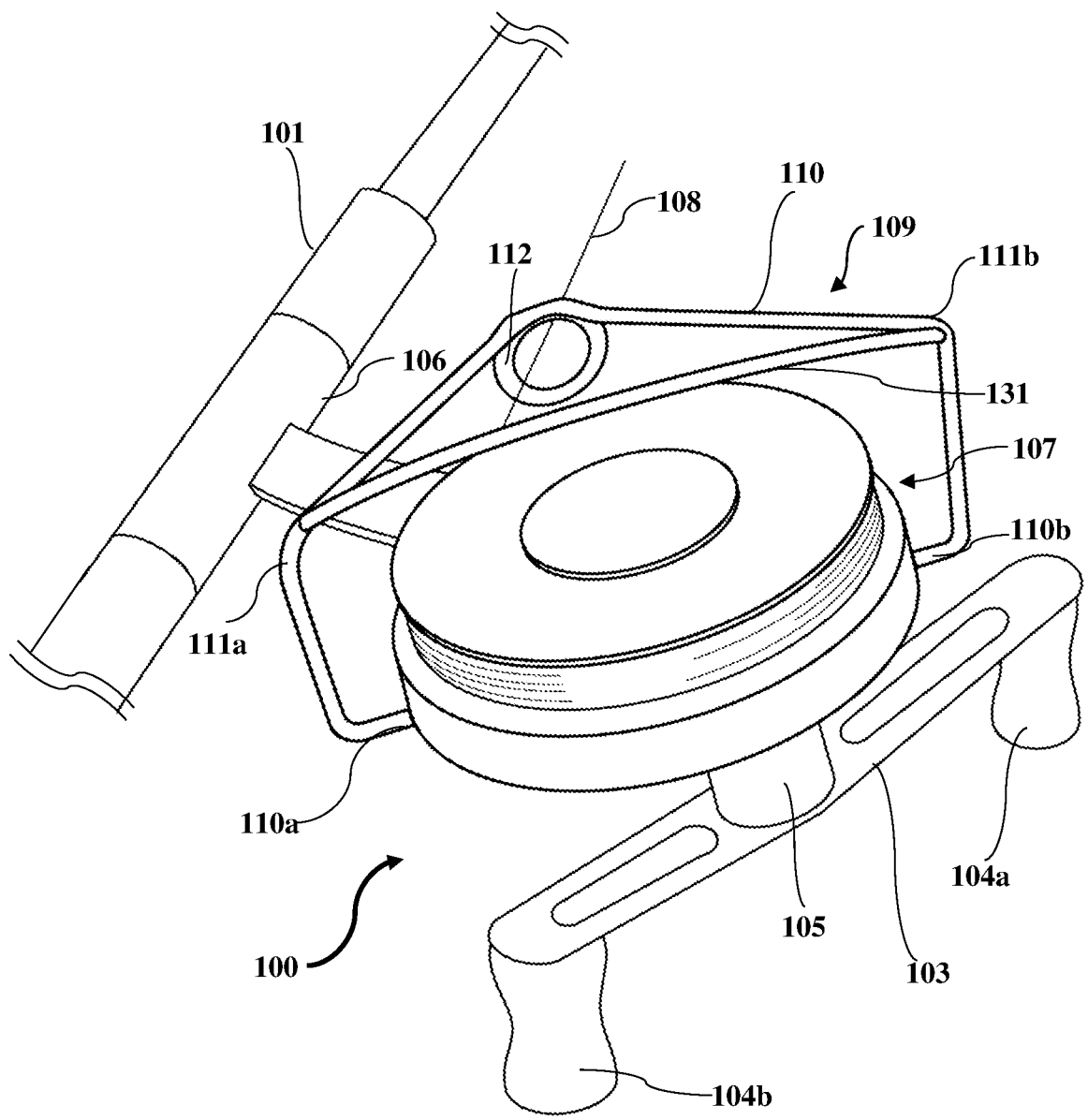
Figure 10C:
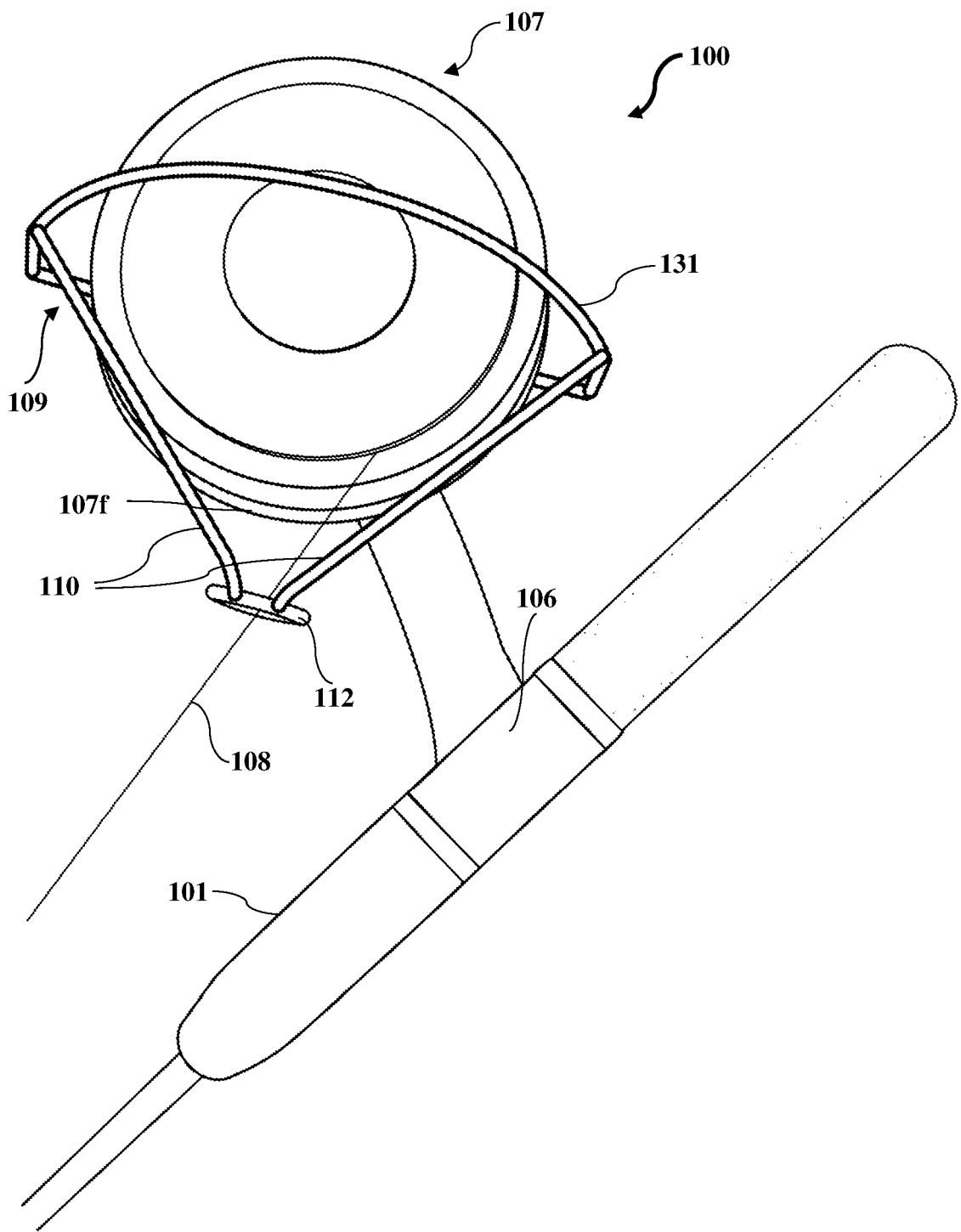

FIGS. 10A-10C exemplarily illustrate perspective views of an embodiment of the fishing reel 100 with the line transfer mechanism 109 comprising a line guard 131, in the retrieve mode. In this embodiment, the line guard 131 extends between the angled bend 111a proximal to the first end 110a and the angled bend 111b proximal to the second end 110b of the line transfer arm 110. The line guard 131 is configured to preclude the fishing line 108 from entanglement in the cast mode and the retrieve mode. The line guard 131 is configured as a bar connecting the two angled bends 111a and 111b to prevent line entanglement on the angled bends 111a and 111b. The line guard 131 prevents the fishing line 108 that flows during a cast from catching on corners created by the angled bends 111a and 111b in the line transfer arm 110. With the line guard 131, the corners created by the angled bends 111a and 111b of the line transfer arm 110 are not available to catch the flowing fishing line 108. FIGS. 10A-10C show the line transfer mechanism 109 in the retrieve mode, where the eye member 112 is disposed substantially perpendicular to the direction of the fishing line 108. Furthermore, the plane of the eye member 112 is substantially parallel to the periphery 107f of the spool 107 in the retrieve mode. The line transfer arm 110 has the eye member 112 disposed at the edge of the spool 107 where the fishing line 108 is being wound during retrieve such that the fishing line 108 passes through the eye member 112 without friction. The eye member 112 directs and guides the fishing line 108 and assists in maintaining the position of the fishing line 108.

Figure 11:
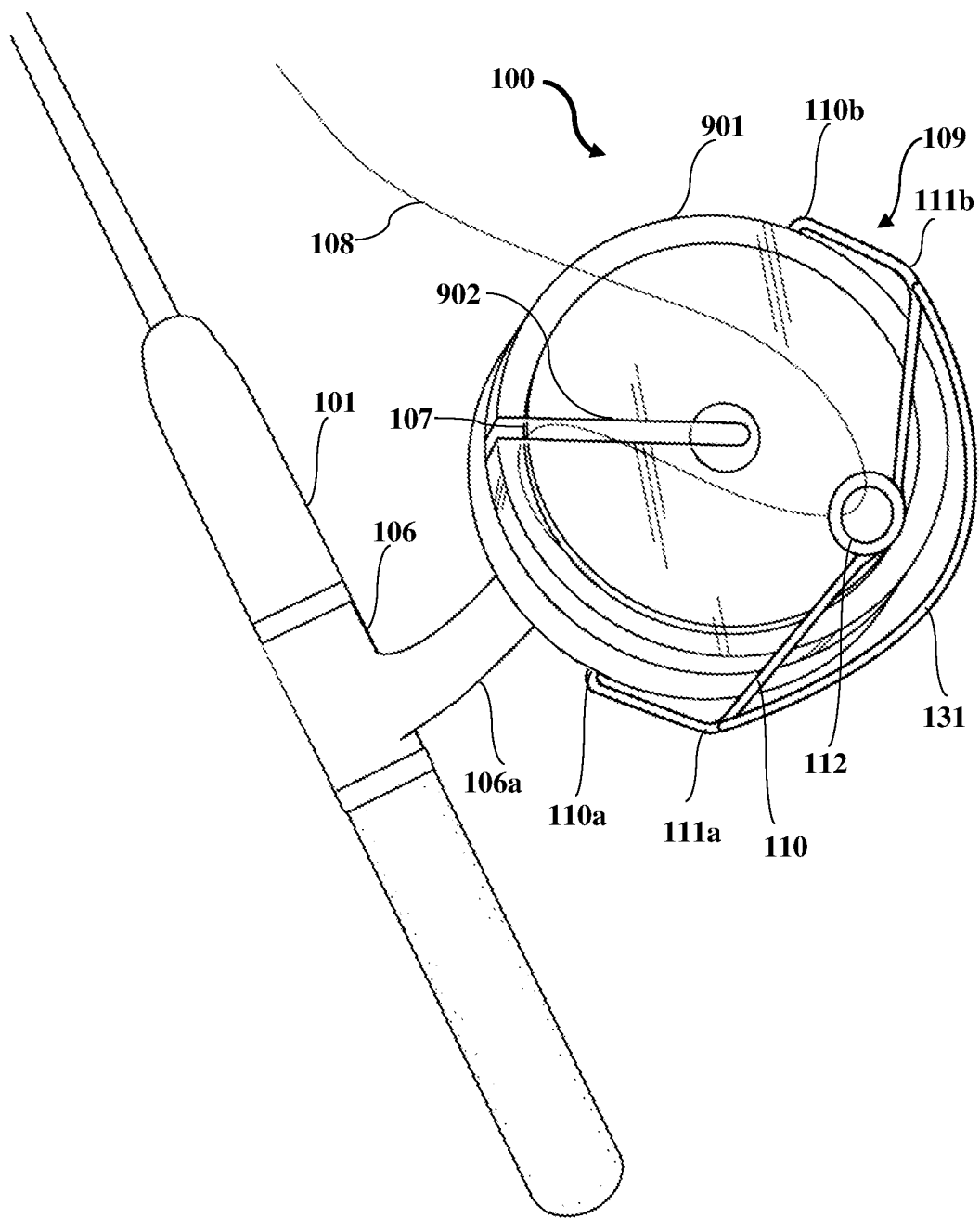
FIG. 11 exemplarily illustrates a perspective view of an embodiment of the fishing reel, showing positions of the slotted cover and the line transfer mechanism with the line guard in the cast mode.

FIG. 11 exemplarily illustrates a perspective view of an embodiment of the fishing reel 100, showing positions of the slotted cover 901 and the line transfer mechanism 109 with the line guard 131 in the cast mode. In this embodiment, the line transfer mechanism 109 comprises the line guard 131 extending between the angled bend 111a proximal to the first end 110a and the angled bend 111b proximal to the second end 110b of the line transfer arm 110. Furthermore, in this embodiment, the fishing reel 100 comprises the slotted cover 901 that encloses the spool 107. The slot 902 in the slotted cover 901 allows the fishing line 108 to travel from the retrieve mode to the cast mode, without entanglement of the fishing line 108. The line transfer mechanism 109 with the line guard 131 extends over and above the slotted cover 901. FIG. 11 shows the line transfer mechanism 109 in the cast mode, where the eye member 112 is offset at an angle with respect to a plane of the fishing reel 100.

Figure 12A:
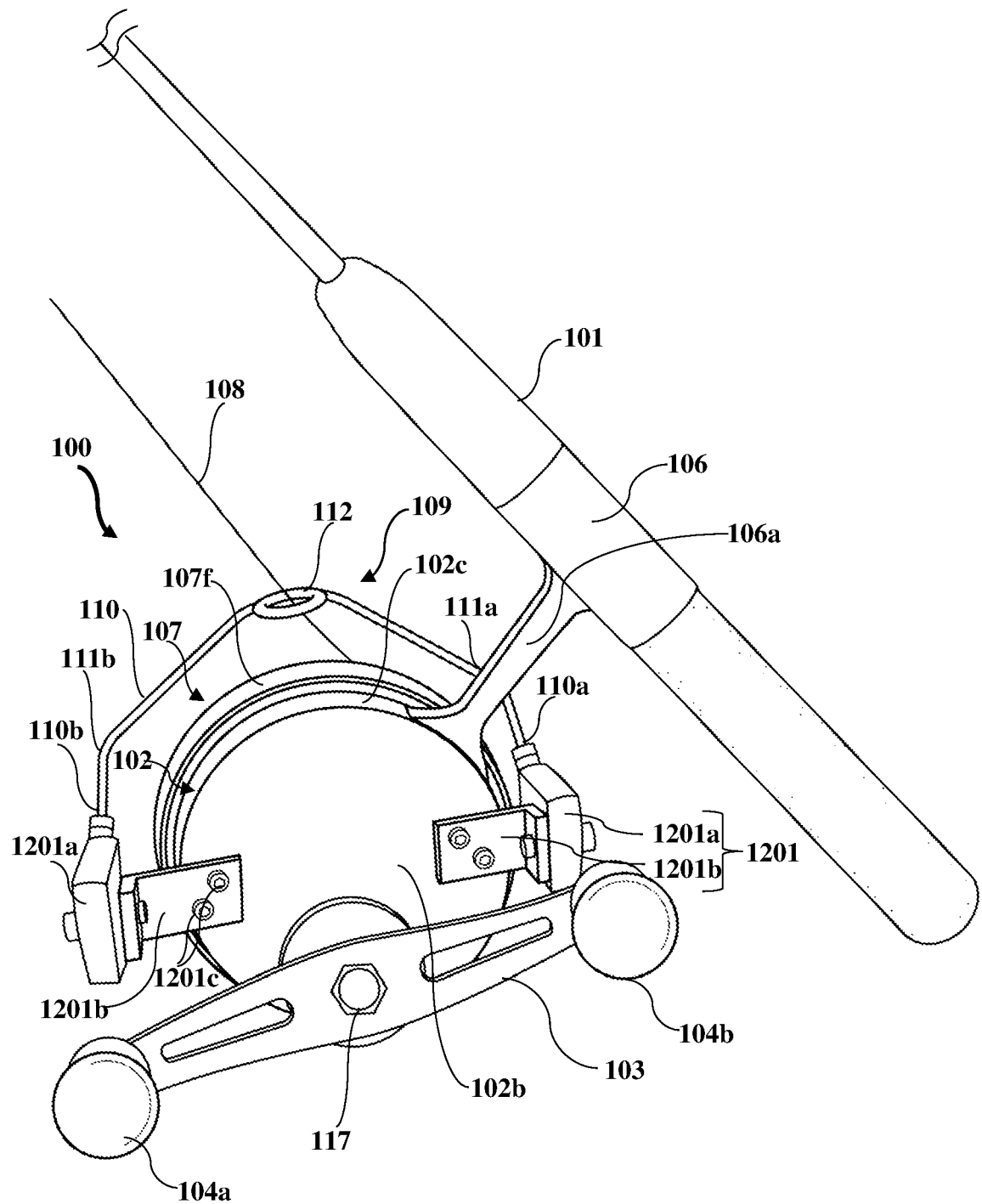
FIGS. 12A-12B exemplarily illustrate perspective views of an embodiment of the fishing reel, showing connection assemblies configured to pivotably connect the line transfer mechanism to the reel body of the fishing reel.
Figure 12B:
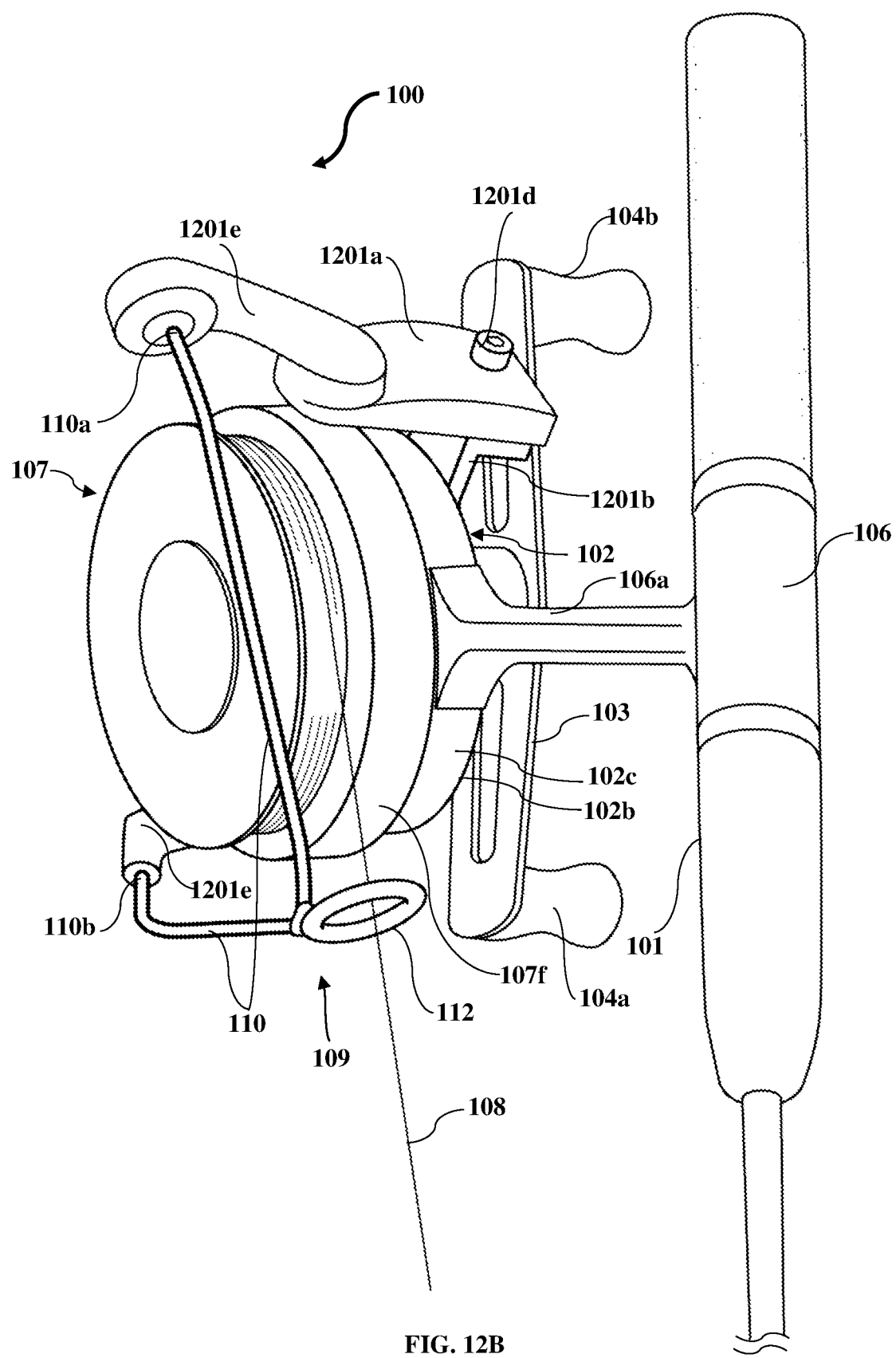

FIGS. 12A-12B exemplarily illustrate perspective views of an embodiment of the fishing reel 100, showing connection assemblies 1201 configured to pivotably connect the line transfer mechanism 109 to the reel body 102 of the fishing reel 100. The connection assemblies 1201 connect the line transfer arm 110 of the line transfer mechanism 109 to the reel body 102 and allow the line transfer arm 110 to pivot about the reel body 102 for selectively transferring the fishing line 108 between the cast mode and the retrieve mode. In an embodiment, each of the connection assemblies 1201 comprises a mount support element 1201a and an L-shaped fastening element 1201b. The L-shaped fastening element 1201b fastens the mount support element 1201a to the second surface 102b of the reel body 102 using fasteners 1201c, for example, screws, as exemplarily illustrated in FIG. 12A. The mount support element 1201a extends upwardly from the L-shaped fastening element 1201b as exemplarily illustrated in FIG. 12B. The mount support element 1201a is rigidly attached to the L-shaped fastening element 1201b using a fastener 1201d, for example, a screw, as exemplarily illustrated in FIG. 12B. The first end 110a and the second end 110b of the line transfer arm 110 are connected to arms 1201e extending from the mount support elements 1201a of the respective connection assemblies 1201. In an embodiment, the arms 1201e are pivotably connected to the mount support elements 1201a of the connection assemblies 1201 to allow toggling of the line transfer mechanism 109 for selectively transferring the fishing line 108 between the cast mode and the retrieve mode. FIGS. 12A-12B show the line transfer mechanism 109 in the retrieve mode, where the eye member 112 is disposed substantially perpendicular to the direction of the fishing line 108. Furthermore, the plane of the eye member 112 is substantially parallel to the periphery 107f of the spool 107 in the retrieve mode.

Figure 13A:
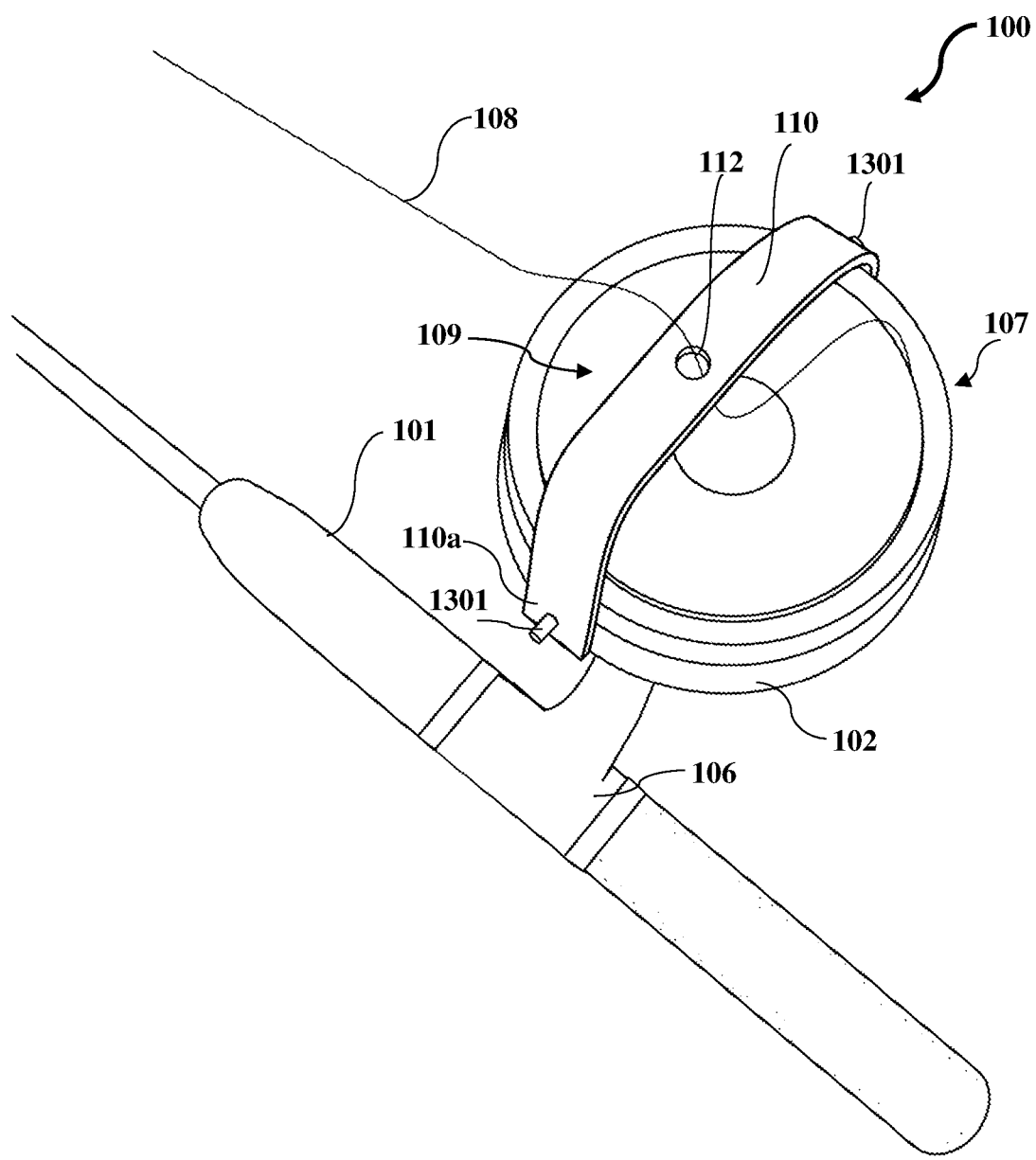
FIGS. 13A-13B exemplarily illustrate perspective views of the fishing reel, showing an embodiment of the line transfer mechanism in the cast mode and the retrieve mode respectively.
Figure 13B:
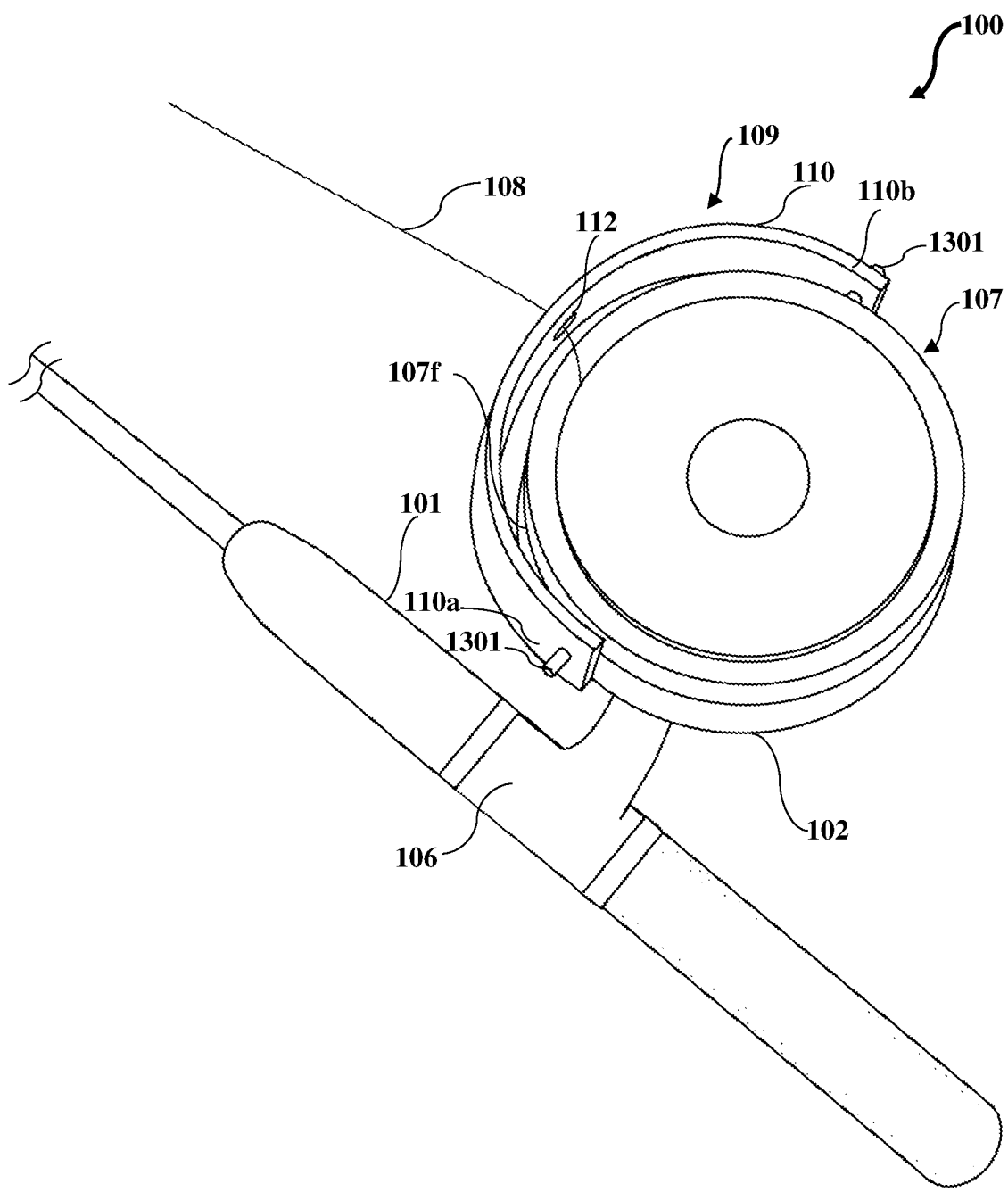

FIGS. 13A-13B exemplarily illustrate perspective views of the fishing reel 100, showing an embodiment of the line transfer mechanism 109 in the cast mode and the retrieve mode respectively. In this embodiment, the first end 110a and the second end 110b of the line transfer arm 110 are free of angled bends for direct attachment to the reel body 102. The line transfer arm 110 is configured, for example, as a continuous hemispherical arm. In this embodiment, the first end 110a and the second end 110b of the line transfer arm 110 are attached directly to the reel body 102 without the use of angled bends. The eye member 112 is centrally located on the line transfer arm 110 as exemplarily illustrated in FIGS. 13A-13B. In an embodiment, the first end 110a and the second end 110b of the line transfer arm 110 are pivoted to the reel body 102, for example, using pivot pins 1301, to allow toggling of the line transfer mechanism 109 for selectively transferring the fishing line 108 between the cast mode and the retrieve mode. FIG. 13A shows the line transfer mechanism 109 in the cast mode, where the eye member 112 is offset at an angle with respect to a plane of the fishing reel 100. In an embodiment, the line transfer mechanism 109 in the cast mode is disposed substantially centrally above the spool 107 as exemplarily illustrated in FIG. 13A. FIG. 13B shows the line transfer mechanism 109 in the retrieve mode, where the eye member 112 is disposed substantially perpendicular to the direction of the fishing line 108, and where the plane of the eye member 112 is substantially parallel to the periphery 107f of the spool 107.

Figure 14A:
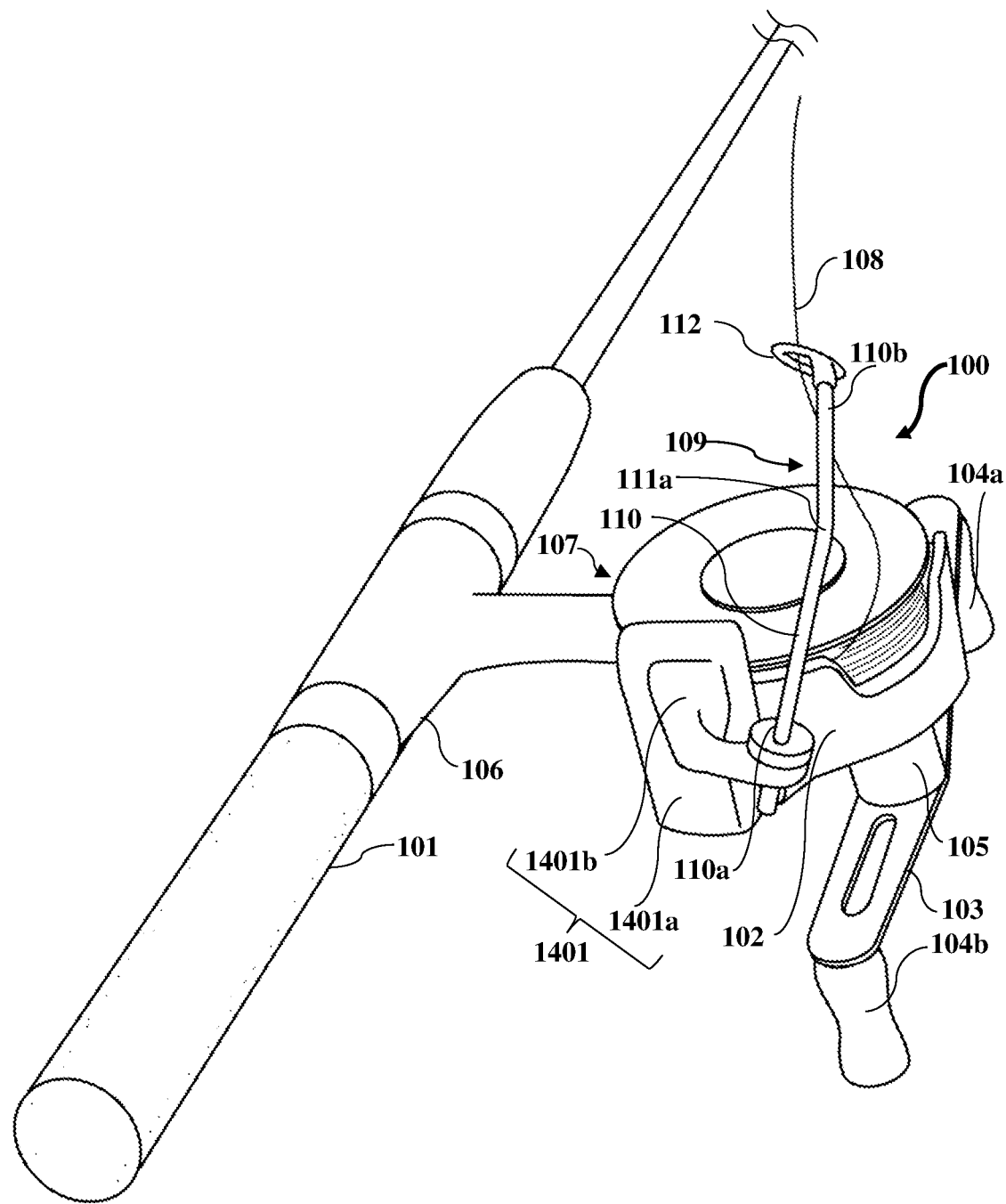
FIG. 14A exemplarily illustrates a perspective view of the fishing reel, showing an embodiment of the line transfer mechanism in the cast mode.

FIG. 14A exemplarily illustrates a perspective view of the fishing reel 100, showing an embodiment of the line transfer mechanism 109 in the cast mode. In this embodiment, the line transfer mechanism 109 is attached to one side of the reel body 102. Furthermore, in this embodiment, an angled bend 111a is configured proximal to only one end, that is, the first end 110a of the line transfer arm 110. The line transfer mechanism 109 assists in moving the fishing line 108 on and off the spool 107. In an embodiment, the predetermined location of the eye member 112 of the line transfer mechanism 109 is at the second end 110b of the line transfer arm 110. In this embodiment, the eye member 112 is attached to the second end 110b of the line transfer arm 110 with no hinge or latching mechanism and extends freely from the second end 110b. The first end 110a of the line transfer arm 110 is connected and pivoted to the reel body 102 using a connection assembly 1401, thereby hinging or latching the line transfer arm 110 at only the first end 110a of the line transfer arm 110 in this embodiment. The connection assembly 1401 comprises a mount support element 1401a and an arm 1401b. The mount support element 1401a is rigidly attached to the reel body 102 using one or more fasteners (not shown), for example, screws. In an embodiment, the arm 1401b is pivotably connected to the mount support element 1401a. The first end 110a of the line transfer arm 110 is connected to the arm 1401b, which allows toggling of the line transfer mechanism 109 for selectively transferring the fishing line 108 between the cast mode and the retrieve mode. In an embodiment, the line transfer arm 110 is configured to be manually toggled over the spool 107 of the fishing reel 100 for selectively transferring the fishing line 108 between the cast mode and the retrieve mode.

FIG. 14A shows the line transfer mechanism 109 in the cast mode, where the eye member 112 is offset at an angle with respect to a plane of the fishing reel 100. In the cast mode, the line transfer mechanism 109 allows the fishing line 108 to unwind from the spool 107. In an embodiment, the line transfer arm 110 is locked in position in the fishing reel 100 in the cast mode using, for example, a spring/cam mechanism (not shown) operating within the connection assembly 1401. The spring/cam mechanism operating within the connection assembly 1401 is a standard two-position mechanism used to lock the line transfer arm 110 on the reel body 102. The spring/cam mechanism in the connection assembly 1401 uses a spring that compresses between two relaxed positions, that is, two holding positions, namely, the cast mode and the retrieve mode. In this embodiment, the connection assembly 1401 operates as a locking mechanism to lock the line transfer arm 110 in the cast mode.

Figure 14B:
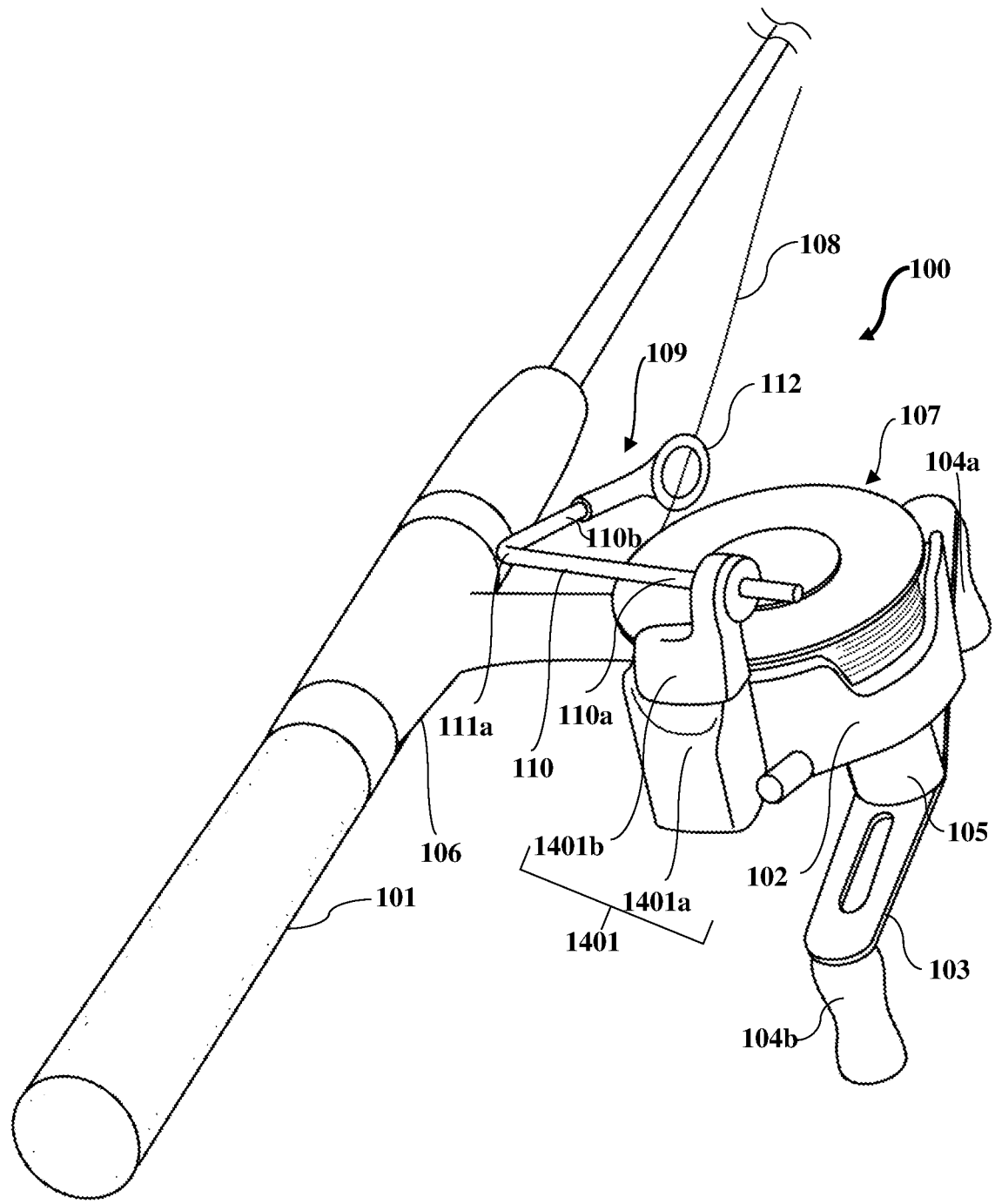
FIGS. 14B-14C exemplarily illustrate perspective views of the fishing reel, showing the embodiment of the line transfer mechanism in FIG. 14A, in the retrieve mode.
Figure 14C:
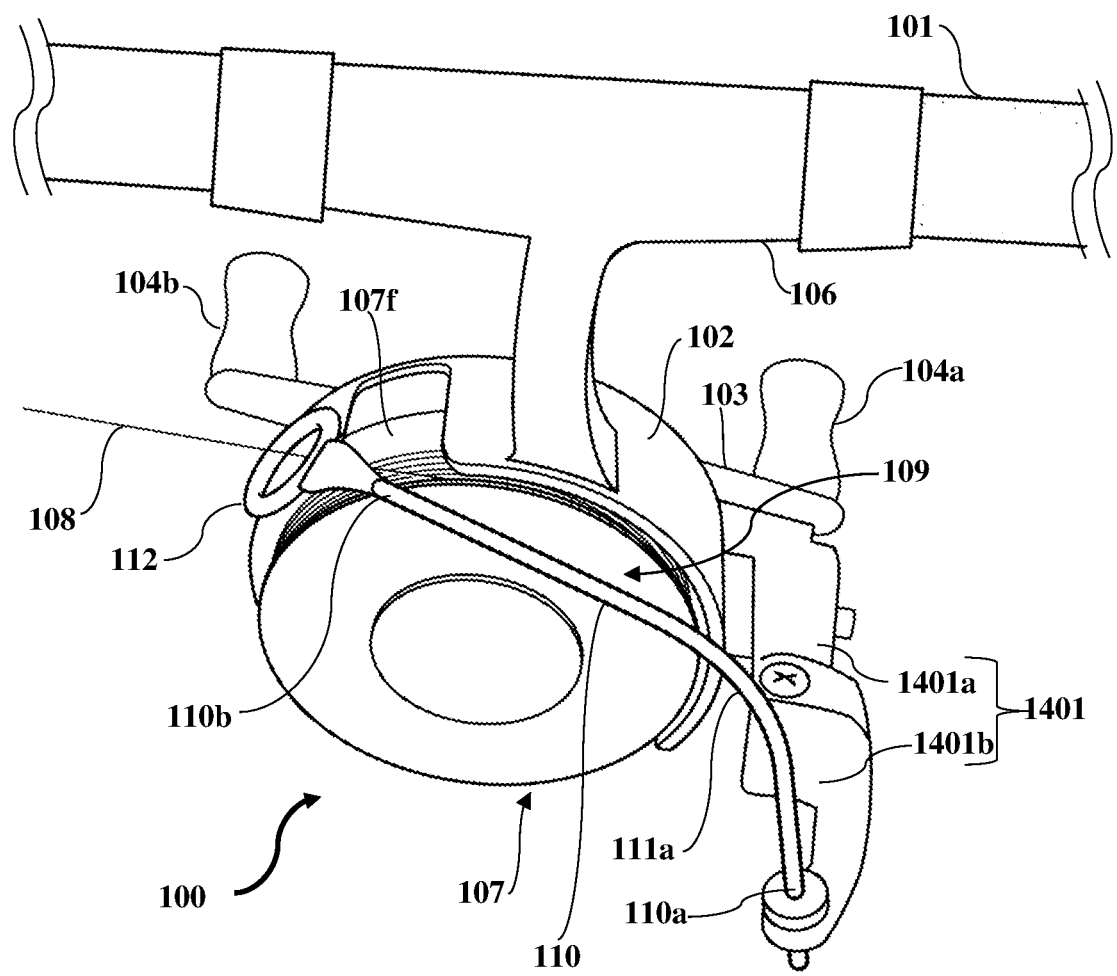

FIGS. 14B-14C exemplarily illustrate perspective views of the fishing reel 100, showing the embodiment of the line transfer mechanism 109 in FIG. 14A, in the retrieve mode. To transfer the fishing line 108 from the cast mode exemplarily illustrated in FIG. 14A to the retrieve mode exemplarily illustrated in FIGS. 14B-14C, the arm 1401b of the connection assembly 1401 is moved upwardly from the mount support element 1401a as exemplarily illustrated in FIGS. 14B-14C. This upward movement toggles the line transfer arm 110 from the cast mode to the retrieve mode. FIGS. 14B-14C show the line transfer mechanism 109 in the retrieve mode, where the eye member 112 is disposed substantially perpendicular to the direction of the fishing line 108, and where the plane of the eye member 112 is substantially parallel to the periphery 107f of the spool 107 as exemplarily illustrated in FIG. 14C. In the retrieve mode, the line transfer mechanism 109 guides the fishing line 108 back onto the spool 107 of the fishing reel 100. In an embodiment, the line transfer arm 110 is locked in position in the fishing reel 100 in the retrieve mode using, for example, a spring/cam mechanism (not shown) operating within the connection assembly 1401. In this embodiment, the connection assembly 1401 operates as a locking mechanism to lock the line transfer arm 110 in the retrieve mode.

Figure 15A:
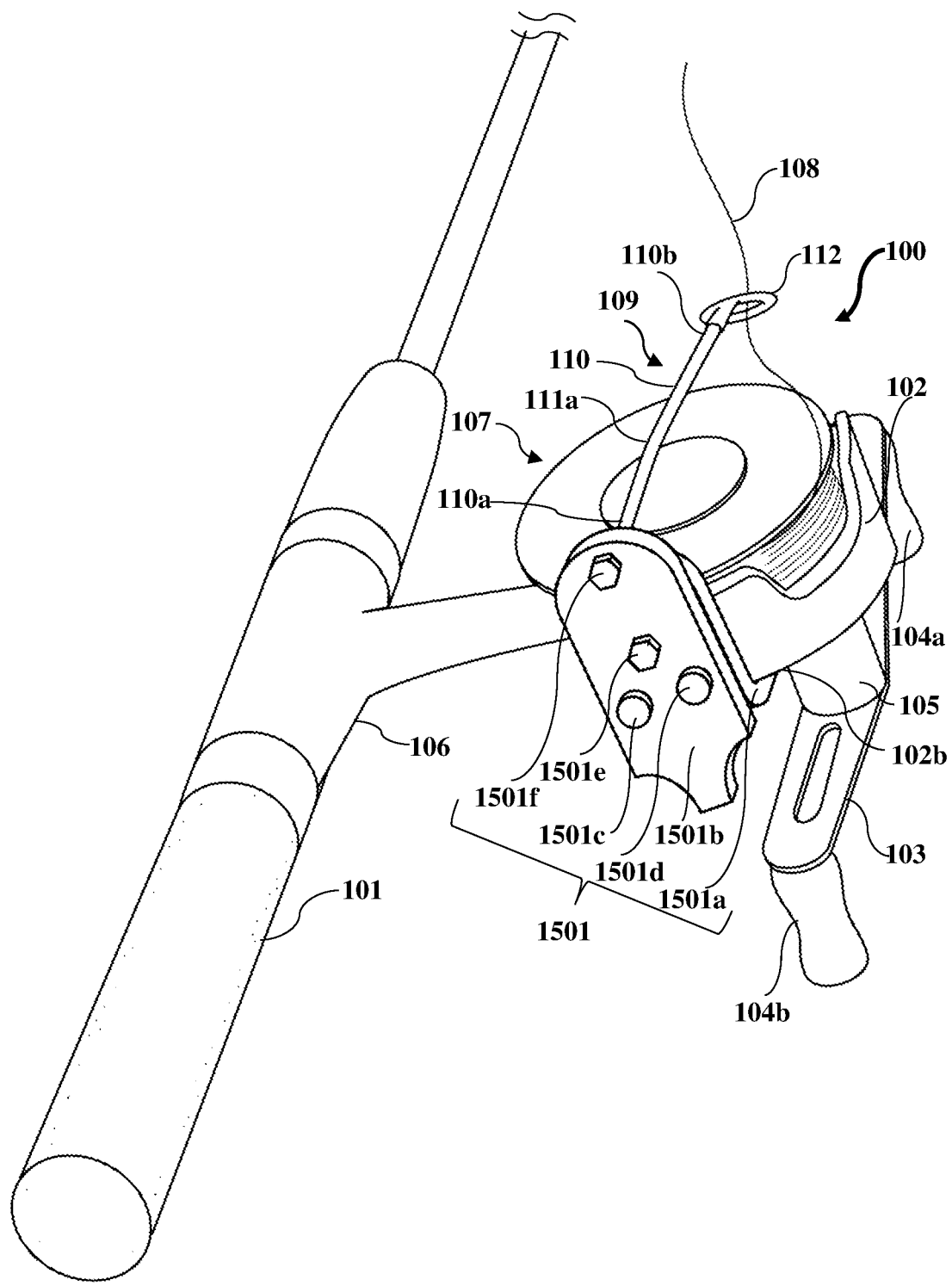
FIGS. 15A-15B exemplarily illustrate perspective views of the fishing reel, showing an embodiment of the line transfer mechanism locked in the cast mode.
Figure 15B:
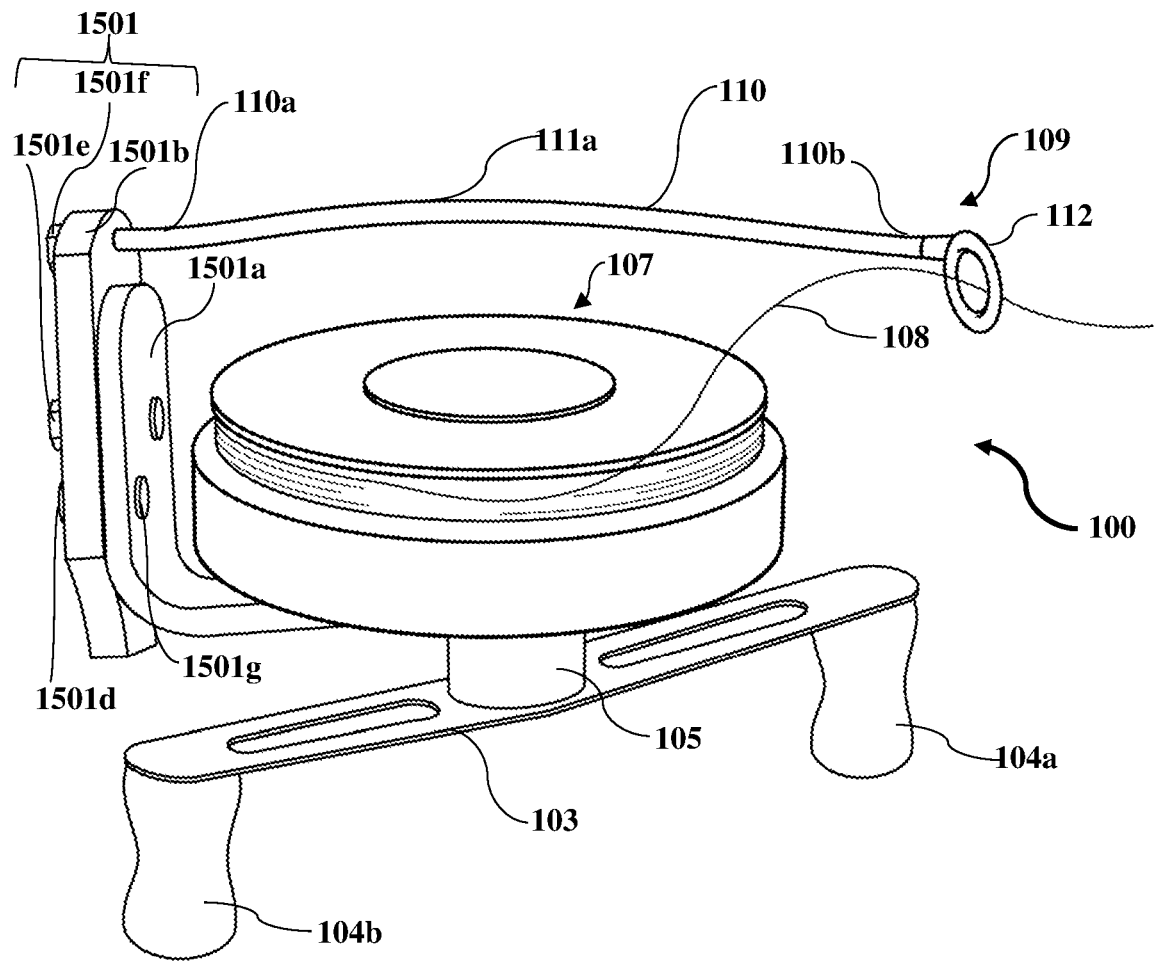

FIGS. 15A-15B exemplarily illustrate perspective views of the fishing reel 100, showing an embodiment of the line transfer mechanism 109 locked in the cast mode. In this embodiment, the eye member 112 of the line transfer mechanism 109 is attached to the second end 110b of the line transfer arm 110 and extends freely from the second end 110b. Furthermore, in an embodiment, the length of the line transfer arm 110 is shorter than the length shown in FIGS. 15A-15B. In an embodiment, the first end 110a of the line transfer arm 110 is connected and pivoted to the reel body 102 using a latching mechanism 1501. In this embodiment, the latching mechanism 1501 comprises an L-shaped fastening element 1501a and a mount support element 1501b. The mount support element 1501b and the L-shaped fastening element 1501a form two facing plates pivoting upon each other, where each plate comprises one or more embedded magnets 1501c, 1501d, and 1501g configured to secure the line transfer arm 110 in position when toggled to and from the cast mode and the retrieve mode. For example, the mount support element 1501b comprises two embedded magnets 1501c and 1501d as exemplarily illustrated in FIG. 15A and FIG. 15C, while the L-shaped fastening element 1501a comprises one embedded magnet 1501g as exemplarily illustrated in FIG. 15B and FIG. 15D. The L-shaped fastening element 1501a and the mount support element 1501b are made, for example, from plastic. The L-shaped fastening element 1501a fastens the mount support element 1501b to the second surface 102b of the reel body 102 using fasteners (not shown), for example, screws. The mount support element 1501b extends upwardly from the L-shaped fastening element 1501a as exemplarily illustrated in FIG. 15B. The mount support element 1501b is pivotably connected to the L-shaped fastening element 1501a using a fastener 1501e, for example, a central mounted screw, as exemplarily illustrated in FIGS. 15A-15C. The mount support element 1501b interfaces with and pivots against the fixed L-shaped fastening element 1501a. The fastener 1501e passes through the L-shaped fastening element 1501a and the mount support element 1501b.

The magnets 1501c, 1501d, and 1501g embedded in both the mount support element 1501b and the L-shaped fastening element 1501a hold the mount support element 1501b and the L-shaped fastening element 1501a firmly to each other until the mount support element 1501b is physically moved from the cast mode to the retrieve mode and vice versa. The first end 110a of the line transfer arm 110 is connected to the mount support element 1501b using a fastener 1501f, for example, a threaded screw. The line transfer arm 110 extends outwardly from the mount support element 1501b. The pivoted connection of the mount support element 1501b to the L-shaped fastening element 1501a allows toggling of the line transfer mechanism 109 for selectively transferring the fishing line 108 between the cast mode and the retrieve mode. The magnets 1501c, 1501d, and 1501g embedded in the mount support element 1501b and the L-shaped fastening element 1501a of the latching mechanism 1501 lock the line transfer arm 110 in position in the cast mode or the retrieve mode. FIGS. 15A-15B show the line transfer mechanism 109 in the cast mode, where the eye member 112 is offset at an angle with respect to a plane of the fishing reel 100.

Figure 15C:
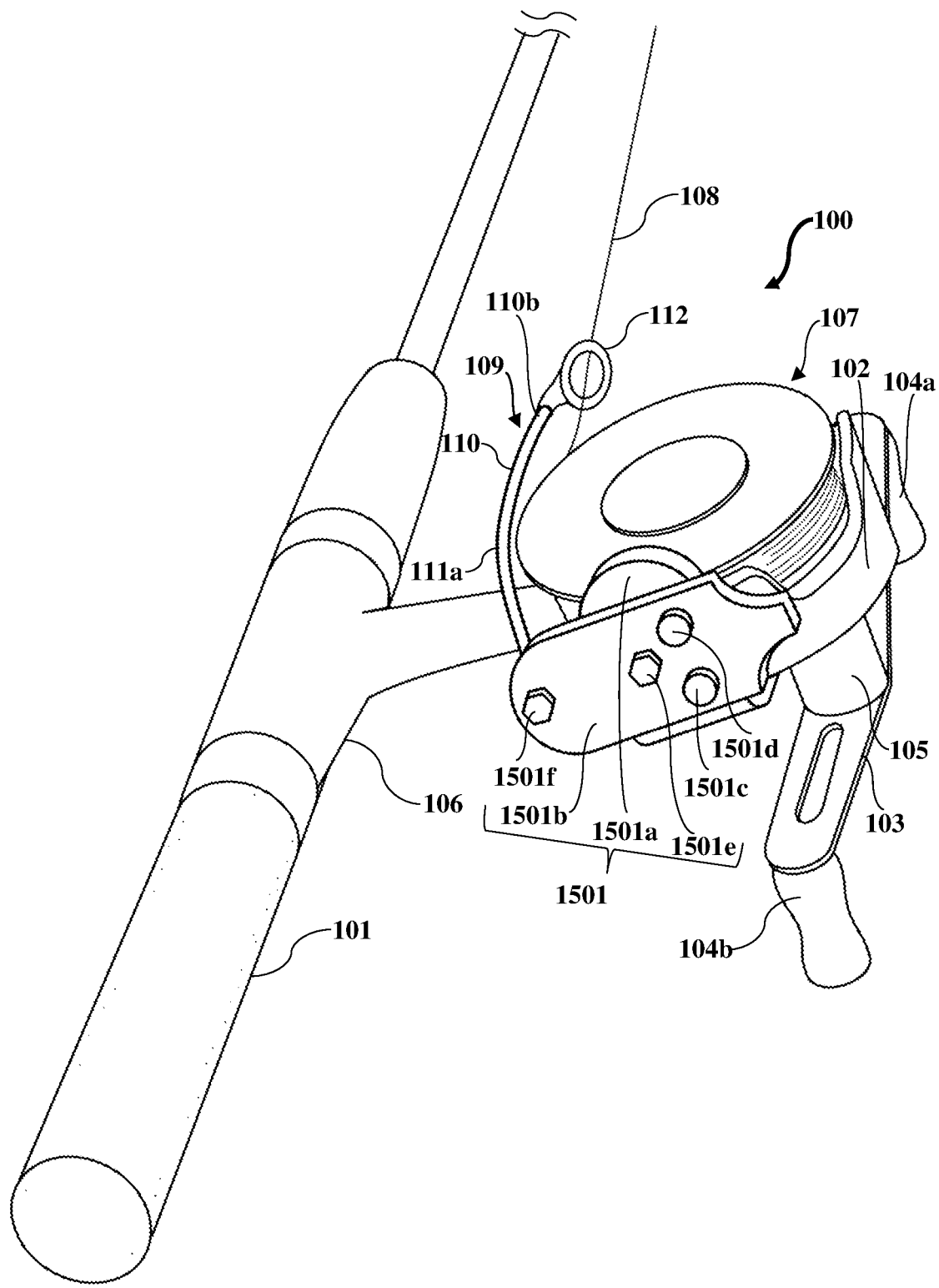
FIGS. 15C-15D exemplarily illustrate perspective views of the fishing reel, showing an embodiment of the line transfer mechanism locked in the retrieve mode.
Figure 15D:
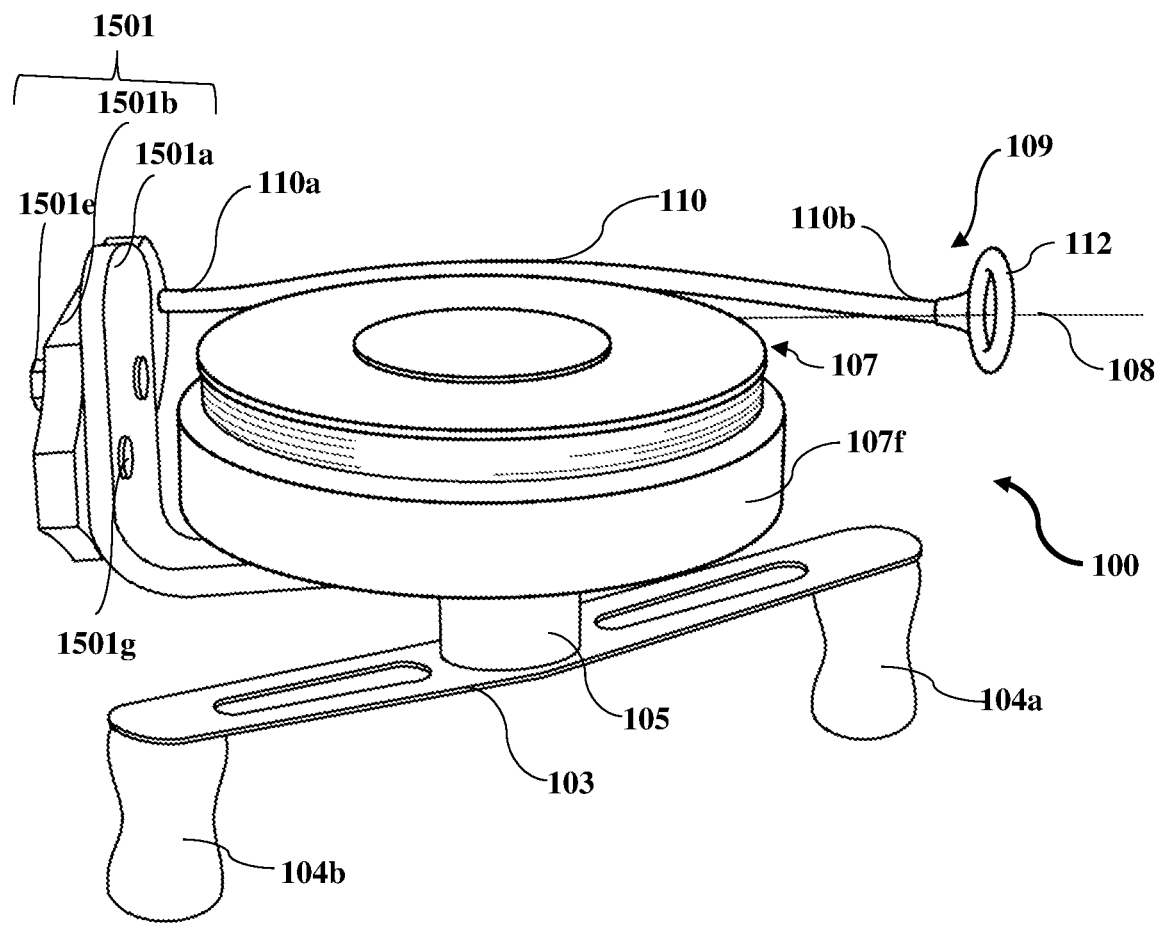

FIGS. 15C-15D exemplarily illustrate perspective views of the embodiment of the fishing reel 100, showing the embodiment of the line transfer mechanism 109 locked in the retrieve mode. To transfer the fishing line 108 from the cast mode exemplarily illustrated in FIGS. 15A-15B to the retrieve mode exemplarily illustrated in FIGS. 15C-15D, the mount support element 1501b of the latching mechanism 1501 is moved laterally to lie perpendicular to the L-shaped fastening element 1501a via the pivoted connection between the mount support element 1501b and the L-shaped fastening element 1501a as exemplarily illustrated in FIGS. 15C-15D. This lateral movement toggles the line transfer arm 110 from the cast mode to the retrieve mode. FIGS. 15C-15D show the line transfer mechanism 109 in the retrieve mode, where the eye member 112 is disposed substantially perpendicular to the direction of the fishing line 108, and where the plane of the eye member 112 is substantially parallel to the periphery 107f of the spool 107.

When the line transfer arm 110 is in the cast mode exemplarily illustrated in FIGS. 15A-15B, the magnet 1501d embedded in the mount support element 1501b of the latching mechanism 1501 magnetically attracts and contacts the magnet 1501g embedded in the L-shaped fastening element 1501a of the latching mechanism 1501 as exemplarily illustrated in FIG. 15B, thereby locking the line transfer arm 110 in position in the cast mode. When the line transfer arm 110 is toggled and disposed in the retrieve mode exemplarily illustrated in FIGS. 15C-15D, the magnet 1501c embedded in the mount support element 1501b of the latching mechanism 1501 exemplarily illustrated in FIG. 15C, magnetically attracts and contacts the magnet 1501g embedded in the L-shaped fastening element 1501a of the latching mechanism 1501 as exemplarily illustrated in FIG. 15D, thereby locking the line transfer arm 110 in position in the retrieve mode.

Figure 16A:
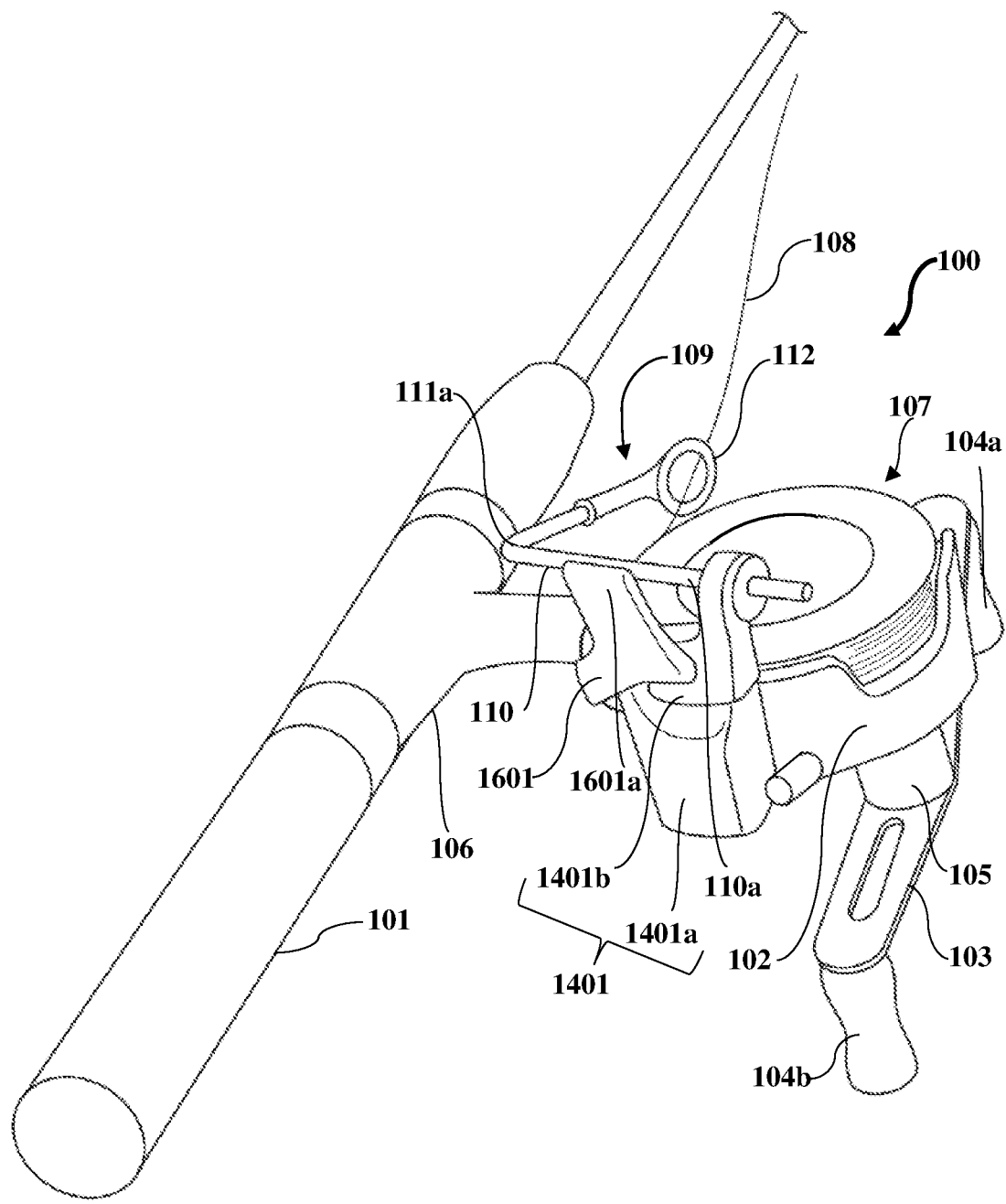
FIGS. 16A-16B exemplarily illustrate perspective views of an embodiment of the fishing reel, showing a quick trigger mechanism configured for engaging and releasing the line transfer mechanism in the retrieve mode and the cast mode respectively.
Figure 16B:
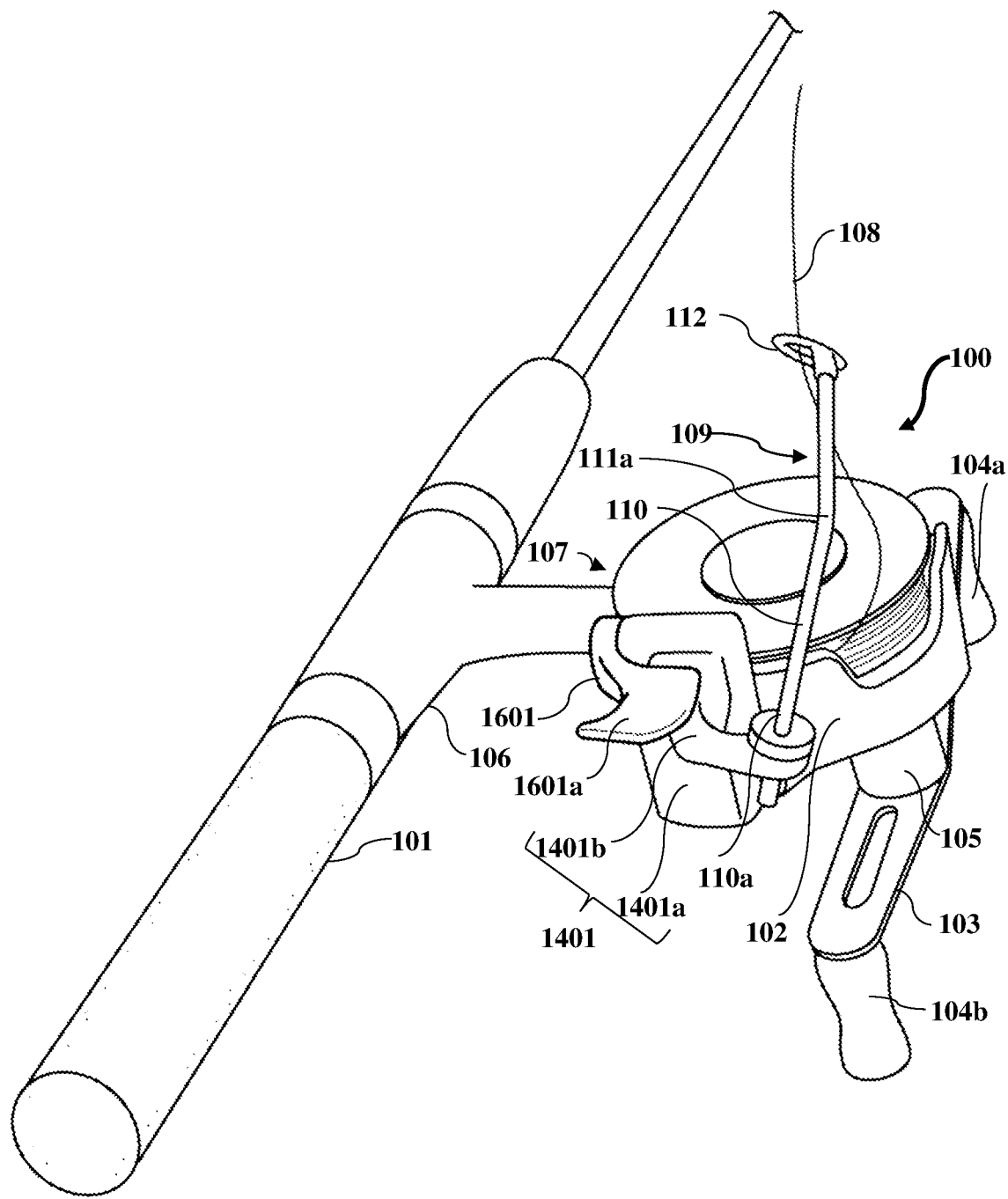

FIGS. 16A-16B exemplarily illustrate perspective views of an embodiment of the fishing reel 100, showing a quick trigger mechanism 1601 configured for engaging and releasing the line transfer mechanism 109 in the retrieve mode and the cast mode respectively. In an embodiment, the quick trigger mechanism 1601 is operably connected to a locking mechanism, for example, the connection assembly 1401, used to pivot the first end 110a of the line transfer arm 110 to the reel body 102. The structure and the function of the connection assembly 1401 are disclosed in the descriptions of FIGS. 14A-14C. In this embodiment, the quick trigger mechanism 1601 engages the line transfer arm 110 in the retrieve mode as exemplarily illustrated in FIG. 16A, and releases the line transfer arm 110 in the cast mode as exemplarily illustrated in FIG. 16B. The quick trigger mechanism 1601 comprises a finger trigger or lever 1601a for engaging the line transfer arm 110 in the retrieve mode and releasing the line transfer arm 110 in the cast mode. An operator of the fishing reel 100, for example, an angler, moves the finger trigger 1601a of the quick trigger mechanism 1601, for example, in a downward direction, to move the arm 1401b of the connection assembly 1401, and in turn, the line transfer arm 110 from the retrieve mode exemplarily illustrated in FIG. 16A to the cast mode exemplarily illustrated in FIG. 16B. The operator then manually moves the arm 1401b of the connection assembly 1401, and in turn, the line transfer arm 110 to the retrieve mode exemplarily illustrated in FIG. 16A. In an embodiment, the finger trigger 1601a of the quick trigger mechanism 1601 is moved, for example, in an upward direction, to engage the line transfer arm 110 in the retrieve mode.

Figure 17A:
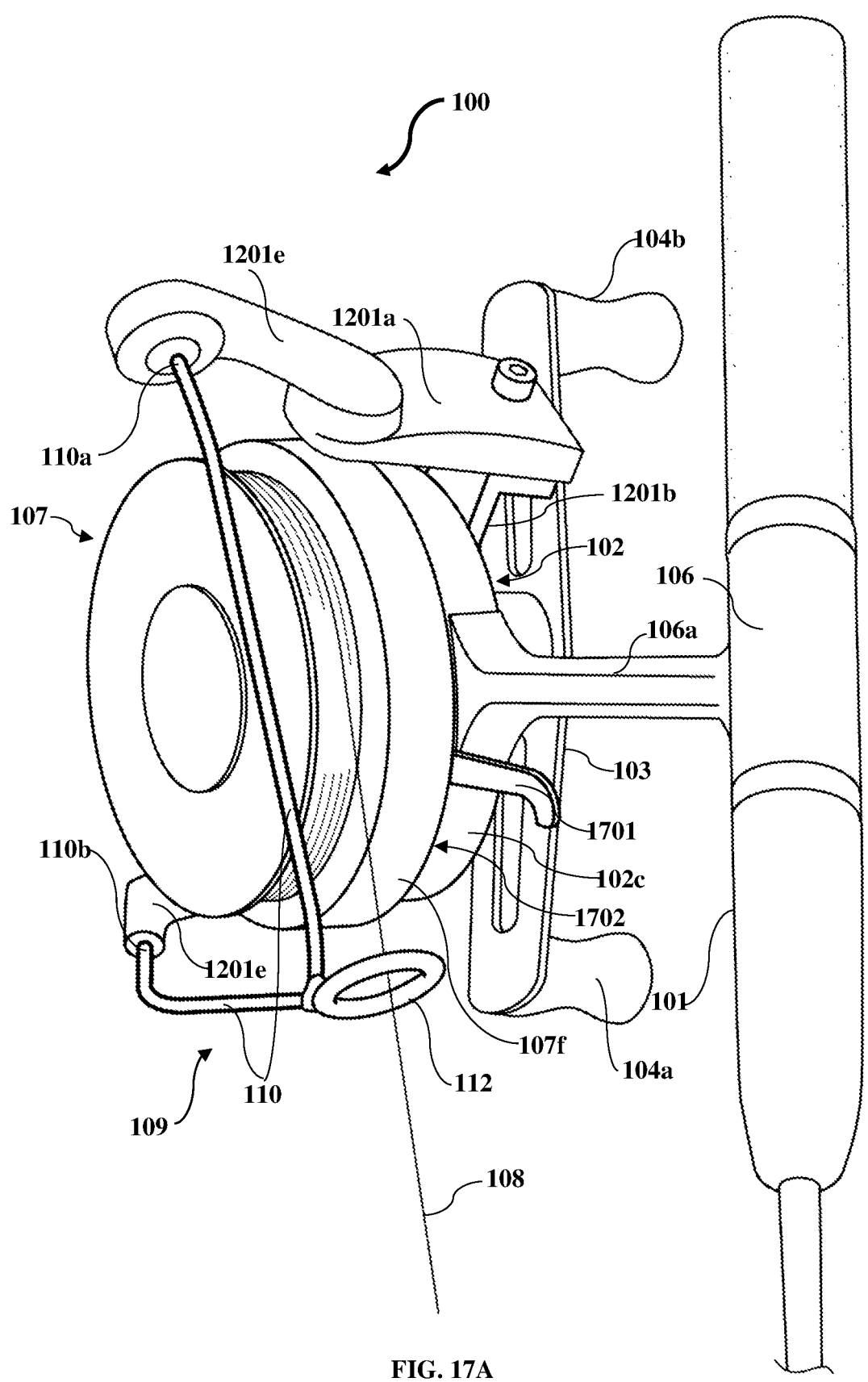
FIG. 17A exemplarily illustrates a perspective view of an embodiment of the fishing reel, showing a manual lever drag element installed in the reel body for adjusting an amount of drag on the fishing line.

FIG. 17A exemplarily illustrates a perspective view of an embodiment of the fishing reel 100, showing a manual lever drag element 1701 installed in the reel body 102 for adjusting an amount of drag on the fishing line 108. In an embodiment, the manual lever drag element 1701 is configured as a finger lever extending outwardly from an interface 1702 created between the spool 107 and the reel body 102 as exemplarily illustrated in FIG. 17A. An operator of the fishing reel 100, for example, an angler, manually turns the manual lever drag element 1701 to increase or decrease the amount of friction created or drag applied to the fishing line 108.

Figure 17B:
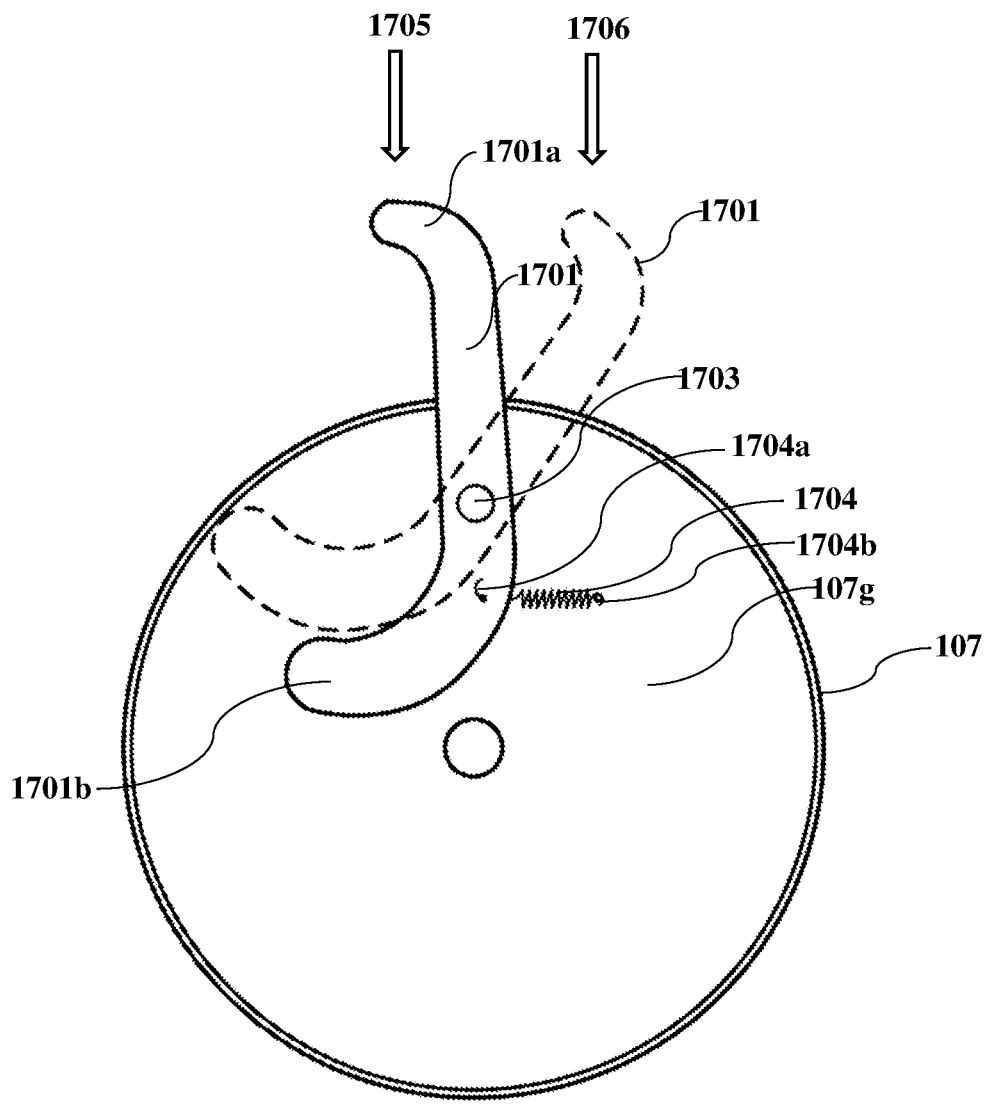
FIG. 17B exemplarily illustrates an elevation view of the spool of the embodiment of the fishing reel shown in FIG. 17A, showing operation of the manual lever drag element.

FIG. 17B exemplarily illustrates an elevation view of the spool 107 of the embodiment of the fishing reel 100 shown in FIG. 17A, showing operation of the manual lever drag element 1701. In an embodiment, the manual lever drag element 1701 is fixed to an underside 107g of the spool 107 using a fastener 1703, for example, a screw or a pin. The fastener 1703 defines a fulcrum about which the manual lever drag element 1701 turns as exemplarily illustrated in FIG. 17B. The manual lever drag element 1701 is supported and manually moved about the fulcrum defined by the fastener 1703. The manual lever drag element 1701 comprises a first end 1701a and a second end 1701b. The first end 1701a of the manual lever drag element 1701 extends outwardly from the spool 107 and is manually operable using a finger of an operator of the fishing reel 100 exemplarily illustrated in FIG. 17A. The second end 1701b of the manual lever drag element 1701 is disposed on the underside 107g of the spool 107.

When the operator moves or pulls the first end 1701a of the manual lever drag element 1701 from a first non-friction position 1705 to a second friction position 1706 as exemplarily illustrated in FIG. 17B, using a finger such as an index finger, the manual lever drag element 1701 turns or pivots about its fulcrum and applies a manual friction to the underside 107g of the spool 107. The second end 1701b of the manual lever drag element 1701 rubs against the underside 107g of the spool 107 to create friction or drag. In an embodiment, a small-sized spring 1704 is operably coupled to the underside 107g of the spool 107 and to the manual lever drag element 1701 to return the manual lever drag element 1701 to the non-friction position 1705. The spring 1704 comprises a first end 1704a and a second end 1704b. The first end 1704a of the spring 1704 is operably coupled to the manual lever drag element 1701, while the second end 1704b of the spring 1704 is operably coupled to the spool 107. The friction applied to the underside 107g of the spool 107 adjusts an amount of drag on the fishing line 108 wound around the spool 107 exemplarily illustrated in FIG. 17A. The spool 107 turns in a reverse direction when force is applied thereto by an outward pull of the fishing line 108 to overcome a friction drag tension adjustment. The friction drag tension adjustment is made below a breaking point of the fishing line 108 to allow a large fish to pull the fishing line 108 from the spool 107 rather than allowing the fish to break the fishing line 108.

Figure 18A:
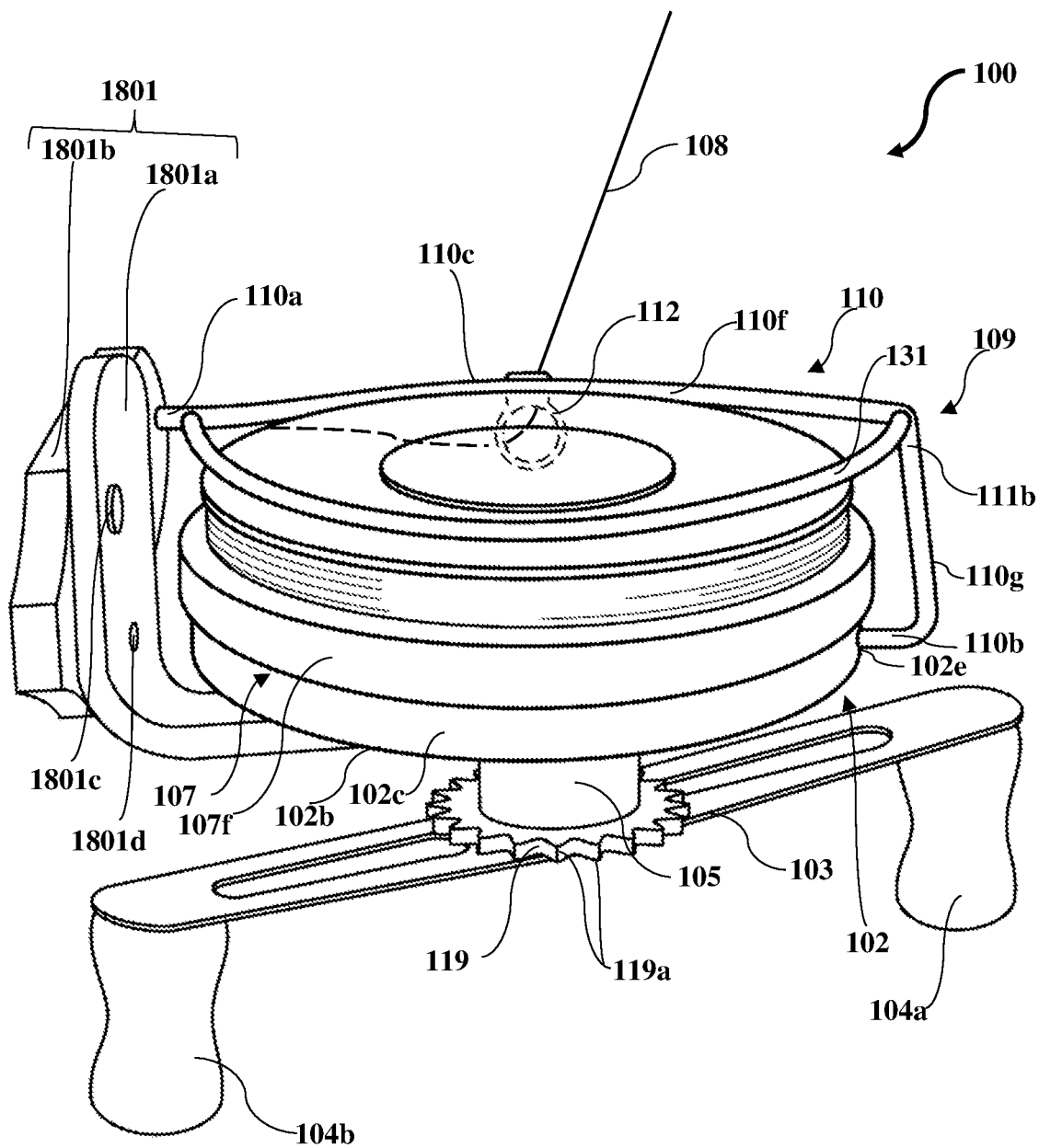
FIG. 18A exemplarily illustrates a perspective view of an embodiment of the fishing reel, showing an embodiment of the line transfer mechanism locked in the retrieve mode.
Figure 18B:
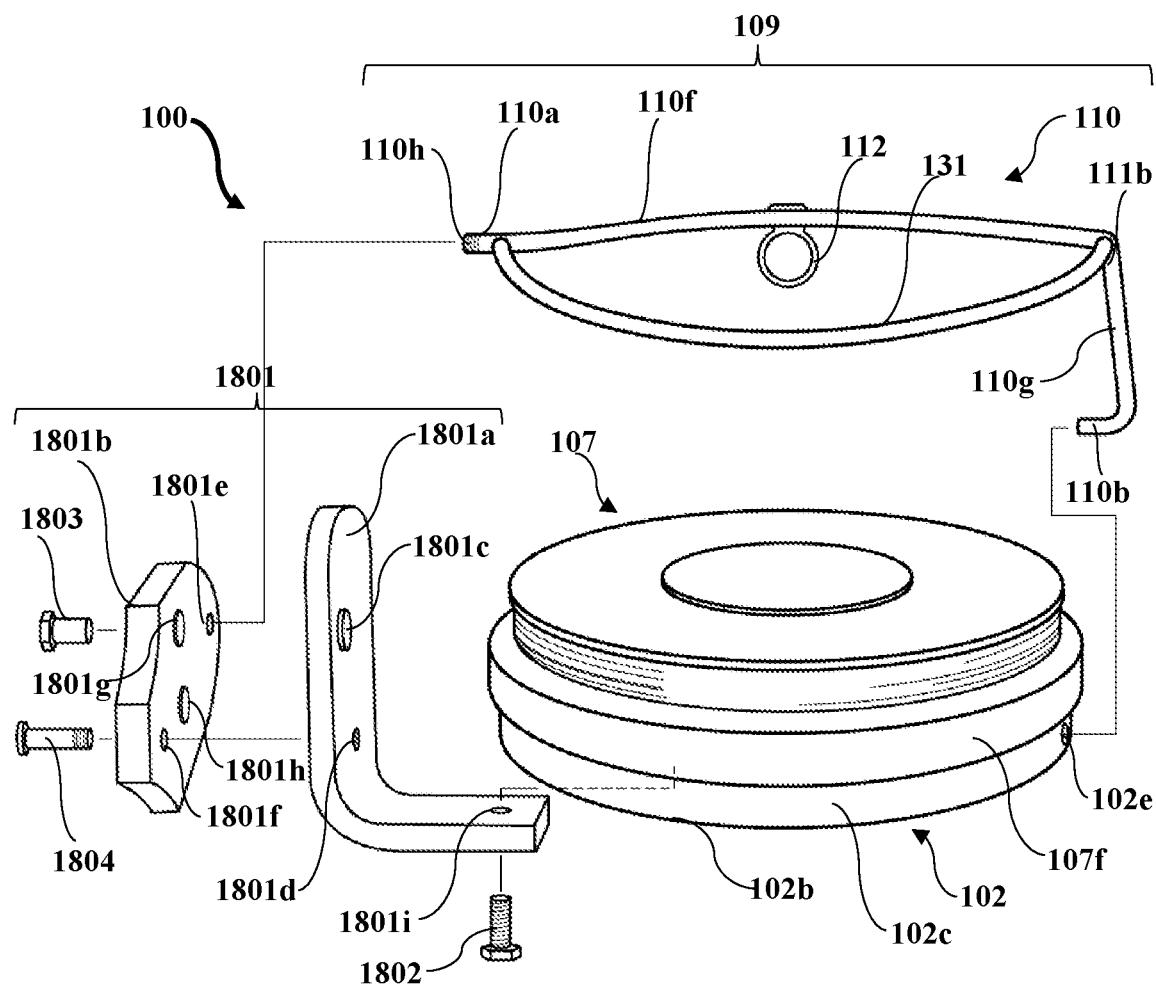
FIG. 18B exemplarily illustrates a partial exploded view of the embodiment of the fishing reel shown in FIG. 18A.

FIGS. 18A-18B exemplarily illustrate a perspective view and a partial exploded view respectively, of an embodiment of the fishing reel 100, showing an embodiment of the line transfer mechanism 109 locked in the retrieve mode. In this embodiment, the line transfer arm 110 of the line transfer mechanism 109 comprises a first section 110f and a second section 110g, where the second section 110g extends in a substantially perpendicular direction from the first section 110f. The second section 110g originates from an angled bend 111b and terminates into the second end 110b of the line transfer arm 110. In this embodiment, the angled bend 111b is configured proximal to only the second end 110b of the line transfer arm 110. Furthermore, in this embodiment, the eye member 112 of the line transfer mechanism 109 is disposed at a mid-section 110c of the first section 110f of the line transfer arm 110. Furthermore, in this embodiment, the first end 110a of the line transfer arm 110 is pivoted to the reel body 102 using a latching mechanism 1801, while the second end 110b of the line transfer arm 110 is pivoted to the generally cylindrical wall 102c, that is, the perimeter of the reel body 102, at a pivot hole 102e disposed in line with and diametrically opposite to a pivot hole 1801d configured on the latching mechanism 1801 as exemplarily illustrated in FIGS. 18A-18B. In this embodiment, the second end 110b of the line transfer arm 110 does not extend freely but extends downwardly from the angled bend 111b configured on the line transfer arm 110 as exemplarily illustrated in FIG. 18A. Furthermore, in this embodiment, the line transfer mechanism 109 further comprises a line guard 131 extending between the first end 110a of the line transfer arm 110 and the angled bend 111b disposed proximal to the second end 110b of the line transfer arm 110. The line guard 131 is configured to preclude the fishing line 108 from entanglement in the cast mode and the retrieve mode.

In an embodiment, the latching mechanism 1801 that pivotably connects the first end 110a of the line transfer arm 110 to the reel body 102 comprises an L-shaped fastening element 1801a and a mount support element 1801b. The L-shaped fastening element 1801a and the mount support element 1801b form two facing plates pivoting upon each other, where each plate comprises one or more embedded magnets 1801c, 1801g, and 1801h configured to secure the line transfer arm 110 in position when toggled to and from the cast mode and the retrieve mode. For example, the mount support element 1801b comprises two embedded magnets 1801g and 1801h as exemplarily illustrated in FIG. 18B, while the L-shaped fastening element 1801a comprises one embedded magnet 1801c as exemplarily illustrated in FIGS. 18A-18C. The L-shaped fastening element 1801a and the mount support element 1801b are made, for example, from plastic. The L-shaped fastening element 1801a fastens the mount support element 1801b to the second surface 102b of the reel body 102 using a fastener 1802, for example, a screw as exemplarily illustrated in FIG. 18B inserted through an opening 1801i configured in the L-shaped fastening element 1801a. The mount support element 1801b extends upwardly from the L-shaped fastening element 1801a as exemplarily illustrated in FIG. 18C. The mount support element 1801b is pivotably connected to the L-shaped fastening element 1801a by inserting a fastener 1804, for example, a pin or a threaded screw, through pivot holes 1801f and 1801d configured in the mount support element 1801b and the L-shaped fastening element 1801a respectively, as exemplarily illustrated in FIG. 18B. The pivot hole 1801d configured on the L-shaped fastening element 1801a is disposed in line with and diametrically opposite to the pivot hole 102e configured on the reel body 102. The mount support element 1801b interfaces with and pivots against the fixed L-shaped fastening element 1801a as exemplarily illustrated in FIG. 18A and FIG. 18C. The fastener 1804 passes through the L-shaped fastening element 1801a and the mount support element 1801b.

Figure 18C:
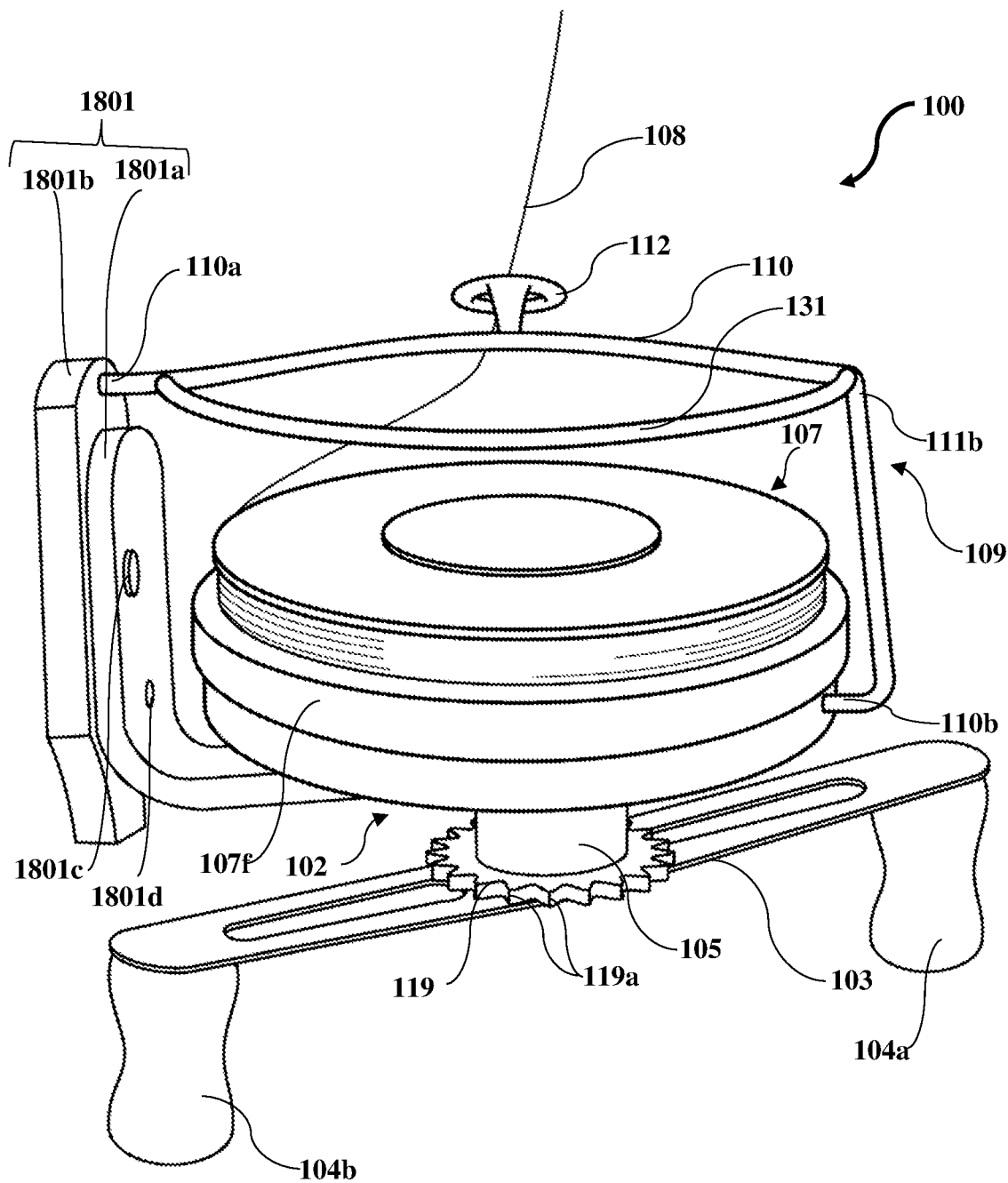
FIG. 18C exemplarily illustrates a perspective view of the embodiment of the fishing reel shown in FIG. 18A, showing the embodiment of the line transfer mechanism locked in the cast mode.

The magnets 1801c, 1801g, and 1801h embedded in both the L-shaped fastening element 1801a and the mount support element 1801b hold the L-shaped fastening element 1801a and the mount support element 1801b firmly to each other until the mount support element 1801b is physically moved from the cast mode exemplarily illustrated in FIG. 18C to the retrieve mode exemplarily illustrated in FIGS. 18A-18B and vice versa. In an embodiment, a threaded section 110h is configured on the first end 110a of the line transfer arm 110 as exemplarily illustrated in FIG. 18B. The first end 110a of the line transfer arm 110 is connected to the mount support element 1801b using a fastener 1803, for example, a threaded screw. The fastener 1803 is configured to threadably engage with the threaded section 110h on the first end 110a of the line transfer arm 110. The threaded section 110h on the first end 110a of the line transfer arm 110 is inserted into an opening 1801e configured in the mount support element 1801b. The inserted threaded section 110h is then threadably engaged with the fastener 1803 to connect the line transfer arm 110 to the mount support element 1801b. The line transfer arm 110 extends outwardly from the mount support element 1801b. The pivoted connection of the mount support element 1801b to the L-shaped fastening element 1801a allows toggling of the line transfer mechanism 109 for selectively transferring the fishing line 108 between the cast mode and the retrieve mode. The magnets 1801c, 1801g, and 1801h embedded in the L-shaped fastening element 1801a and the mount support element 1801b of the latching mechanism 1801 lock the line transfer arm 110 in position in the cast mode or the retrieve mode. FIGS. 18A-18B show the line transfer mechanism 109 in the retrieve mode, where the eye member 112 is disposed substantially perpendicular to the direction of the fishing line 108, and where the plane of the eye member 112 is substantially parallel to the periphery 107f of the spool 107.

FIG. 18C exemplarily illustrates a perspective view of the embodiment of the fishing reel 100 shown in FIG. 18A, showing the embodiment of the line transfer mechanism 109 locked in the cast mode. To transfer the fishing line 108 from the retrieve mode exemplarily illustrated in FIG. 18A to the cast mode exemplarily illustrated in FIG. 18C, the mount support element 1801b of the latching mechanism 1801 is moved upwardly to lie parallel to the L-shaped fastening element 1801a via the pivoted connection between the mount support element 1801b and the L-shaped fastening element 1801a as exemplarily illustrated in FIG. 18C. This upward movement toggles the line transfer arm 110 from the retrieve mode to the cast mode. FIG. 18C shows the line transfer mechanism 109 in the cast mode, where the eye member 112 is offset at an angle with respect to a plane of the fishing reel 100 and the line guard 131 is disposed to preclude the fishing line 108 from being caught or obstructed by the line guard 131. Also exemplarily illustrated in FIG. 18A and FIG. 18C is the adjustable friction drag element 119 for adjusting an amount of drag on the fishing line 108, in operable communication with the drag system 125 in the reel body 102 exemplarily illustrated in FIG. 2 and FIG. 7. The adjustable friction drag element 119 comprises spokes 119a that allow convenient handling and operation of the adjustable friction drag element 119 during fishing. The adjustable friction drag element 119 is coaxially connected between the turning handle 103 and the pivot 105 as exemplarily illustrated in FIG. 18A and FIG. 18C. The adjustable friction drag element 119 rotates about the pivot 105.

When the line transfer arm 110 is in the cast mode exemplarily illustrated in FIG. 18C, the magnet 1801h embedded in the mount support element 1801b of the latching mechanism 1801 exemplarily illustrated in FIG. 18B, magnetically attracts and contacts the magnet 1801c embedded in the L-shaped fastening element 1801a of the latching mechanism 1801 as exemplarily illustrated in FIG. 18C, thereby locking the line transfer arm 110 in position in the cast mode. When the line transfer arm 110 is in the retrieve mode exemplarily illustrated in FIGS. 18A-18B, the magnet 1801g embedded in the mount support element 1801b of the latching mechanism 1801 exemplarily illustrated in FIG. 18B, magnetically attracts and contacts the magnet 1801c embedded in the L-shaped fastening element 1801a of the latching mechanism 1801 as exemplarily illustrated in FIG. 18A, thereby locking the line transfer arm 110 in position in the retrieve mode.

The foregoing examples and illustrative implementations of various embodiments have been provided merely for explanation and are in no way to be construed as limiting of the embodiments disclosed herein. Dimensions of various parts of the fishing reel 100 disclosed above are exemplary, and are not limiting of the scope of the embodiments herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

I claim:

1. A fishing reel for selectively transferring a fishing line between a cast mode and a retrieve mode, the fishing reel comprising:
   a reel body configured to be attached to a fishing rod via a reel foot;
   a spool disposed on the reel body, wherein the fishing line is wound around the spool; and
   a line transfer mechanism pivoted to the reel body, substantially adjacent to the spool, the line transfer mechanism comprising:
      a line transfer arm configured to be toggled over the spool for selectively transferring the fishing line between the cast mode and the retrieve mode, wherein the line transfer arm comprises a first end and a second end, and wherein the first end and the second end of the line transfer arm are pivoted to a reel body of the fishing reel using a pair of pivoting elements;
      an eye member disposed at a predetermined location on the line transfer arm, wherein the eye member is configured to receive and pass the fishing line from and to the spool, and wherein the eye member is in perpendicular alignment with the fishing line in both the cast mode and the retrieve mode;
      an angled bend configured proximal to one or both of the first end and the second end of the line transfer arm, wherein the angled bend is configured to allow the eye member to be disposed proximal to the fishing reel in the cast mode and the retrieve mode while maintaining the eye member in said perpendicular alignment with the fishing line in the cast mode and the retrieve mode;
      said pivoting elements configured to determine amount of angle bend required in the line transfer arm to achieve the perpendicular alignment of the fishing line to the eye member; and
      a stopper attached to one end of the line transfer arm for regulating movement of the line transfer arm when the line transfer arm is toggled to selectively transfer the fishing line between the cast mode and the retrieve mode, wherein when the stopper is adjacent to a first peg with an embedded, diametrically magnetized magnet, the line transfer arm is locked in the cast mode, and wherein when the stopper is adjacent to a second peg with another embedded, diametrically magnetized magnet, the line transfer arm is locked in the retrieve mode.

2. The fishing reel of claim 1, wherein the second end of the line transfer arm is pivoted to the reel body, substantially diametrically opposite to the first end of the line transfer arm.

3. The fishing reel of claim 1, wherein the predetermined location of the eye member of the line transfer mechanism is a mid-section of the line transfer arm extending between the first end and the second end of the line transfer arm, and wherein the angled bend proximal to the first end and the angled bend proximal to the second end allow the eye member to be disposed proximal to the fishing reel in the cast mode and the retrieve mode while maintaining the eye member substantially perpendicular to the direction of the fishing line.

4. The fishing reel of claim 3, wherein the line transfer mechanism further comprises a line guard extending between the angled bend proximal to the first end and the angled bend proximal to the second end of the line transfer arm, wherein the line guard is configured to preclude the fishing line from entanglement in the cast mode and the retrieve mode.

5. The fishing reel of claim 1, wherein each of the first end and the second end of the line transfer arm is free of the angled bend for direct attachment to the reel body.

6. The fishing reel of claim 1, wherein the line transfer mechanism further comprises a line guard extending between the first end of the line transfer arm and the angled bend proximal to the second end of the line transfer arm, wherein the line guard is configured to preclude the fishing line from entanglement in the cast mode and the retrieve mode.

7. The fishing reel of claim 1, wherein the predetermined location of the eye member of the line transfer mechanism is at the second end of the line transfer arm, and wherein the eye member is attached to the second end of the line transfer arm and extends freely from the second end of the line transfer arm, while the first end of the line transfer arm is pivoted to the reel body.

8. The fishing reel of claim 1, wherein the eye member of the line transfer mechanism is offset at an angle with respect to a plane of the fishing reel when the line transfer arm is in the cast mode, and wherein a plane of the eye member is substantially parallel to a periphery of the fishing reel when the line transfer arm is in the retrieve mode.

9. The fishing reel of claim 1, wherein the line transfer arm is configured to be locked in position to the reel body in one of the cast mode and the retrieve mode using one of a locking mechanism and a latching mechanism, and wherein the latching mechanism is a magnetic latching mechanism comprising one or more magnets.

10. The fishing reel of claim 1, wherein the spool has a substantially large diameter providing for less coiling memory, thereby allowing the fishing line to flow smoothly while being cast from the spool.

11. The fishing reel of claim 10, wherein the reel body and the spool are configured to be disposed in line with the fishing rod, thereby allowing accommodation of the spool having the substantially large diameter.

12. The fishing reel of claim 1, further comprising a turning handle rotatably connected to the spool via a system of gears accommodated in the reel body, wherein the turning handle is configured to turn the system of gears selected to achieve a desired gear ratio, and wherein the system of gears is operably connected to the spool and is configured to impart a turning motion to the spool causing the fishing line to be retrieved.

13. The fishing reel of claim 12, further comprising a one-way directional bearing installed in the system of gears and configured as an anti-reverse mechanism for disallowing movement of the turning handle in a reverse direction.

14. The fishing reel of claim 12, wherein the adjustable friction drag element is externally connected to the turning handle and internally connected to the drag system built into the system of gears accommodated in the reel body, and wherein the metal washer is a key washer, and wherein the fabric washer is a polytetrafluoroethylene (PTFE) washer.

15. The fishing reel of claim 1, wherein the spool is configured to turn in a reverse direction when force is applied thereto by an outward pull of the fishing line to overcome a friction drag tension adjustment, wherein the friction drag tension adjustment is made below a breaking point of the fishing line.

16. The fishing reel of claim 1, further comprising a slotted cover configured to enclose the spool, wherein the slotted cover comprises a slot configured to allow the fishing line to travel from the retrieve mode to the cast mode, without entanglement of the fishing line.

17. The fishing reel of claim 1, wherein the spool is a skirted spool configured to prevent the fishing line from falling behind and under the spool.

* * * * *